(12) United States Patent
Ogura

(10) Patent No.: US 9,318,729 B2
(45) Date of Patent: Apr. 19, 2016

(54) POWER TOOL BATTERY PACK

(71) Applicant: MAKITA CORPORATION, Anjo-Shi (JP)

(72) Inventor: Hironori Ogura, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 74 days.

(21) Appl. No.: 14/243,260

(22) Filed: Apr. 2, 2014

(65) Prior Publication Data

US 2014/0302353 A1    Oct. 9, 2014

(30) Foreign Application Priority Data

Apr. 5, 2013    (JP) .................................. 2013079594
Apr. 5, 2013    (JP) .................................. 2013079595
Apr. 5, 2013    (JP) .................................. 2013079596

(51) Int. Cl.
*H01M 14/00*    (2006.01)
*H01M 2/10*    (2006.01)
*H01M 2/20*    (2006.01)
*H01M 10/42*    (2006.01)

(52) U.S. Cl.
CPC ............ *H01M 2/1055* (2013.01); *H01M 2/105* (2013.01); *H01M 2/20* (2013.01); *H01M 10/425* (2013.01); *H01M 2220/30* (2013.01)

(58) Field of Classification Search
None
See application file for complete search history.

(56) References Cited

U.S. PATENT DOCUMENTS

| | | | |
|---|---|---|---|
| 5,661,392 A | 8/1997 | Imazeki | |
| 6,410,184 B1 * | 6/2002 | Horiuchi et al. | 429/156 |
| 6,566,005 B1 * | 5/2003 | Shimma et al. | 429/148 |
| 2009/0233161 A1 * | 9/2009 | Miyamae et al. | 429/96 |
| 2009/0246615 A1 | 10/2009 | Park | |
| 2010/0052692 A1 | 3/2010 | Yano et al. | |
| 2010/0156350 A1 * | 6/2010 | Murayama et al. | 320/128 |
| 2010/0248004 A1 * | 9/2010 | Takeshita et al. | 429/156 |
| 2011/0250476 A1 * | 10/2011 | Taga | 429/7 |
| 2012/0045667 A1 | 2/2012 | Yoneda et al. | |
| 2012/0100400 A1 | 4/2012 | Kang et al. | |
| 2012/0127676 A1 | 5/2012 | Warmuth et al. | |

FOREIGN PATENT DOCUMENTS

| | | |
|---|---|---|
| CN | 102376922 A | 3/2012 |
| KR | 20070068847 A | 7/2007 |
| WO | 2009057809 A1 | 5/2009 |

OTHER PUBLICATIONS

Fukumoto et al., Battery pack for hand-held electric tool, JP2008-010315A, Abstract English Translation, Jan. 17, 2008.*
Office Action from the European Patent Office dated Feb. 6, 2015 in counterpart EP application No. 14 163 472.5, including examined claims 1-15.

(Continued)

*Primary Examiner* — Patrick Ryan
*Assistant Examiner* — Jose Colucci Rios
(74) *Attorney, Agent, or Firm* — J-Tek Law PLLC; Jeffrey D. Tekanic; Scott T. Wakeman

(57) ABSTRACT

A power tool battery pack includes a lower side case, an upper side case fixed to the lower side case, a battery cell in the lower side case and a circuit board connected to the battery cell. A plurality of electrical signal terminals are arranged in parallel on the circuit board, and the circuit board includes at least one slit between adjacent pairs of the plurality of signal terminals to make it difficult for any water that reaches the circuit board to electrically short two of the signal terminals together. Alternately or in addition, a wall structure may be provided between the terminals for reducing the likelihood that water reaching one of the signal terminals will be able to electrically connect two of the signal terminals.

21 Claims, 42 Drawing Sheets

(56) References Cited

OTHER PUBLICATIONS

Page from general catalog of Makita Corporation showing 14.4 volt Li-ion battery No. BL1430, Apr. 2012.

European Extended Search Report from related application EP 14163472 including European claims, Jun. 2, 2015.
Office Action from the Chinese Patent Office dated Nov. 17, 2015 in counterpart Chinese application No. 20140138775.5, and translation thereof.

* cited by examiner

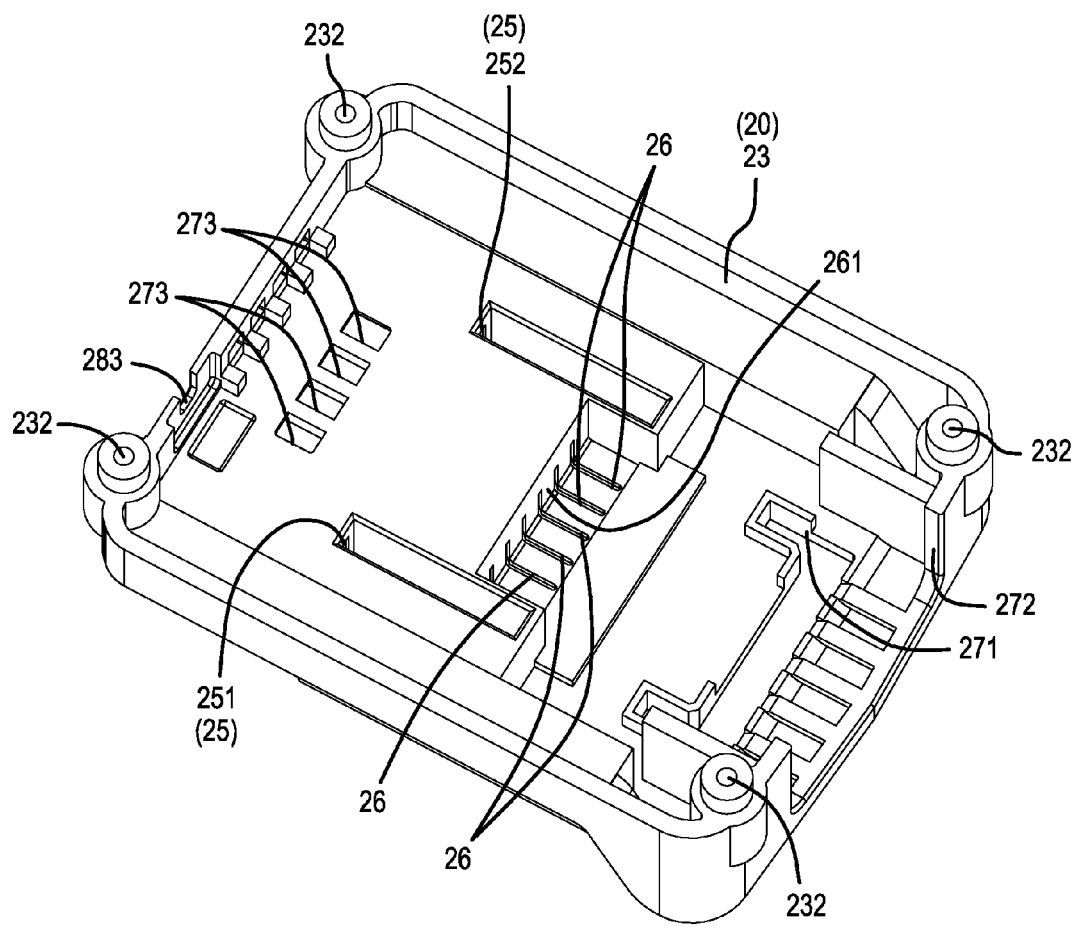
FIG.5
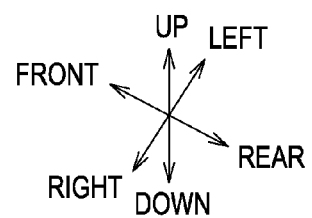

POWER TOOL BATTERY PACK

CROSS-REFERENCE

This application claims priority to Japanese patent application nos. 2013-079594, 2013-079595 and 2013-079596, each filed on Apr. 5, 2013, the contents of each of which are fully incorporated herein by reference.

TECHNICAL FIELD

The present disclosure is directed to a power tool battery pack that can be used as a power supply of a power tool and that is attachable to and detachable from a main body of the power tool.

BACKGROUND ART

Power tools are known that have a battery pack, which serves as a power supply, mounted to a tool main body (e.g., refer to the page on which the BL1430 appears in the Makita General Catalog published April 2012). Such a power tool battery pack comprises a rechargeable battery that can be attached to and detached from the tool main body. That is, after the power tool battery pack is attached to the tool main body and used, the power tool battery pack is detached from the tool main body and charged by a specialized charger. After charging, the power tool battery pack is once again attached to the tool main body. As used herein, tool main bodies, specialized chargers, and other structures to which a power tool battery pack may be mounted are sometimes referred to as "mounting targets."

Power tool battery packs generally comprise a case (housing), which also functions as an outer packaging (shell), and a battery main body that is installed inside the case. The battery main body comprises a plurality of rechargeable battery cells and a circuit board that controls the charging and discharging of the plurality of battery cells. The circuit board includes positive and negative connection terminals through which electric current passes when the battery cells are charged and discharged. In addition, the circuit board is provided with signal terminals for transmitting signals to and receiving signals from outside the battery pack—from a mounting target such as the attached tool main body, the attached charger, etc.

When the power tool battery pack is mounted onto a mounting target, the signal terminals constitute communication signal terminals that transmit information to and receive information from the power tool battery pack. A separate signal terminal is generally provided for different types of information. Consequently, a plurality of the signal terminals is generally provided, and these signal terminals are disposed adjacently.

SUMMARY

Power tools having battery packs as described above are sometimes used outdoors. As such, the power tools and battery packs may get wet—from rain or other sources of water/moisture in the environment in which the power tool is used. There is thus a risk that water may adversely come into contact with the signal terminals. Hypothetically, if (electrically-conductive) water droplets were to undesirably contact the signal terminals, adjacently disposed signal terminals might become electrically connected to one another through the water droplets. Such an unintended connection might be interpreted, erroneously, as the transmission and/or reception of information related to power tool or battery pack operation or control, and this might result in the improper operation of the power tool and/or battery pack. Consequently, it would be desirable to configure a power tool battery pack so that the signal terminals do not become electrically connected to one another and do not transmit and receive erroneous information—even if, for example, the power tool battery pack comes into contact with water or another electrically-conductive liquid.

In order to address this problem, it would be possible to protect signal terminals by coating them with, for example, a low temperature, low pressure type molding resin, sometimes called "hot melt molding" However, merely coating the signal terminals with such a low temperature, low pressure type molding resin has been criticized as being insufficient to protect the signal terminals There is a long-felt need for improved measures for protecting the signal terminals from being accidently interconnected by an electrically-conductive liquid, such as rainwater. Advantageous structures and designs for addressing this long-felt need are disclosed herein.

In a first aspect of the disclosure, a power tool battery pack comprises: a lower side case, an upper side case fixed to the lower side case, a battery cell housed in the lower side case, a circuit board connected to the battery cell, and a first terminal and a second terminal disposed on and connected to the circuit board. A slit, which penetrates (passes through) through the circuit board, is provided in the circuit board between the first terminal and the second terminal. The terms "first terminal" and "second terminal" refer to any two signal terminals on the circuit board, e.g., which are disposed parallel to one another.

According to the power tool battery pack of the first aspect of the disclosure, the slit that passes through the circuit board is located between the first terminal and the second terminal. Consequently, the slit spaces apart (provides a gap between) the first terminal and the second terminal. Therefore, even if water contacts the first terminal and/or second terminal, the terminals are spaced apart (isolated) by the slit and thus can not be electrically connected or shorted together by the water.

A power tool battery pack according to a second aspect of the disclosure comprises: a lower side case, an upper side case fixed to the lower side case, a battery cell housed in the lower side case, a cell holder that holds the battery cell, and a circuit board connected to the battery cell. A terminal, which is disposed on an upper surface of the circuit board, and an extension part, which extends upward, are provided on the cell holder, and the extension part is disposed frontward of the terminal.

A power tool battery pack according to a third aspect of the disclosure comprises: a lower side case, an upper side case fixed to the lower side case, a battery cell housed in the lower side case, a cell holder that holds the battery cell, a circuit board connected to the battery cell, and a first terminal and a second terminal that are arrayed (arranged) in parallel on and connected to the circuit board. Both the first terminal and the second terminal are supported by the circuit board by being linked to the circuit board in only one direction of four directions, in other words, in a cantilevered manner.

A power tool battery pack may also comprise: a lower side case, an upper side case fixed to the lower side case, a battery cell housed in the lower side case, a circuit board connected to the battery cell, a positive electrode terminal and a negative electrode terminal arrayed (arranged) in parallel on and connected to the circuit board, and a first signal terminal and a second signal terminal connected to the circuit board. An insulating material, which is formed of an insulating material, is provided on the circuit board between the first signal terminal and the second signal terminal.

According to the power tool battery pack of the fourth aspect of the disclosure, the insulating material, which is formed of an insulating material, is provided between the first signal terminal and the second signal terminal, e.g., on the circuit board. The insulating material thus spaces apart the first signal terminal and the second signal terminal. Therefore, even if water contacts the first signal terminal and/or on the second signal terminal, the insulating material electrically isolates the terminals from that water. Accordingly, it is possible to prevent the water from electrically connecting the first signal terminal and the second signal terminal.

A power tool battery pack according to a fifth aspect of the disclosure comprises: a lower side case, an upper side case fixed to the lower side case, a battery cell housed in the lower side case, a circuit board connected to the battery cell, a positive electrode terminal and a negative electrode terminal connected to the circuit board, and a first signal terminal and a second signal terminal arrayed (arranged) in parallel on and connected to the circuit board. A soft material, which is elastic and capable of contacting another material in an airtight manner, is provided on the circuit board between the first signal terminal and the second signal terminal. The soft material is molded such that it is capable of contacting the upper side case.

A power tool battery pack according to a sixth aspect of the disclosure comprises: a lower side case, an upper side case fixed to the lower side case, a battery cell housed in the lower side case, a circuit board connected to the battery cell, a positive electrode terminal and a negative electrode terminal connected to the circuit board, and a first signal terminal and a second signal terminal arrayed (arranged) in parallel on and connected to the circuit board. A soft material, which is elastic and capable of contacting other materials in an airtight manner, is provided on the circuit board such that it is divided into two areas: a one (first) side area and an other (second) side area. The one (first) side area is located on the side of the negative electrode terminal opposite the positive electrode terminal and the other (second) side area is located on the side of the positive electrode terminal opposite the negative electrode terminal.

A power tool battery pack according to a seventh aspect of the disclosure comprises: a lower side case, an upper side case fixed to the lower side case, a battery cell housed in the lower side case, a circuit board connected to the battery cell, a positive electrode terminal and a negative electrode terminal connected to the circuit board, and signal terminals arrayed (arranged) in parallel on and connected to the circuit board. An insulating material, which is formed of an insulating resin (raw) material, is provided on the circuit board and forms a partition (or partition part) that extends in a direction orthogonal to the terminal connection direction. The partition (part) is formed on a base end side along the terminal connection direction of the signal terminals.

A power tool battery pack according to an eighth aspect of the disclosure comprises: a lower side case, an upper side case fixed to the lower side case, a battery cell housed in the lower side case, a circuit board connected to the battery cell, a positive electrode terminal and a negative electrode terminal connected to the circuit board, and a plurality of signal terminals, arrayed (arranged) in parallel on and connected to the circuit board and disposed between the positive electrode terminal and the negative electrode terminal. The battery pack also includes a resin member that covers at least some of the signal terminals of the plurality of signal terminals such that the plurality of signal terminals together with the resin member constitute a connector.

With this arrangement, even if water contacts the plurality of signal terminals disposed between the positive electrode terminal and the negative electrode terminal, the resin member, which covers at least some of the signal terminals of the plurality of signal terminals, can isolate that water from the signal terminals. Accordingly, even if water contacts the power tool battery pack, it is possible to prevent unintended electrical connections from being made between the signal terminals.

A power tool battery pack according to a ninth aspect of the disclosure comprises: a lower side case, an upper side case fixed to the lower side case, a battery cell housed in the lower side case, a circuit board connected to the battery cell, a positive electrode terminal and a negative electrode terminal connected to the circuit board, and a first signal terminal and a second signal terminal arrayed (arranged) in parallel on and connected to the circuit board and disposed between the positive electrode terminal and the negative electrode terminal. The first signal terminal comprises a first connection part configured to connect to a first terminal of a charger, and the second signal terminal comprises a second connection part configured to connect to a second terminal of the charger. A resin member is disposed between the first connection part and the second connection part such that it fills at least part of the space between the first connection part and the second connection part.

A power tool battery pack according to a tenth aspect of the disclosure comprises: a lower side case, an upper side case fixed to the lower side case, a battery cell housed in the lower side case, a circuit board connected to the battery cell, a positive electrode terminal and a negative electrode terminal connected to the circuit board, and a plurality of signal terminals arrayed (arranged) in parallel on and connected to the circuit board and disposed between the positive electrode terminal and the negative electrode terminal. The positive electrode terminal, the negative electrode terminal, and the plurality of signal terminals are formed as terminals that sandwich, from both sides, counterpart (corresponding and/or complementary) side terminals and thereby provide electrical connection to the counterpart side terminals from (on) both sides. Furthermore, the "counterpart side" is one example of the mounting target to which the power tool battery pack is mounted. In addition, the counterpart side terminal is a terminal that is provided on the mounting target side that is connected to the power tool battery pack when the power tool battery pack is mounted to the mounting target.

A power tool battery pack according to an eleventh aspect of the disclosure comprises: a lower side case, an upper side case fixed to the lower side case, a battery cell housed in the lower side case, a circuit board connected to the battery cell, a positive electrode terminal and a negative electrode terminal connected to the circuit board, and a first signal terminal and a second signal terminal arrayed (arranged) in parallel on and connected to the circuit board. A resin member is provided that covers at least part of the first signal terminal and at least part of the second signal terminal. The first signal terminal and the second signal terminal are formed as terminals that provide electrical connection to the counterpart side terminals by electrically contacting them from (on) one side.

A power tool battery pack according to a twelfth aspect of the disclosure comprises: a lower side case, an upper side case fixed to the lower side case, a battery cell housed in the lower side case, a circuit board connected to the battery cell, a positive electrode terminal and a negative electrode terminal connected to the circuit board, and a first signal terminal and a second signal terminal arrayed (arranged) in parallel on and connected to the circuit board. The first signal terminal is formed as a first side contact terminal that provides electrical contact to the counterpart (corresponding and/or complementary) side terminal from a first side, and the second signal terminal is formed as a second side contact terminal that provides electrical contact to the counterpart (corresponding and/or complementary) side terminal from a second side, opposite the first side.

A power tool battery pack according to a thirteenth aspect of the disclosure comprises: a lower side case, an upper side case fixed to the lower side case, a battery cell housed in the lower side case, a circuit board connected to the battery cell, and a positive electrode terminal and a negative electrode terminal connected to the circuit board. The power tool battery pack also includes a signal terminal connected to the circuit board and configured to electrically contact a counterpart (corresponding and/or complementary) side terminal from (on) one side, and a connecting part that is configured to connect to a terminal of a charger that is configured to perform charging operation. When the direction in which the connecting part is connected is defined as the front side, both the left and right sides and the inner side of the connecting part are covered by the resin member.

A power tool battery pack according to a fourteenth aspect of the disclosure comprises: a lower side case, an upper side case fixed to the lower side case, a battery cell housed in the lower side case, a circuit board connected to the battery cell, a first signal terminal and a second signal terminal connected to the circuit board, and a resin member that covers at least part of the first terminal and the second terminal. The first and second terminals together with the resin member constitute a connector, and the connector is covered by the upper side case.

A power tool battery pack according to a fifteenth aspect of the disclosure comprises: a lower side case, an upper side case fixed to the lower side case, a battery cell housed in the lower side case, a circuit board connected to the battery cell, a first signal terminal and a second signal terminal connected to the circuit board, and a resin member that covers at least part of the first terminal and at least part of the second terminal. The first and second terminals, together with the resin member, constitute a connector. An external plate shaped part (external plate), in which the resin member is formed into a plate shape, is provided on an outer side of the first terminal and the second terminal.

BRIEF DESCRIPTION OF THE DRAWINGS

FIG. 5 is an oblique view that shows the interior of an upper side case.

DETAILED DESCRIPTION OF EMBODIMENTS

Figure 1:
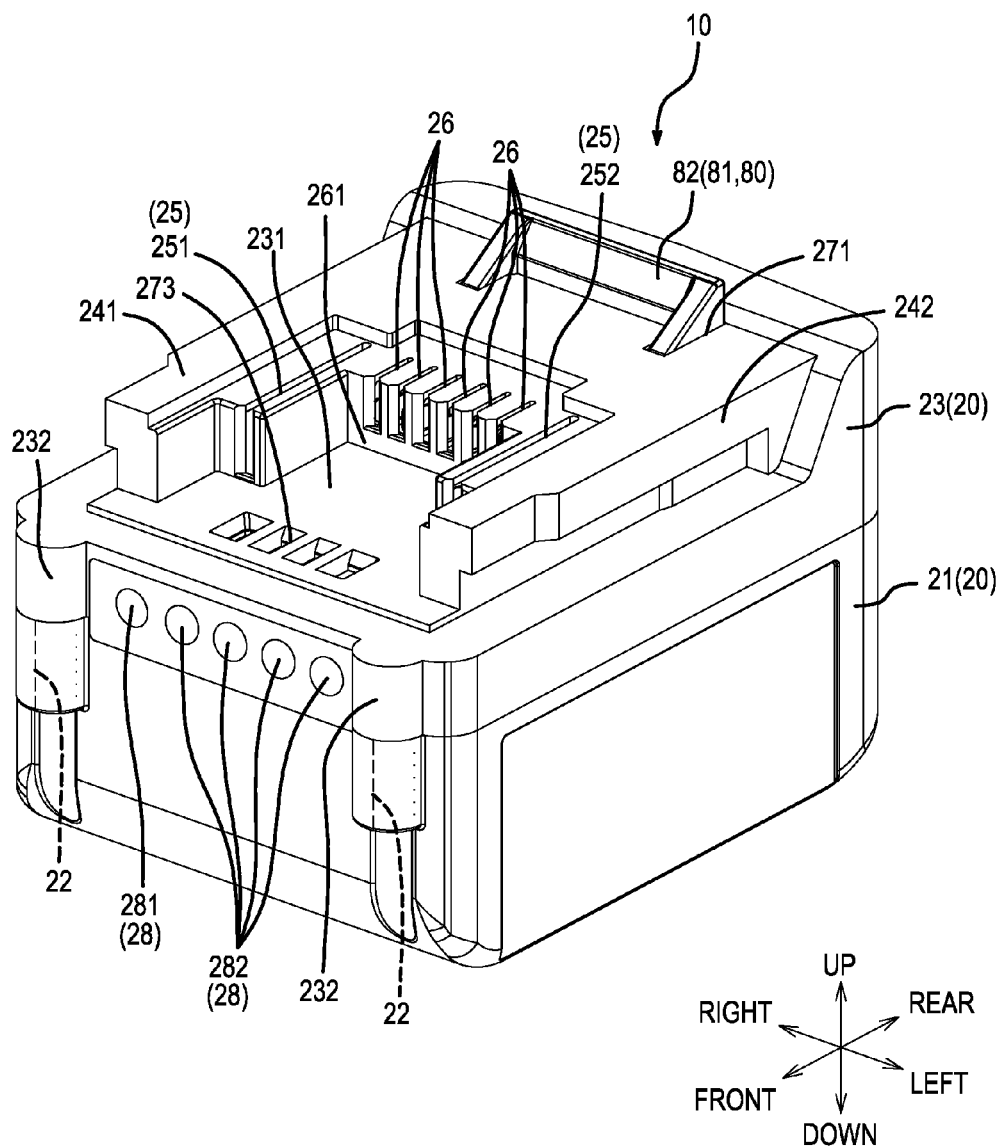
FIG. 1 is an external oblique view of a front side of a battery pack according to a first embodiment.

The text below explains representative embodiments of a power tool battery pack according to the present teachings with reference to the drawings.

First Embodiment

A first embodiment will be explained, referencing FIG. 1 through FIG. 10. Reference numeral 10 in the figures denotes a battery pack and corresponds to a representative power tool battery pack of the present disclosure. The battery pack 10 is a rechargeable battery that is configured to be attached to and detached from tool main bodies (i.e., mounting targets) by a sliding motion. The tool main bodies may be part of various power tools, for example, a power driver. The battery pack 10, when mounted to the tool main body, functions as a power supply of the power tool. If the amount of charge in the battery pack 10 runs low, then the battery pack 10 is detached from the tool main body and mounted to a specialized charger (i.e., a mounting target) for charging. When charging is complete, the battery pack 10 can be removed from the charger and reconnected to the same or to a different power tool.

The text below describes the battery pack 10 with respect to the front, rear, up, down, left, and right directions noted in the drawings. Furthermore, the front side of the battery pack 10 is defined based on the direction in which the battery pack 10 is slid and thereby mounted. In addition, the upper side of the battery pack 10 is defined based on the direction in which the battery pack 10 faces the mounting target (not shown).

Figure 2:
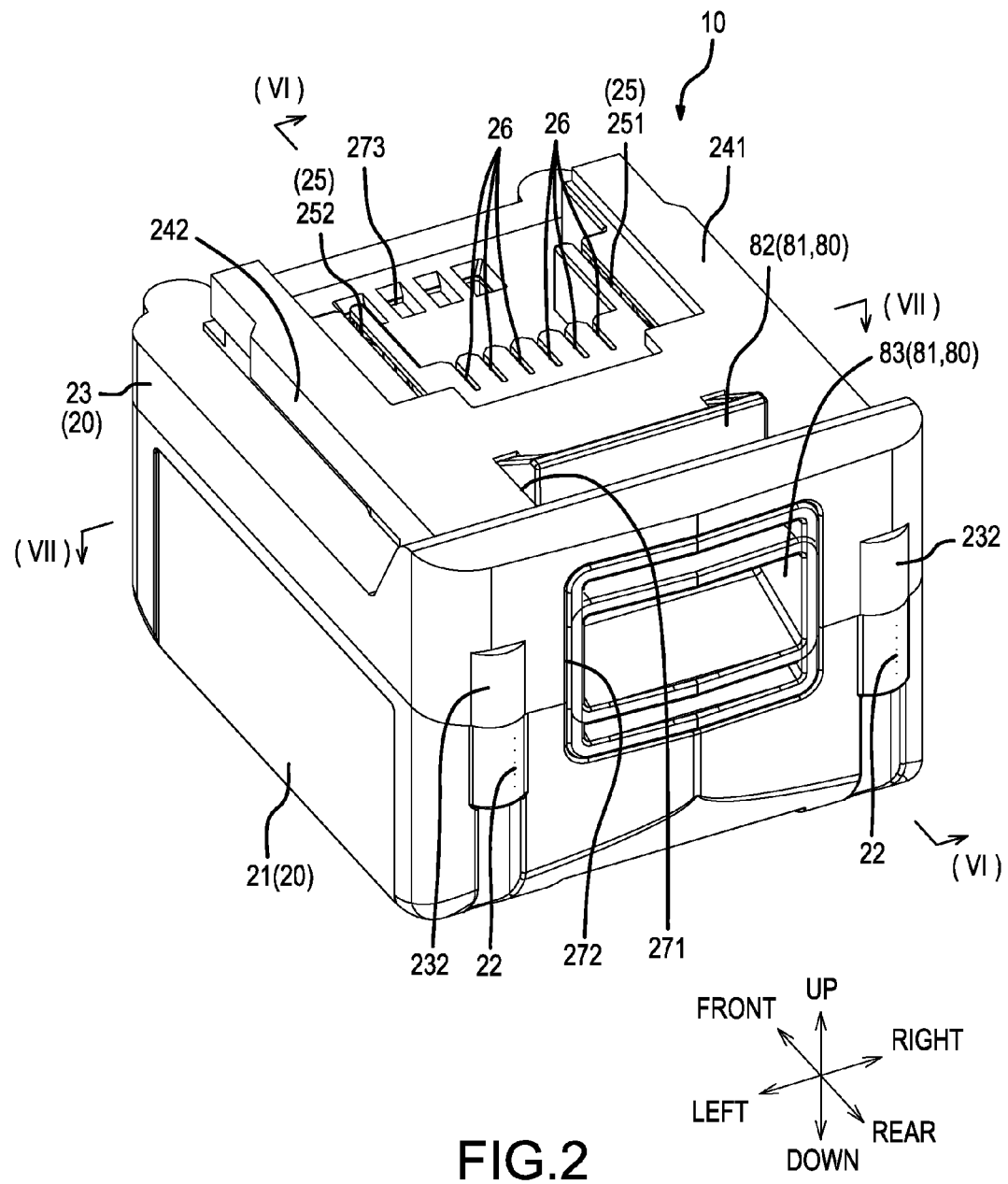
FIG. 2 is an external oblique view of a rear side of the battery pack in FIG. 1.

Referring now to FIG. 1 and FIG. 2, the battery pack 10 basically comprises an outer packaging case (housing or shell) 20 and the battery main body 30 (illustrated, for example, in FIG. 3), which is installed inside the outer packaging case 20. The outer packaging case 20 functions as a casing that, while forming an outer packaging (shell) of the battery pack 10, is internally equipped with the battery main body 30. The outer packaging case 20 comprises an upper structure (housing) and a lower structure (housing), namely, a lower side case 21 and an upper side case 23 that are joined in the up-down direction. The joined lower side case 21 and upper side case 23 are held in the joined state by screws (not shown). The outer packaging case 20, when joined, forms (defines) a box space (interior) in which the battery main body 30 shown in FIG. 3 and FIG. 4 can be installed. The battery main body 30 is equipped with the various functions of the battery pack 10, which will become the rechargeable battery.

Figure 3:
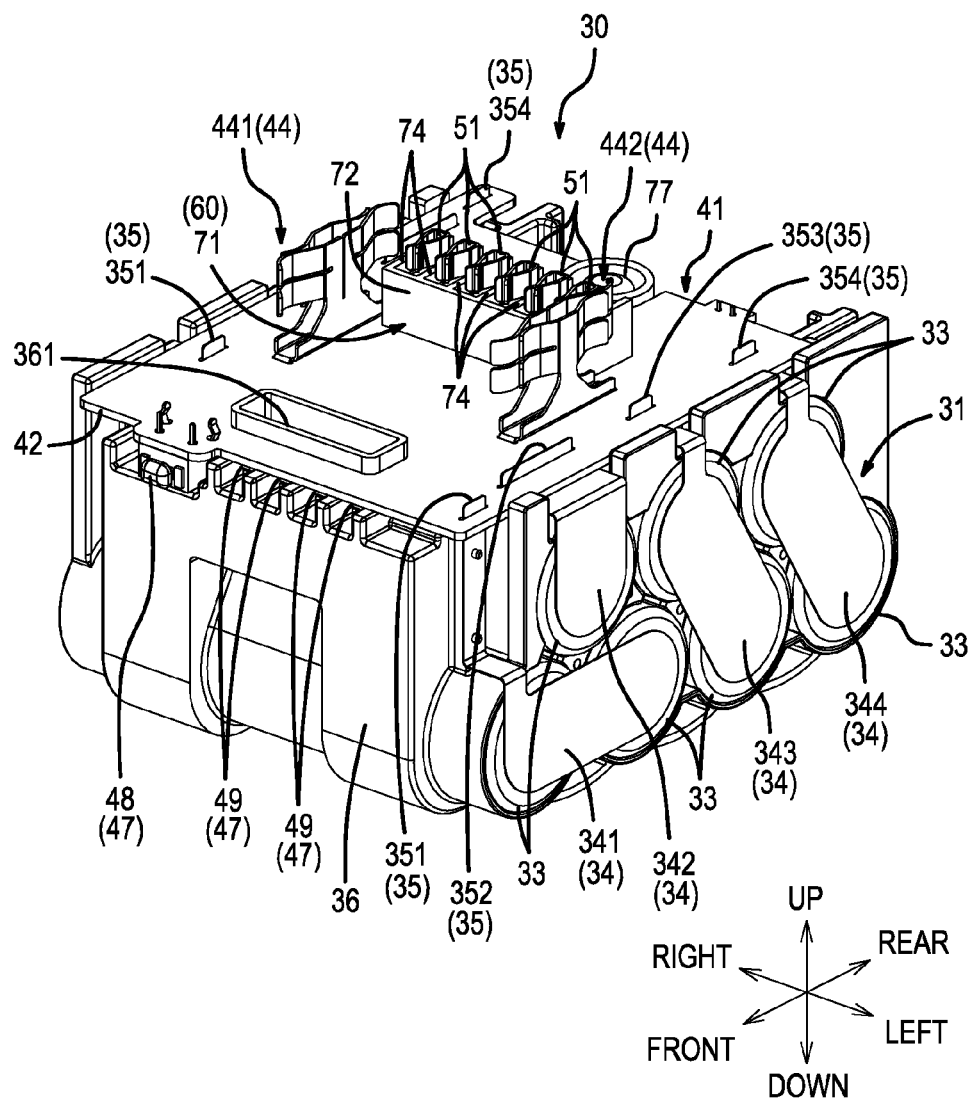
FIG. 3 is a front side oblique view of a battery main body of the battery pack in FIG. 1.
Figure 4:
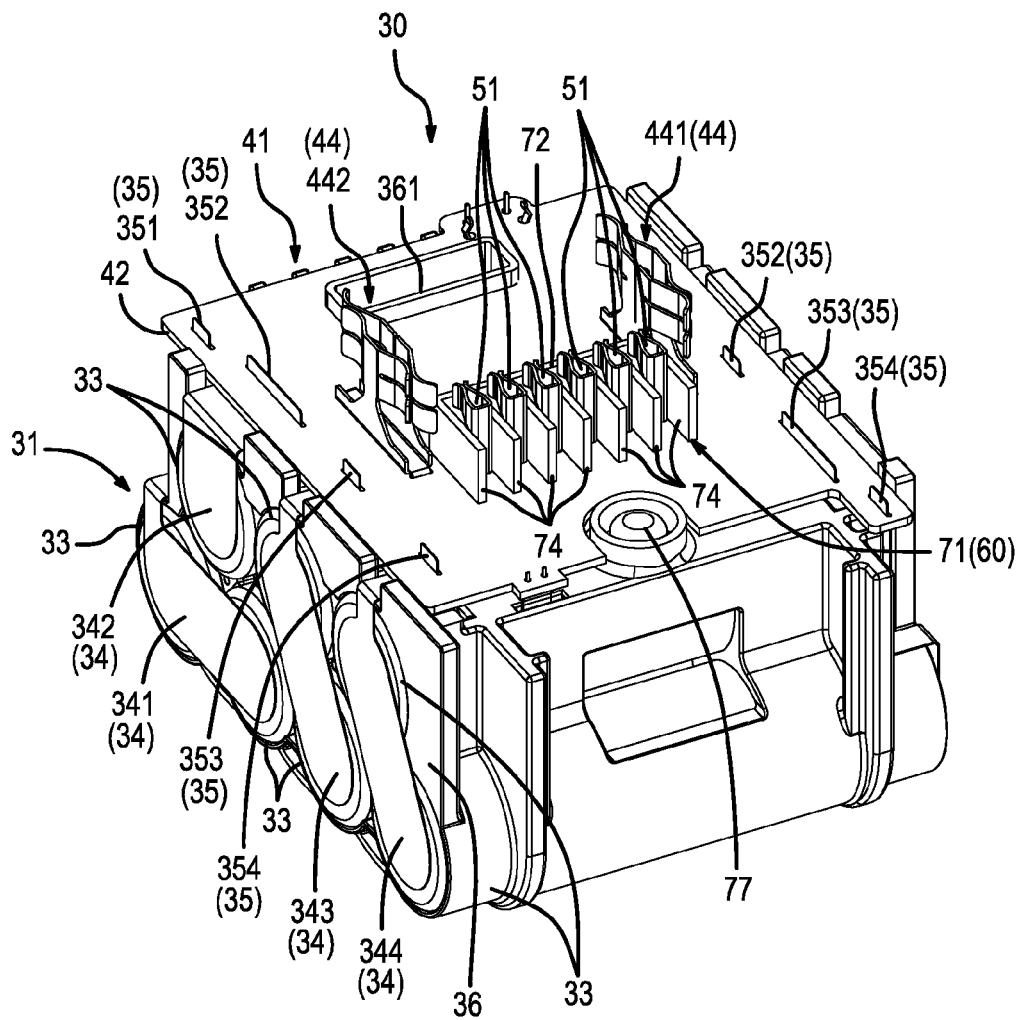
FIG. 4 is a rear side oblique view of the battery main body in FIG. 3.
Figure 4:
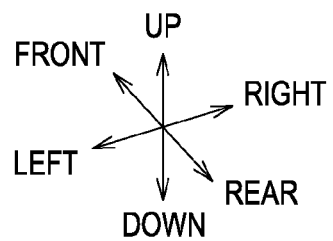

The battery main body 30 comprises the battery part 31 and the control unit 41, and the battery part 31 comprises, as illustrated, seven battery cells 33. The battery cells 33 may comprise, for example, conventional rechargeable battery cells. The seven battery cells 33 are arrayed and thereby disposed such that they are stacked vertically in substantially two levels. Respective lead plates 34 electrically connect battery electrodes (terminals) on both the left and right ends of the seven battery cells 33. The lead plates 34 are formed in four sections. These include, as shown in FIG. 3 and FIG. 4, a first lead plate 341, a second lead plate 342, a third lead plate 343, and a fourth lead plate 344, and these are attached, in order from the front side, to the electrodes (battery terminals) on both the left and right ends of the battery cells 33. The battery cells 33 are supported by a cell holder 36. In addition to supporting the seven stacked battery cells 33, the cell holder 36 also supports the circuit board 42, which is the upper side control unit 41.

The control unit 41 is disposed on the upper side of the battery part 31. The control unit 41 comprises the circuit board 42, which performs (executes) various control processes (algorithms). The circuit board 42 is equipped with a microcontroller 420 (refer to FIG. 10), monitors the state of the battery cells 33, and controls (performs control related to) the charging and discharging of the battery part 31. Consequently, end parts of the lead plates 34, which are attached to the electrodes on both the left and right ends of the seven battery cells 33, are also electrically connected to the circuit board 42. Specifically, upper ends of the lead plates 34 serve as connection locations 35 and are connected to the circuit board 42. The connection locations 35 comprise: a first connection location 351, which corresponds to the first lead plate 341, a second connection location 352, which corresponds to the second lead plate 342, a third connection location 353, which corresponds to the third lead plate 343, and a fourth connection location 354, which corresponds to the fourth lead plate 344. These four lead plates 34 (341-344) may be directly affixed to the circuit board 42 via the four connection locations 35 (351-354), in order to simplify the process of affixing the lead plates 34, thereby making it possible to improve manufacturability.

The circuit board 42 thus connected to the battery cells 33 is also provided with various terminals including charging and discharging terminals (contacts) 44 and signal terminals (contacts) 51. The charging and discharging terminals 44 are terminals that may be electrically connected to a tool main body, a specialized charger, or another mounting target (not shown). In other words, when the battery pack 10 is mounted to a tool main body and used as a power supply, the charging and discharging terminals 44 function as discharge terminals, and when the battery pack 10 is mounted to a specialized charger and undergoes charging, the charging and discharging terminals 44 function as charging terminals. Consequently, the charging and discharging terminals 44 comprise: a positive connection terminal 441, which is connectable to a positive terminal on, for example, the tool main body side, and a negative connection terminal 442, which is connectable to a negative terminal on, for example, the tool main body side. The positive connection terminal 441 corresponds to a positive electrode terminal according to the present disclosure. In addition, the negative connection terminal 442 corresponds to a negative electrode terminal according to the present disclosure.

The positive connection terminal 441 and the negative connection terminal 442 are configured such that they have mutually symmetric (complementary) shapes. Namely, the charging and discharging terminals 44 are each formed by (as) leaf spring shaped metal terminals that oppose one another. Specifically, each of the charging and discharging terminals 44 (i.e., the positive connection terminal 441 and the negative connection terminal 442) is configured with an inner side contact terminal 45 and an outer side contact terminal 46 arrayed (arranged) in parallel. The inner side contact terminal 45 and the outer side contact terminal 46 are (generally) R shaped such that the convexities of the R shapes face one another. Furthermore, the positive connection terminal 441 and the negative connection terminal 442 are configured as mutually symmetrical (complementary) structures. Specifically, as illustrated for only the reference numeral 442 (44) shown in FIG. 7, the inner side contact terminal 45 comprises: a support part 451 that extends upward from the circuit board 42, and a front contact part 453 and a rear contact part 454 that extend from the support part 451 in the front-rear directions. In addition, the front contact part 453 and the rear contact part 454 are formed in two levels in the up-down (vertical) direction. In addition, in the same manner, the outer side contact terminal 46 likewise comprises: a support part 461 that extends upward from the circuit board 42, and a front contact part 463 and a rear contact part 464 that extend from the support part 461 in the front-rear directions. In addition, the front contact part 463 and the rear contact part 464 are formed in two levels in the up-down direction, as shown for example, in FIG. 3. Namely, each of the charging and discharging terminals 44 (i.e., the positive connection terminal 441 and the negative connection terminal 442) is configured as a terminal that is electrically connectable to a plate shaped male external terminal by sandwiching the male external terminal from (on) both the left and right sides. Configuring (shaping) the charging and discharging terminals 44 in this manner makes it possible to have contacts at two points, one on each side, and thereby to increase contact conductivity.

The circuit board 42 is also provided with a remaining charge display apparatus 47 that displays an amount of remaining charge of the battery cells 33. The remaining charge display apparatus 47 is provided on a lower surface side of a front side end edge of the circuit board 42. The remaining charge display apparatus 47 comprises a display switch 48 and light emitting diode (LED) display parts 49. The display switch 48 is configured such that it can be pressed in toward the rear side and is attached to the lower surface side of the front side end edge of the circuit board 42 such that it is supported by the circuit board 42 itself. In addition, the four LED display parts 49 are likewise attached to the lower surface side of the front side end edge of the circuit board 42 such that they are supported by the circuit board 42 itself. When the display switch 48 is pressed, the circuit board 42 measures the amounts of remaining charge of the battery cells 33. The circuit board 42 executes a program (performs control) so as to turn on, in accordance with the measurement, any number, from one to four, of the four LED display parts 49. Specifically, if the battery cells 33 are in a (fully) charged state, the circuit board 42 turns on all four LEDs of the LED display parts 49. If the battery cells 33 are slightly reduced from the (fully) charged state, the circuit board 42 turns on three LEDs of the LED display parts 49, and if the battery cells 33 are reduced to about half of the (fully) charged state, the circuit board 42 turns on two LEDs of the LED display parts 49. If there is virtually no remaining charge in the battery cells 33, the circuit board 42 turns on one LED of the LED display parts 49.

Furthermore, the upper side case 23, which is discussed in greater detail hereinafter, is formed in correspondence with (complementary to) the configuration of the abovementioned display switch 48 and the LED display parts 49. That is, a portion (i.e., at the location of reference numeral 281) of the upper side case 23 at which the display switch 48 is disposed is formed of a soft (flexible and/or elastic) material that can be pushed in from the outside. In addition, the portions (i.e., locations of reference numerals 282) of the upper side case 23 at which the LED display parts 49 are disposed are formed of a transmissive (transparent or translucent) material through which the LED light can be transmitted to the outside when turned on. Thus, the display switch 48 and the LED display parts 49, which constitute the remaining charge display apparatus 47, are provided on the same front surface.

As shown in FIG. 3 and FIG. 4, a plurality (six) of the signal terminals 51 are provided between the abovementioned positive connection terminal 441 and negative connection terminal 442. These six signal terminals 51 are disposed near the rear ends of the positive connection terminal 441 and the negative connection terminal 442 and are disposed in parallel and are electrically connected to the circuit board 42. When the battery pack 10 is mounted to a mounting target (i.e., a tool main body, a specialized charger, or the like), these six signal terminals 51 are terminals for transmitting and receiving signals between the battery pack 10 and the mounting target. Each of these six signal terminals 51 is substantially U shaped in an upper surface view and has a contact shape that sandwiches a terminal from both the left and right sides. Namely, the signal terminals 51 comprise a support part 52, which extends upward from the circuit board 42, and contact parts 53, which are folded from the support part 52.

Figure 7:
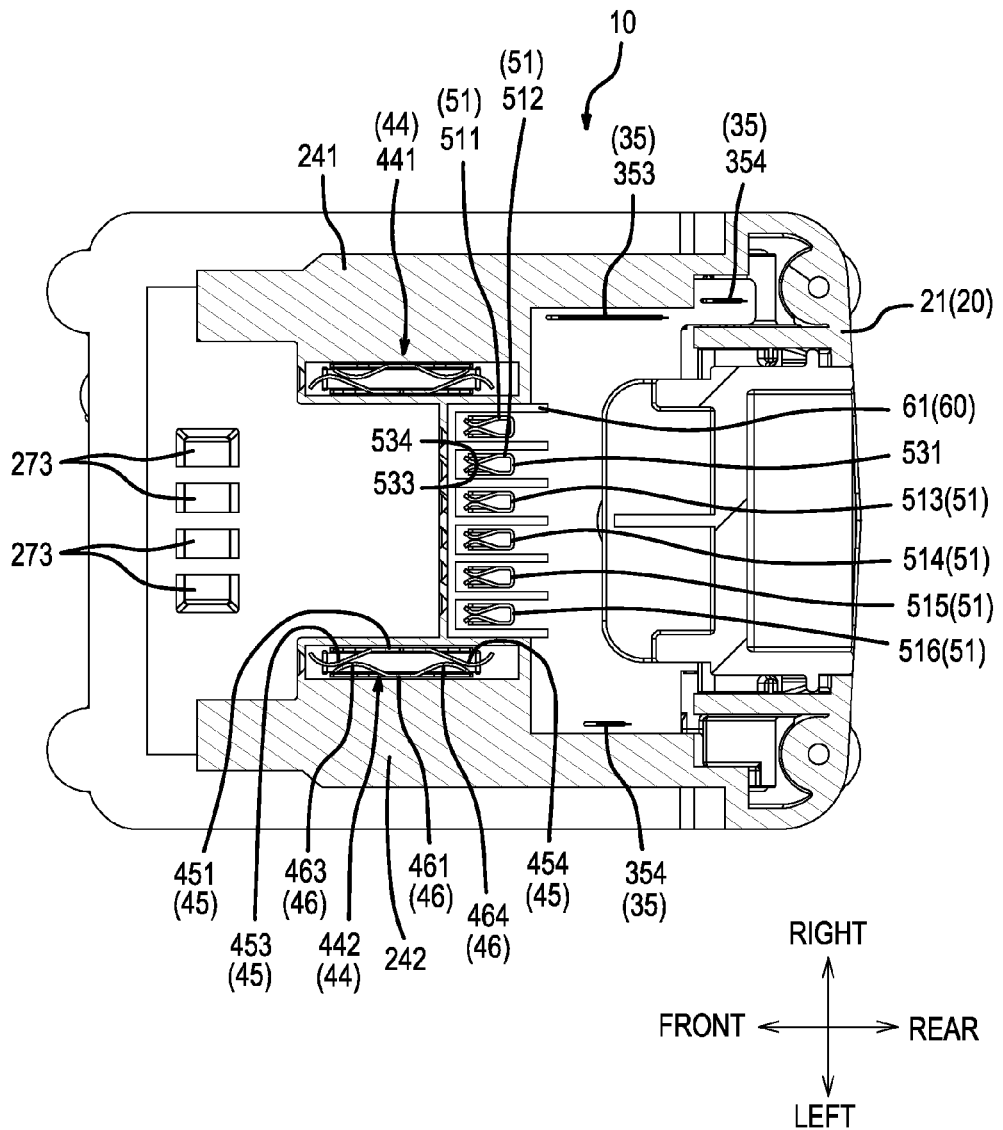
FIG. 7 is a cross sectional auxiliary view taken along the (VII)-(VII) line in FIG. 2.
Figure 8:
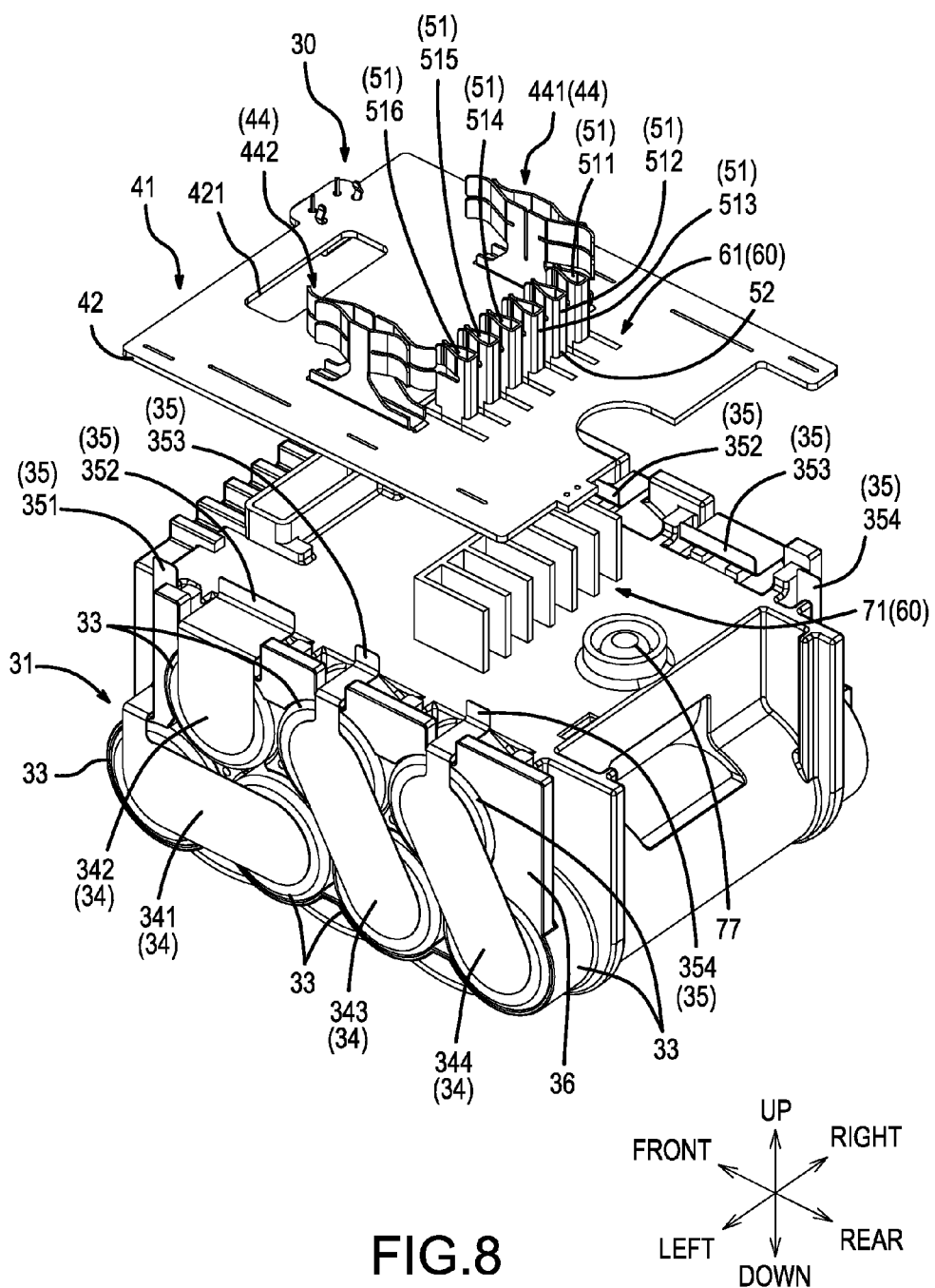
FIG. 8 is an oblique view that shows the battery main body from which a circuit board (i.e., a control unit) has been separated.

As illustrated only for reference numeral 512 (51) shown in FIG. 7, the contact part 53 is formed by being folded into a shape that is substantially U shaped in an upper surface view. Specifically, the second signal terminal 512 comprises a contact linking part 531 that extends upward from the support part 52, and contact parts 533, 534 that extend frontward from both the left and right sides of the contact linking part 531. The left side contact part 533 and the right side contact part 534 are R shaped and the convexities of the R shapes face one another. The left side contact part 533 and the right side contact part 534 approach one another increasingly closely in the direction from rear to front. In addition, the front ends of the left side contact part 533 and the right side contact part 534 face and contact one another. Furthermore, although corresponding reference numerals are omitted in the drawing, the other signal terminals (i.e., the first signal terminal 511, the third signal terminal 513, the fourth signal terminal 514, the fifth signal terminal 515 and the sixth signal terminal 516) are each configured in substantially the same manner as the second signal terminal 512.

Each of the signal terminals 51 is configured to be electrically connectable to a plate shaped male external terminal by sandwiching the male external terminal from (on) both the left and right sides. Configuring (shaping) the signal terminals 51 in this manner makes it possible to have contacts at two points, one on each side, and thereby to improve contact conductivity. Furthermore, each of the signal terminals 51 may be configured with a contact on only one side. For example, each of the signal terminals 51 may be configured such that one side is formed as a contact terminal that functions like a leaf spring and the other side is formed as a support part formed of a resin wall surface. A signal terminal formed in this manner enables the contact terminal to be made more compact, thereby reducing the size of the battery pack.

When the battery pack 10 is mounted to the mounting target, each of the abovementioned six signal terminals 51 is configured to transmit information to and receive information from the mounting target. Specifically, the first signal terminal 511 is a signal terminal that receives information related to the ON/OFF state of a main switch on the mounting target (i.e., including a tool main body, a specialized charger, and the like) side. The second signal terminal 512 is a signal terminal that transmits and receives information related to whether the battery pack 10 is mounted on the mounting target side. The third signal terminal 513 is a signal terminal through which the battery pack 10 receives information, such as a suitable parameter, related to the mounting target side. The fourth signal terminal 514 is a signal terminal that transmits information, such a suitable parameter, related to the battery pack 10 to the mounting target side. The fifth signal terminal 515 is a signal terminal that transmits information related to stopping the charging of the mounting target. The sixth signal terminal 516 is a signal terminal though which the battery pack 10 controls the ON/OFF state of a circuit on the mounting target side.

Furthermore, although not discussed in detail, the abovementioned six signal terminals 51 are arrayed (arranged or disposed) in parallel and spaced apart as much as possible so that they do not electrically connect to one another. In addition, the information transmitted to and received by the abovementioned signal terminals 51 is not limited to the details described above as long as it is suitable information related to the battery pack 10 or the mounting target or the like, and may be, for example, temperature information regarding the battery cells 33 supplied by a thermistor or the like built into the battery pack 10. In short, a plurality, namely, six, of the signal terminals 51 is provided for the purpose of transmitting and receiving information related to various functions and corresponds to a plurality of signal terminals according to the present disclosure. In addition, the abovementioned six signal terminals 51 have differing functional purposes and have a relationship corresponding to a first signal terminal and a second signal terminal according to the present disclosure. In addition, the abovementioned six signal terminals 51 also have a relationship corresponding to a first terminal and a second terminal according to the present disclosure, which are connected in parallel to a circuit board. Namely, the abovementioned six signal terminals 51, which are disposed in parallel, have a relationship corresponding to the second (i.e., signal) terminal according to the present disclosure with respect to the first (i.e., signal) terminal according to the present disclosure, and have a relationship of an "other (i.e., signal) terminal" that differs from a "one (i.e., signal) terminal," which are disposed parallel to one another.

The signal terminals 51 provided in this manner are terminals for transmitting and receiving information related to the battery pack 10. In addition, the signals transmitted and received via the signal terminals 51 are signals based on control process signals that are subject to control processing by the circuit board 42. The control process signals are information signals that are based on control processes performed (control algorithms executed) when charging and discharging the battery cells 33 and are generated by the circuit board 42.

A male hook mechanism 80 detachably latches with the mounting target when slid onto the mounting target and has a hook shape that latches with the mounting target and a finger catching shape that performs a releasing operation. Specifically, the male hook mechanism 80 comprises: a hook shaped structure 81 that has a hook shape and a finger catching shape, and an urging spring 85 that urges the hook shaped structure 81 in the latching direction. The hook shaped structure 81 comprises a hook part 82 and an operating part 83. The male hook mechanism 80 automatically latches the hook part 82 to a female portion of the mounting target in response to an urging force of the urging spring 85 that is generated by the sliding and thereby mounting to the mounting target. In addition, the hook part 82 is released from the female portion of the mounting target by an operation that lowers the operating part 83 against the urging force of the urging spring 85, and, in this state, the battery pack 10 can be slid relative to and thereby detached from the mounting target.

In the following, the outer packaging case 20 in which the abovementioned battery main body 30 is installed will be explained.

Figure 6:
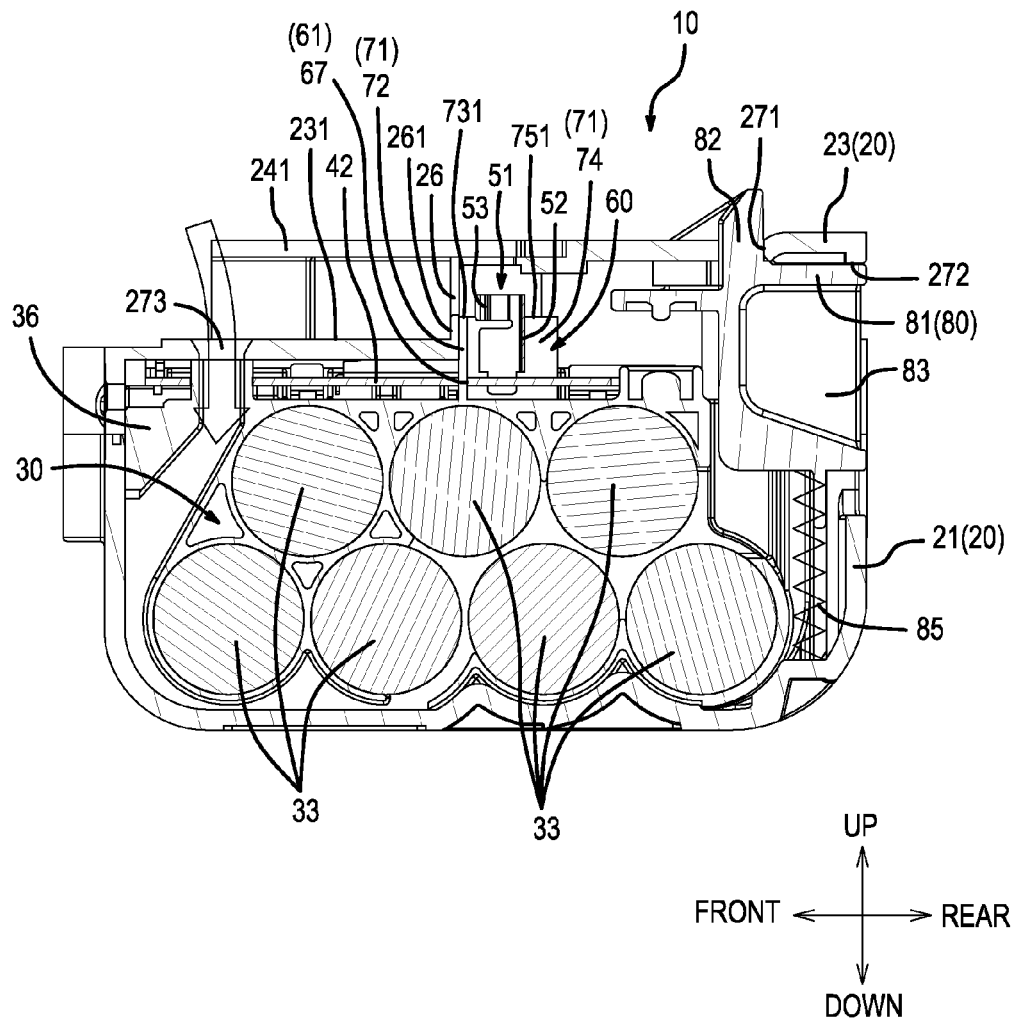
FIG. 6 is a cross sectional auxiliary view taken along the (VI)-(VI) line in FIG. 2.

As shown in FIG. 6, the battery main body 30 is housed inside the lower side case 21 of the outer packaging case 20. The lower side case 21 is substantially box shaped and has an open upper surface. The lower side case 21 is configured such that it can house the battery part 31 of the abovementioned battery main body 30. Specifically, the lower side case 21 has a depth that can accommodate the battery cells 33 arranged so that they form substantially two levels in the up-down direction. In this manner, the battery cells 33, which are stacked in the up-down direction in substantially two levels, are substantially housed in the lower side case 21. Furthermore, female screw holes 22 are provided in the lower side case 21 and penetrate (pass) through the lower side case 21 in the up-down directions. The outer packaging case 20 becomes a single (integral) body by screwing screws (not shown) through the female screw holes 22 and into screw bosses 232 of the upper side case 23.

In contrast, the circuit board 42, which is disposed on the upper side of the battery cells 33, protrudes upward from the upper surface of the lower side case 21. The control unit 41 of the battery main body 30 disposed in this manner is housed in the upper side case 23, as explained hereafter. Consequently, the control unit 41 of the battery main body 30 is disposed such that it protrudes from the upper surface of the lower side case 21 so as to be externally exposed. Here, the upper side case 23 is fixed by being screwed from the lower side to the lower side case 21 such that it is integrated with the lower side case 21 at the upper side of the lower side case 21. As shown in FIG. 5, the upper side case 23 has a box shape that is capable of housing the circuit board 42 that protrudes upward from the abovementioned lower side case 21. In other words, the upper side case 23 is formed into a shape that is substantially box shaped and whose lower surface is open. Furthermore, the screw bosses 232, which are for screw setting, are provided in the upper side case 23.

As shown in FIG. 1 and FIG. 2, the upper side case 23 constitutes the connection side of the outer packaging when the outer packaging case 20 is slid and thereby mounted to the mounting target. Consequently, intermediate portions of the upper side case 23 are provided with slide guide parts 241, 242 for guiding this sliding with respect to the mounting target, such as a tool main body. The slide guide parts 241, 242 are formed into flange shapes that project toward both the left and right sides and extend in the front-rear direction, which is the direction in which sliding, and thereby mounting, is possible. The slide guide parts 241, 242 form a pair, one on the left and one on the right, and thus are configured such that they are capable of guiding a sliding movement during mounting (connecting) of the battery pack 10 to the tool main body. Furthermore, a positioning (support) surface 231, along which the battery pack 10 slides when being mounted to the mounting target, is formed on the upper side case 23 and faces upward.

In addition, the upper side case 23 is formed such that, when the battery pack 10 is slid on and thereby mounted to the mounting target, the terminals on the mounting target side are electrically connected to the charging and discharging terminals 44 and the signal terminals 51. Although not particularly shown, the terminals on the mounting target side are formed as plate shaped male external terminals. Consequently, a plurality of slits (slots, channels or grooves) 25, 26 is provided in the upper side case 23. These slits 25, 26 are formed such that the plate shaped male external terminals are plugged into the slits 25, 26 and are thereby electrically connected to the charging and discharging terminals 44 and the signal terminals 51 provided to the circuit board 42. Specifically, the charging and discharging terminal slits 25, which are configured for connecting the abovementioned plate shaped male external terminals to the charging and discharging terminals 44, are provided on both the left and right sides of the upper side case 23. A positive terminal slit 251 is provided in the upper side case 23 such that the plate shaped male external terminal can be plugged into the positive connection terminal 441. In addition, a negative terminal slit 252 is provided in the upper side case 23 such that the plate shaped male external terminal can be plugged into the negative connection terminal 442. In addition, six of the signal terminal slits 26, which correspond to the signal terminals 51, are provided in the upper side case 23 such that the signal terminals 51 can connect to the plate shaped male external terminals on, for example, the specialized charger side. The signal terminal slits 26 are provided between the charging and discharging terminal slits 25 of the upper side case 23, which are arrayed (arranged) in parallel on both the left and right sides of the upper side case 23.

Furthermore, a slit stepped part 261 is formed at the lower parts of the signal terminal slits 26. The slit stepped part 261 is formed as a step wall structure between the positioning surface 231 and lower ends of the signal terminal slits 26. Furthermore, the slit stepped part 261 also functions as a wall that protrudes upward from the positioning surface 231. Namely, the step wall structure of the slit stepped part 261 makes it difficult for undesirable substances, such as water or dust, to adversely penetrate the signal terminal slits 26 from the positioning surface 231. Reducing the penetration (ingress) of undesirable substances in this manner increases the durability of the battery pack 10. Furthermore, a step wall structure like that of the slit stepped part 261 may also be provided to (on or at) the charging and discharging terminal slits 25 (i.e., the positive terminal slit 251 and the negative terminal slit 252). Depending on the structure of the terminals that are connected, the widths of the charging and discharging terminal slits 25 can be made larger. In such a case, if the step wall structure were provided to the charging and discharging terminal slits 25, a more remarkable effect could be expected. Furthermore, any suitable wall structure may be selected for such a step wall structure. For example, the step wall structure may be configured such that it is separated from the charging and discharging terminal slits 25; furthermore, any suitable step wall structure configuration can be selected as long as a relative (high/low) differential (height difference) with respect to the positioning surface 231 is created.

Operation status visualization parts 28 are provided in the upper side case 23 adjacent to the remaining charge display device(s) 47. Specifically, as shown in FIG. 1, the operation status visualization parts 28, which are respectively formed of thin walls made of resin, are formed in the upper side case 23 such that they correspond to the locations at which the display switch 48 and the LED display parts 49 are disposed. Namely, as mentioned above, the location of reference numeral 281 shown in FIG. 1 is formed of a soft (elastic) material that is capable of being pushed in from the outside (e.g., an elastic button), and the locations identified by reference numeral 282 shown in FIG. 1 are each formed of a transmissive (transparent or translucent) material through which the light of the corresponding LED, when turned on, can pass to the outside (e.g. an optically-transmissive barrier). In addition, as shown in FIG. 5, an operation notch part 283 is provided in the upper side case 23 and makes it possible to operate the display switch 48 from the outside.

In addition, a hook opening 271 and an operation opening 272 are provided in the upper side case 23. The hook opening 271 is an opening that allows the hook part 82 of the male hook mechanism 80 to protrude externally. The hook part 82, which protrudes from the hook opening 271, is configured to engage with a female part of an external power tool or specialized charger (not shown).

The operation opening 272 is an opening that makes it possible to externally expose the operating (moving) part 83 of the abovementioned male hook mechanism 80. A user can release the operating part 83 from the hook part 82 via the operation opening 272, the hook part 82 protruding externally from the hook opening 271. In addition, cell cooling ventilation ports 273, which are designed to permit cooling air to reach the battery cells 33 within the outer packaging case 20 during charging, are provided in the upper side case 23. Furthermore, air from the cell cooling ventilation ports 273 provided in the outer packaging case 20 passes through a ventilation opening 421 in the circuit board 42. Consequently, a draft of cooling air that passes through the cell cooling ventilation ports 273 and enters the interior of the outer packaging case 20 cools the circuit board 42 in addition to the battery cells 33.

Next, a terminal isolating (partitioning) structure 60 will be explained with reference to FIGS. 6-11. The terminal isolating structure 60 functions to isolate, separate or shield the adjacently disposed signal terminals 51 from one another and spaces apart the adjacently disposed first signal terminal and second signal terminal. The terminal isolating structure 60 comprises an isolating slit (gap) 61, which is the primary component of the terminal isolating structure 60, and a partition part 71, which is a secondary component of the terminal isolating structure 60.

Figure 11:
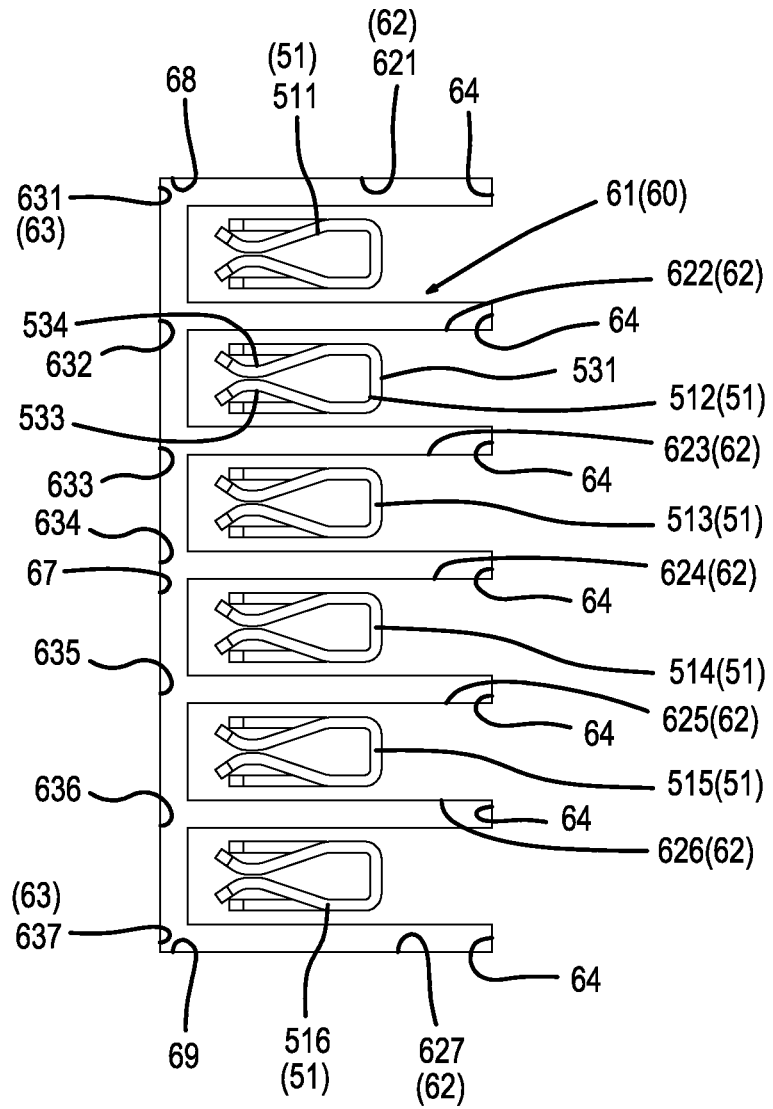
FIG. 11 is an enlarged plan view of isolating slits, viewed from the upper surface.

FIG. 11 is an enlarged plan view of the isolating slit 61, viewed from the upper surface. The isolating slit 61 penetrates (passes) through the circuit board 42 and comprises a plurality of interconnected separating slits 62 and a linking slit 67. One of the separating slits 62 is provided at each location adjacent to the abovementioned signal terminals 51. Namely, one of the separating slits 62 is provided both between each pair of the signal terminals 51 that are arrayed (arranged) in parallel and on the outer side of the signal terminals (511, 516) which are located at positions on both sides of the signal terminals 51. Consequently, a total of seven separating slits 62 is provided. The separating slits 62 are configured such that their penetration spacing (i.e., width) is approximately 1 mm and are formed as slits that penetrate through the circuit board 42 and extend in the front-rear direction. Specifically, a first separating slit 621 is provided on the right side of the first signal terminal 511, a second separating slit 622 is provided between the first signal terminal 511 and the second signal terminal 512, a third separating slit 623 is provided between the second signal terminal 512 and the third signal terminal 513, a fourth separating slit 624 is provided between the third signal terminal 513 and the fourth signal terminal 514, a fifth separating slit 625 is provided between the fourth signal terminal 514 and the fifth signal terminal 515, and a sixth separating slit 626 is provided between the fifth signal terminal 515 and the sixth signal terminal 516. In addition, a seventh separating slit 627 is provided on the left side of the sixth signal terminal 516. In so doing, the first through seventh separating slits 621-627 are provided at all locations adjacent to the first through sixth signal terminals 511-516.

The separating slits 62 are longer in the front-rear direction than the signal terminals 51, for example, approximately twice as long as the signal terminals 51. Consequently, front ends 63 of the separating slits 62 are located frontward of front ends of the signal terminals 51. In addition, rear ends 64 of the separating slits 62 are located rearward of rear ends of the signal terminals 51. In more detailed terms, the length by which the rear ends 64 of the separating slits 62 protrude from the rear ends of the signal terminals 51 is two or more times the length by which the front ends 63 of the separating slits 62 protrude from the front ends of the signal terminals 51. Furthermore, the length by which the rear ends 64 of the separating slits 62 protrude from the rear ends of the signal terminals 51 is a length that substantially coincides with a length that is slightly shorter than the length in the front-rear directions of the signal terminals 51.

In the seven parallel separating slits 62 (621-627), the front ends 63 (631-637) are lined up in the left-right direction, and the positions of the front ends 63 are also aligned in the front-rear direction. In addition, the rear ends 64 (641-647) are also lined up in the left-right direction, and the positions of the rear ends 64 are also aligned in the front-rear direction. Here, the front ends 63 (631-637) of the seven separating slits 62 (621-627) span the linking slit 67, which extends in the left-right directions. Namely, in the linking slit 67 a right end 68 is disposed rightward of the first signal terminal 511 and is linked with the front end 631 of the first separating slit 621. In addition, a left end 69 of the linking slit 67 is disposed leftward of the sixth signal terminal 516 and is linked with the front end 637 of the seventh separating slit 627. The linking slit 67 is configured such that its penetration spacing (i.e., width) is approximately 1 mm, and is formed as a slit (gap) that penetrates through the circuit board 42 and extends in the left-right direction.

As described above, providing the isolating slit 61 such that the separating slits 62 are linked with the linking slit 67 determines the positions at which the six signal terminals 51 (511-516) are supported. In other words, the seven separating slits 62 and the linking slit 67 separate the front side portions of terminal support parts of the circuit board 42, which respectively support the six signal terminals 51 (511-516), from the surrounding portion of the circuit board 42. In contrast, because the linking slit 67 is not provided on the rear ends 64 (641-647) side of the seven separating slits 62 (621-627), the rear side portions of the terminal support parts of the circuit board 42, which respectively support the six signal terminals 51 (511-516), are linked to the surrounding portion of the circuit board 42. Namely, due to the isolating slit 61, the terminal support parts of the circuit board 42 on which the signal terminals 51 (511-516) are provided, are linked to the surrounding portion only on the rear side, and therefore is supported only from the rear side in a cantilevered manner, i.e. a plurality of cantilevered portions are defined by the isolating slit 61. Stated differently, all of the signal terminals 51, which are arrayed (arranged) in parallel and connected to the circuit board 42, are supported by the circuit board 42 by virtue of being linked to the circuit board 42 in only one direction of four directions, namely, only rearward. Consequently, the signal terminals 51 are in a cantilevered support state.

Figure 10:
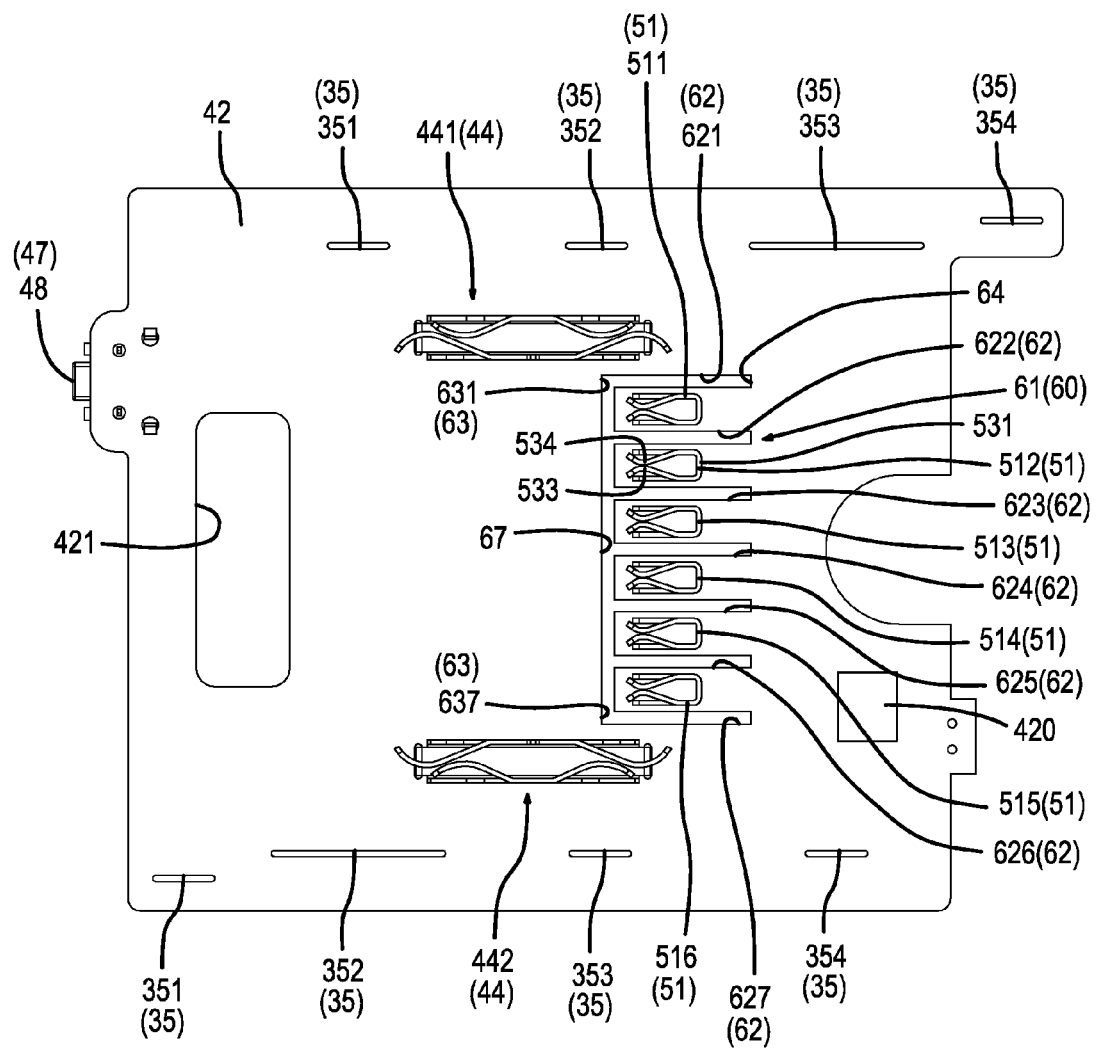
FIG. 10 is a plan view that shows the circuit board viewed from an upper surface.

Furthermore, the isolating slit 61, which has the abovementioned separating slits 62 and the linking slit 67, corresponds to a gap or slot through which the partition part 71 (i.e., an extension part) is inserted, as explained hereafter. The isolating slit 61 corresponds to the gap or slot through which upper ends 731, 751 (i.e., tips) of the partition part 71 according to the present embodiment pass. Furthermore, as shown in FIG. 10, the microcontroller 420 is disposed rearward of the signal terminals 51. Consequently, the distance between the microcontroller 420 and the signal terminals 51 can be made as short as practicable. Keeping the distance between the microcontroller 420 and the signal terminals 51 short provides the advantage that, for example, the wiring that connects them can be shortened, thereby improving wiring reliability.

Figure 9:
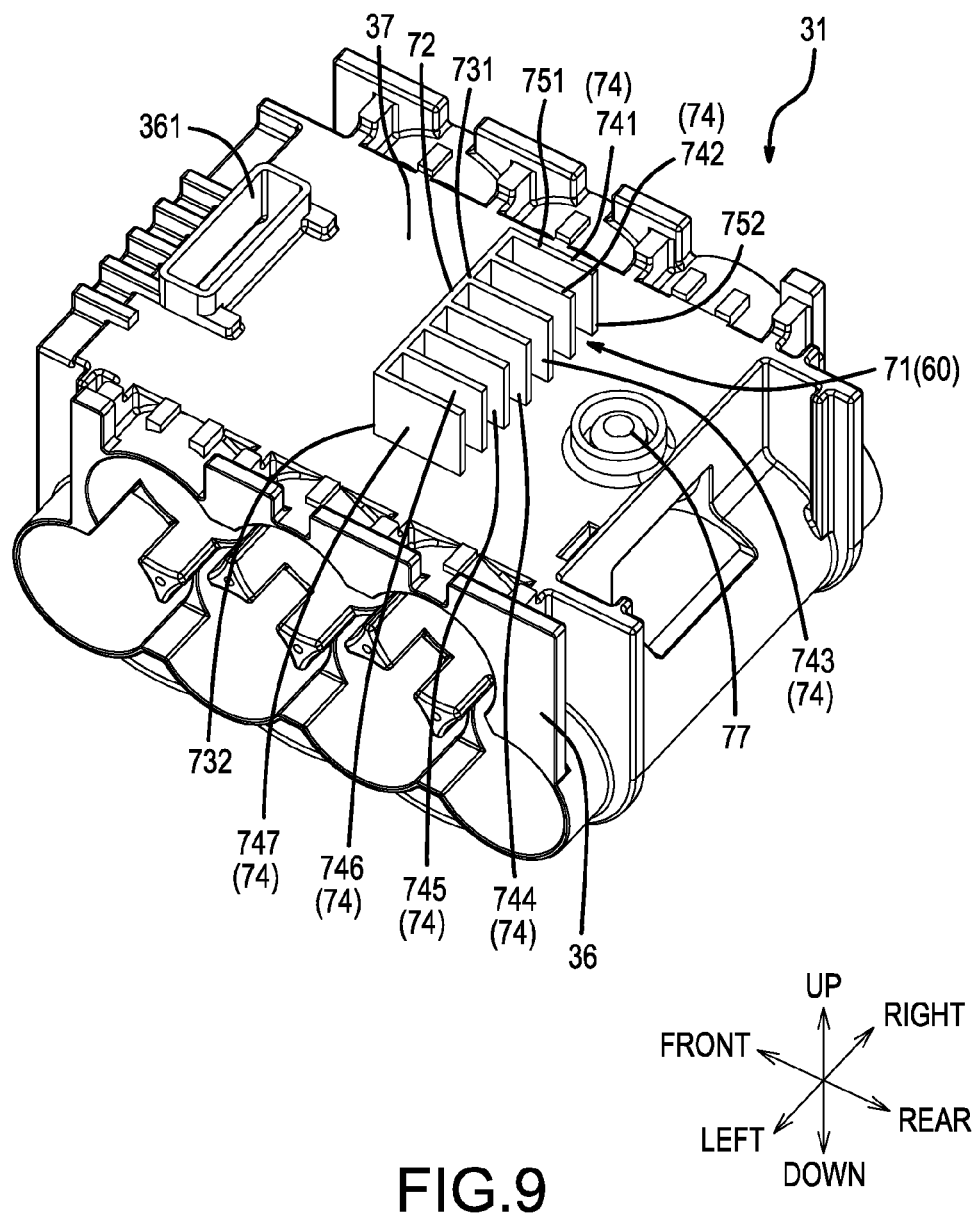
FIG. 9 is an oblique view that shows only a battery part of the battery main body from which the circuit board has been removed.

Next, the partition part 71 that is inserted through the abovementioned isolating slit 61 will be explained. The present partition part 71 corresponds to a representative extension part according to the present disclosure. The partition part 71 is a part of the abovementioned cell holder 36. As shown in FIG. 9, the partition part 71 is molded on an upper part surface 37 of the cell holder 36 such that it is integral with the cell holder 36.

The partition part 71 is thus supported by the cell holder 36 and a base end side of the partition part 71 is integral with the cell holder 36. In addition, the partition part 71 extends such that its upper end side, which constitutes a tip side, faces the circuit board 42 on the upper side. The partition part 71 is molded as part of the cell holder 36, which is formed of an electrically insulating resin material, and consequently the partition part 71, too, is electrically insulating. The partition part 71 is configured such that a wall structure with wall shaped compartments protrudes upward from the upper part surface 37 of the cell holder 36. Furthermore, the partition part 71 is inserted through the isolating slit 61 and thereby performs a partitioning function. Consequently, the compartment wall structure of the partition part 71 is molded by selecting a shape that corresponds (is complementary) to the isolating slit 61. Namely, like the isolating slit 61, the partition part 71 has a compartment wall structure wherein only one direction among four directions, namely, only rearward, is eliminated (omitted).

By providing the wall structure on the front side and on both of the left and right sides, the partition part 71 is formed in a U shape in an upper surface view. The partition part 71 thus spaces apart (separates or shields) each of the six parallel signal terminals 51 on both their left and right sides. In addition, the partition part 71 spaces apart (separates or shields) each of the six parallel signal terminals 51 on their front sides. That is, the partition part 71 is disposed on the front side of each of the six signal terminals 51. Specifically, the partition part 71 is provided such that it protrudes in the upward vertical direction, which is a direction orthogonal to the extension plane of the upper part surface 37 of the cell holder 36. The partition part 71 includes a front side partition part 72 and two-sided partition walls 74 that project in a front-rear direction and are individually disposed in a left-right direction. Reference numeral 77 shown in the figure is a screw used in assembling the cell holder 36.

The first separating slit 621 and the linking slit 67 are disposed between the first signal terminal 511 and the positive connection terminal 441. In this manner, the first signal terminal 511 and the positive connection terminal 441 are electrically separated (isolated) in a reliable manner by the first separating slit 621 and the linking slit 67. In addition, the seventh separating slit 627 and the linking slit 67 are disposed between the sixth signal terminal 516 and the negative connection terminal 442. In this manner, the sixth signal terminal 516 and the negative connection terminal 442 are electrically separated (isolated) from one another in a reliable manner by the seventh separating slit 627 and the linking slit 67. Due to this exemplary design, the electrical separation of the signal terminals 51 and the charging and discharging terminals 44 is made more reliable, which increases the transmission and reception reliability of the signal terminals 51.

The partition part 71 on the upper part surface 37 of the cell holder 36 is inserted through the isolating slit 61 in the circuit board 42. Specifically, the front side partition part 72 is configured such that it spaces apart (separates or shields) the signal terminals 51 in the front-rear directions. The front side partition part 72 is inserted through the abovementioned linking slit 67 such that the upper end 731 (i.e., the tip) of the front side partition part 72 (i.e., the extension part) penetrates (passes) through the linking slit 67 (i.e. the gap), and passes through the circuit board 42, and comes to be located on the upper side of the circuit board 42. Furthermore, a lower end 732 (i.e., a base end) of the front side partition part 72 is located on the lower side of the circuit board 42. In other words, the upper end 731 of the front side partition part 72, which has been inserted through the linking slit 67, is disposed on one side of the circuit board and the lower end 732 of the front side partition part 72 is disposed on the other side of the circuit board 42.

Similarly, the two-sided partition walls 74 (namely, two-sided partition walls 741, 742, 743, 744, 745, 746 and 747) space apart (separate or shield) the signal terminals 51 in the left-right direction. The two-sided partition walls 74 are inserted through the abovementioned separating slits 62. Namely, the upper ends 751 (i.e., the tip) of the two-sided partition walls 74 (i.e., the extension part) pass through the separating slits 62 (i.e., the gap) and penetrate through the circuit board 42, and come to be disposed on the upper side of the circuit board 42. At this time, lower ends 752 (i.e., the base ends) of the two-sided partition walls 74 are disposed on the lower side of the circuit board 42. The upper ends 751 of the two-sided partition walls 74, which are inserted through the separating slits 62, are disposed on the sides opposite to the sides of the lower ends 752 of the two-sided partition walls 74 that are disposed on the circuit board 42.

Furthermore, as mentioned above, the penetration spacing (i.e., the gap width) of the isolating slit 61 (i.e., the separating slits 62 and the linking slit 67) is approximately 1 mm; the plate thickness of the partition part 71 is approximately 0.8 mm. Consequently, a clearance of approximately 0.1 mm is provided between the walls of the partition part 71 and the isolating slit 61, and this makes it possible to easily insert the partition part 71 into and pull the partition part 71 out of the isolating slit 61.

The battery pack 10 explained above is capable of achieving the following operational effects. The battery pack 10 can, because of the presence of the front side partition part 72, prevent water from penetrating through the signal terminal slits 26 from the front side. It is thus possible to prevent water from adversely penetrating (leaking) into the interior of the battery pack 10. In addition, the isolating slit 61, which penetrates through the circuit board 42 and is provided in the circuit board 42 between the abovementioned signal terminals 51, spaces apart (isolates) the signal terminals 51 from one another. Thereby, even if water contacts the signal terminals 51, the isolating slit 61 spaces apart (isolates or separates) the signal terminals 51 from one another and can isolate any such water. Accordingly, it is possible to prevent the parallel (adjacent) signal terminals 51 from becoming electrically connected to one another by water in an adverse manner.

In addition, the upper ends 731, 751 of the partition part 71 penetrate through the isolating slit 61 and are disposed on the opposite side of the circuit board 42 from the lower ends 732, 752 of the partition part 71. Thereby, the partition part 71, which is provided on the cell holder 36, is disposed such that it protrudes from the upper surface side of the circuit board 42 and can function as a partition that spaces apart (shields or separates) the signal terminals 51 from one another. This helps to further bolster (improve) the separation of the terminals 51 from one another. Accordingly, even in the event that water gets in between the parallel signal terminals 51, the partition part 71 makes it possible to more reliably isolate that water, and thus makes it possible to more effectively prevent the signal terminals 51 from becoming electrically connected to one another in an adverse manner because of the presence of water.

In addition, in the circuit board 42, the front side and both the left and right sides of each of the terminal support parts that respectively support the signal terminals 51 are further isolated from the surrounding portion of the circuit board 42 by the isolating slits 62. That is, all the signal terminals 51 are supported by the circuit board 42 and linked to the circuit board 42 in only one direction of the four directions (front, rear, left, and right), namely, only rearward. The signal terminals 51 are thus in a quasi cantilevered support state and can oscillate in the up-down direction. Accordingly, when connecting a counterpart terminal to any of the signal terminals 51, any movement when the counterpart terminal is being connected can be flexibly tracked. This facilitates the electrical connection of the counterpart terminal to the signal terminal.

Furthermore, the terminal isolating structure 60 according to the abovementioned embodiment comprises the isolating slit 61 and the partition part 71. Nevertheless, a configuration may instead be adopted wherein the partition part 71 is eliminated and only the isolating slit 61 is provided. In such a case, the penetration spacing (i.e., the gap width) of the separating slits 62 may be set to one mm or greater, and any suitable penetration spacing may be adopted.

Second Embodiment

A second embodiment of a power tool battery pack of the present disclosure is explained below, with reference to FIG. 12 through FIG. 22. Furthermore, the second embodiment is a modified example of the first embodiment, elements corresponding to those of the first embodiment are assigned the same reference numerals in FIGS. 12-22, and explanations of many of these elements are omitted. The following discussion is directed principally to the structures and members that differ from those in the first embodiment.

Figure 12:
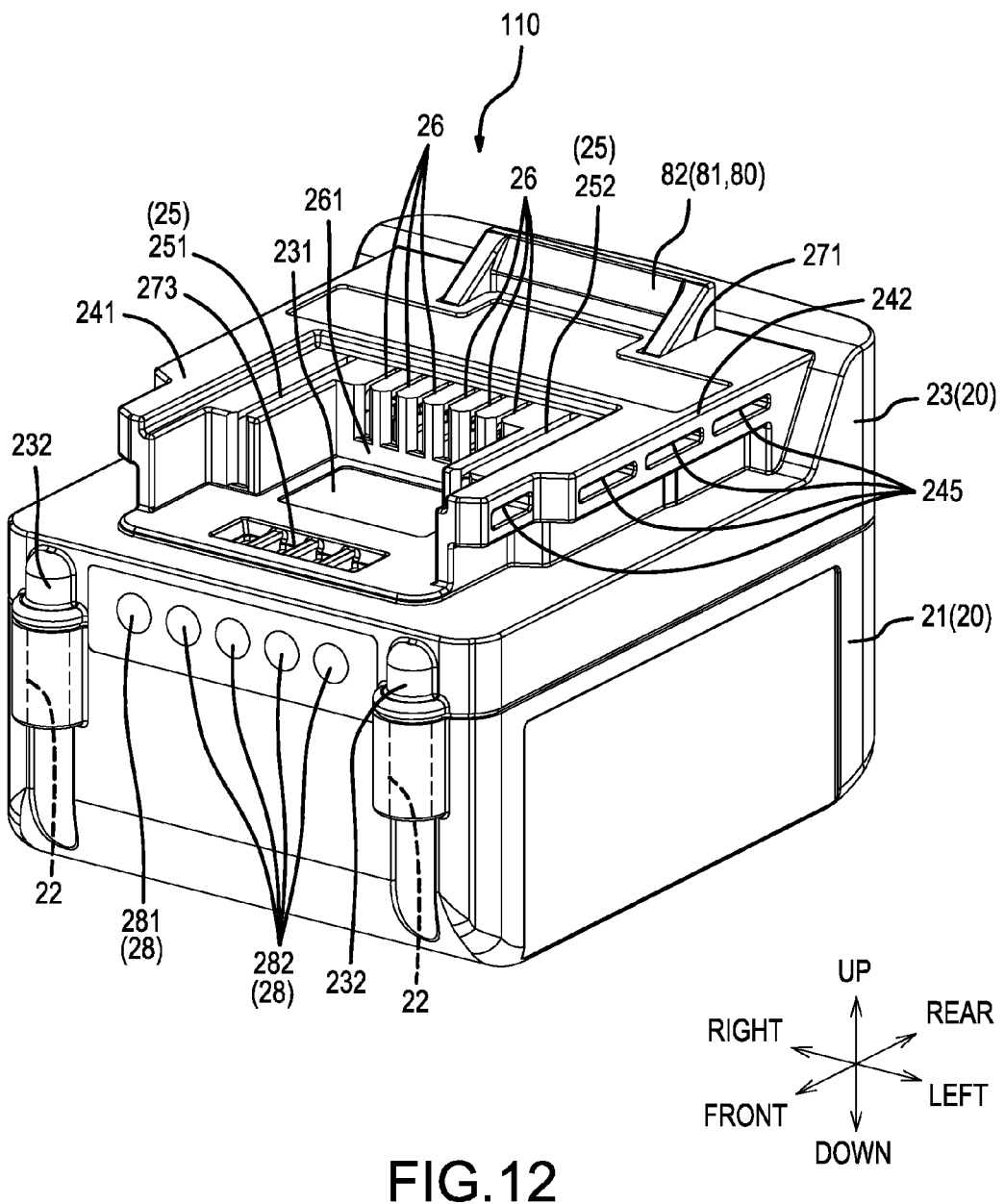
FIG. 12 is a front side external oblique view of the battery pack according to a second embodiment.
Figure 13:
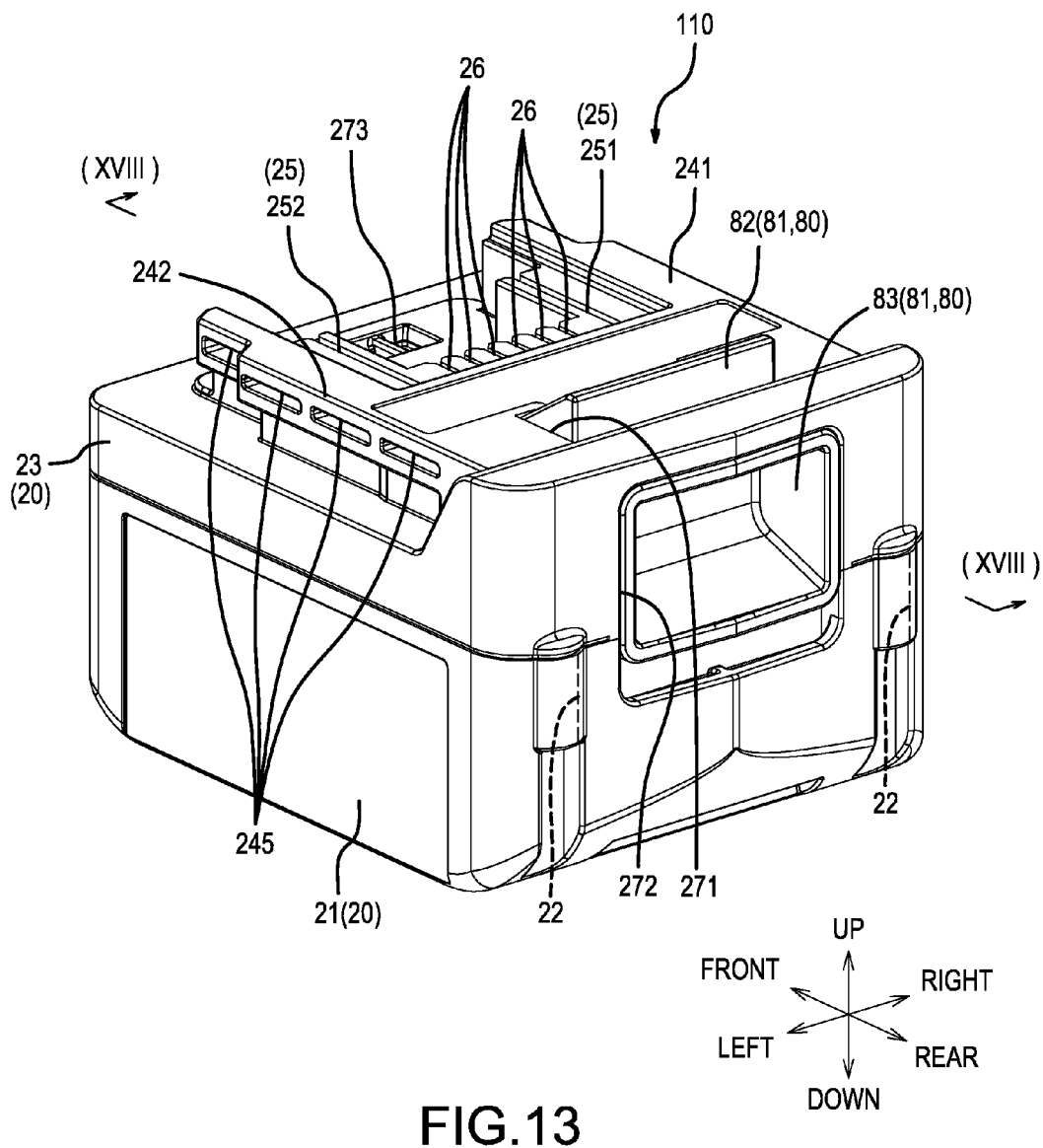
FIG. 13 is a rear side external oblique view of the battery pack in FIG. 12.
Figure 14:
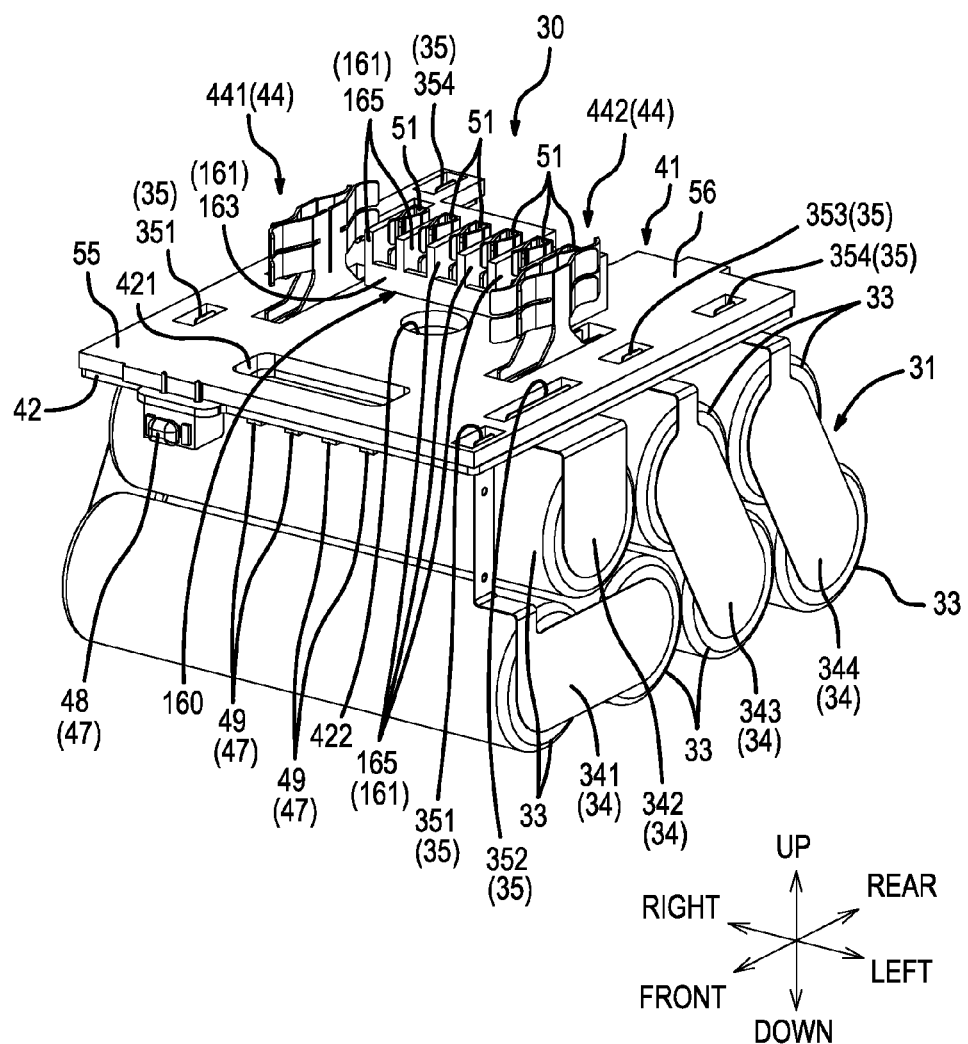
FIG. 14 is a front side oblique view of the battery main body of the battery pack in FIG. 12.
Figure 15:
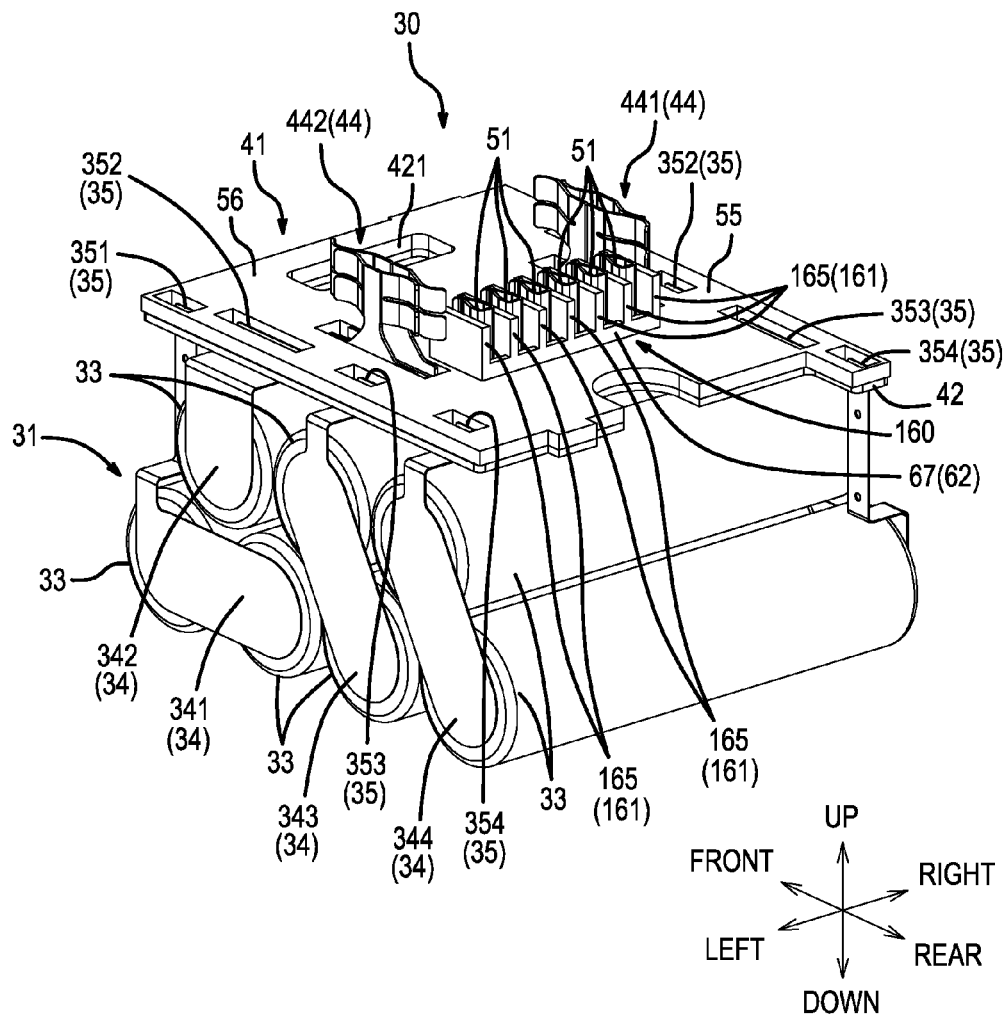
FIG. 15 is a rear side oblique view of the battery main body in FIG. 14.
Figure 16:
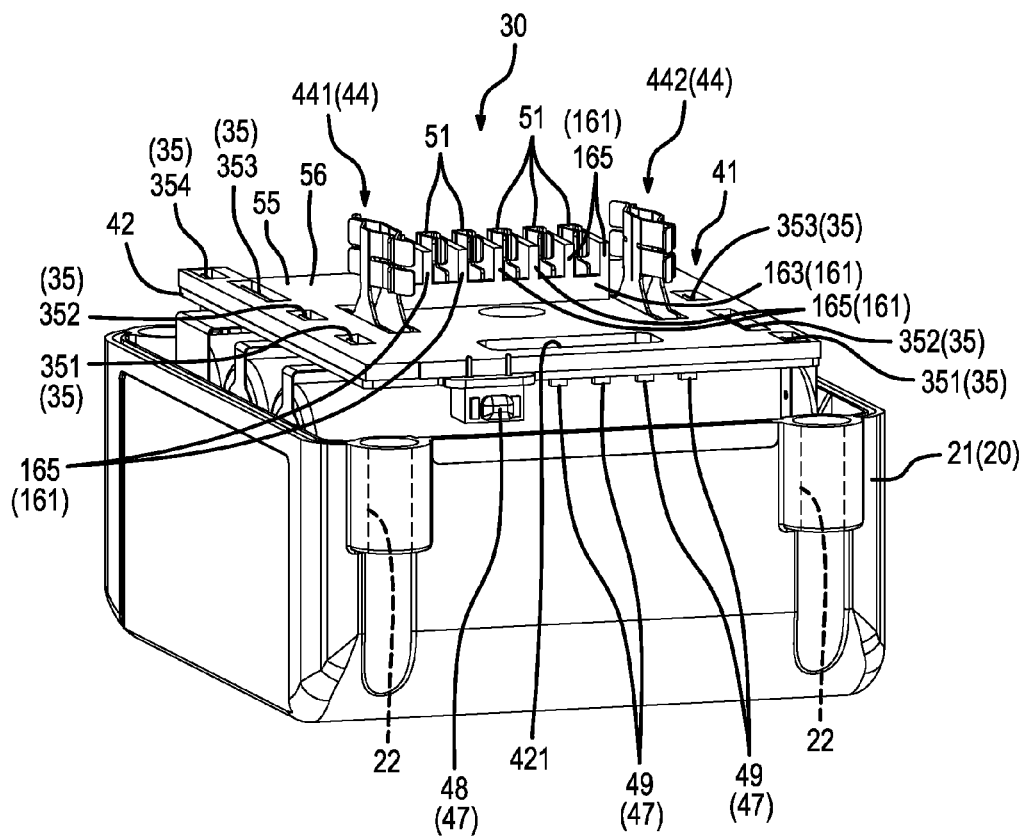
FIG. 16 is an oblique view that shows the battery main body installed inside a lower side case.
Figure 16:
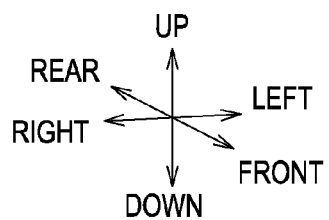
Figure 17:
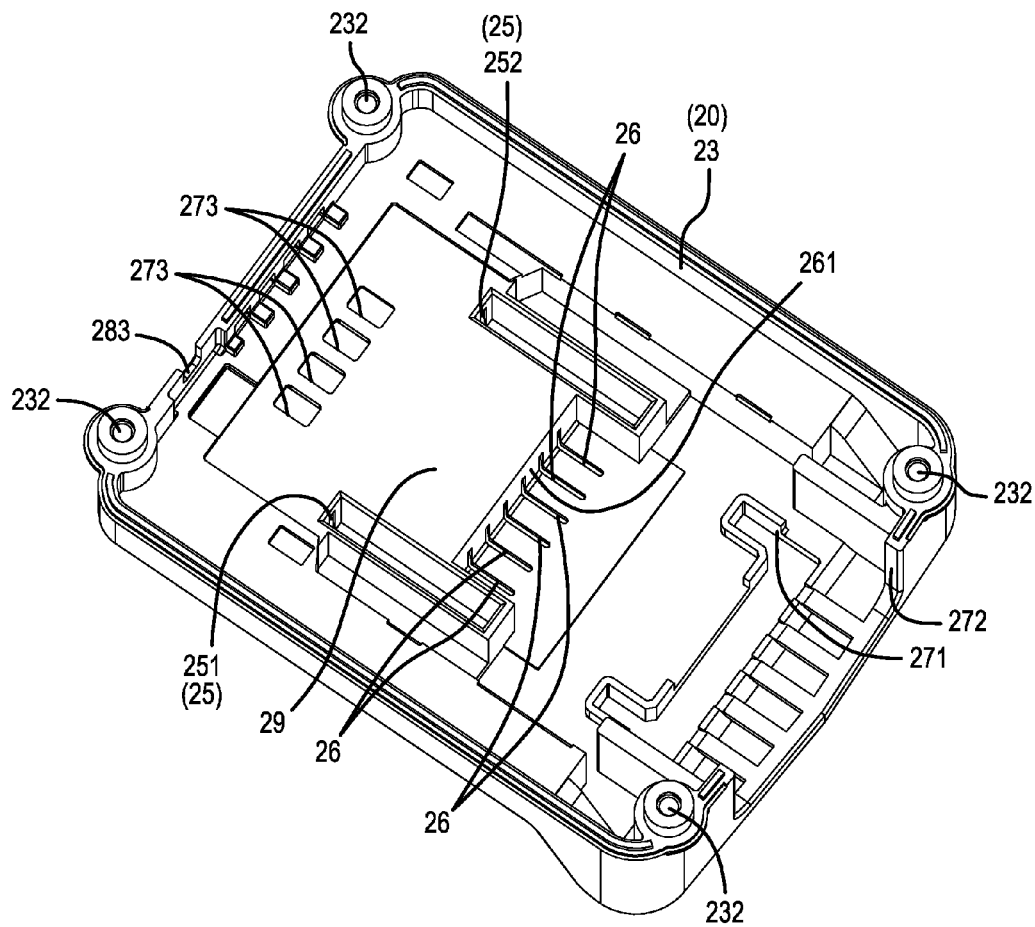
FIG. 17 is an oblique view that shows the interior of the upper side case.
Figure 17:
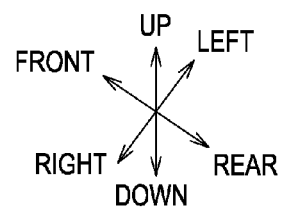
Figure 18:
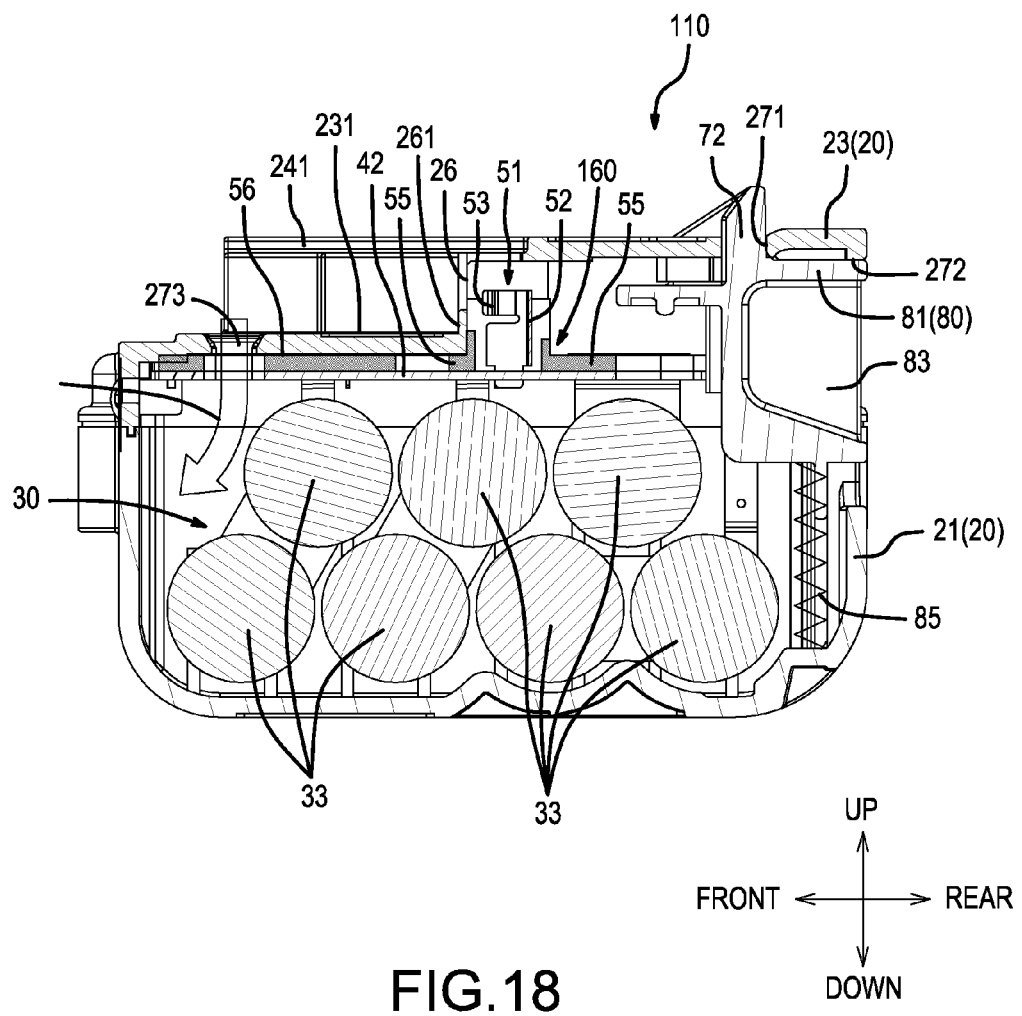
FIG. 18 is a cross sectional auxiliary view taken along the (XVIII)-(XVIII) line in FIG. 13.

As shown in FIG. 12 and FIG. 13, similar to the battery pack according to the first embodiment, a battery pack 110 according to the present embodiment substantially comprises an outer packaging case 20 and the battery main body 30 (see, for example, FIG. 14), which is installed inside the outer packaging case 20. The outer packaging case 20 functions as a casing that, while forming an outer packaging of the battery pack 110, is internally equipped with the battery main body 30. The outer packaging case 20 is configured with a structure that is split into an upper structure and a lower structure.

In addition, as in the first embodiment, intermediate portions of the upper side case 23 are provided with the slide guide parts 241, 242 for guiding the sliding movement of the battery pack 110 to the mounting target, such as a tool main body. The slide guide parts 241, 242 are flange-shaped and project toward both the left and right sides such that they extend in the front-rear direction, the direction in which sliding, and thereby mounting, takes place. The slide guide parts 241, 242 form a pair, one on the left and one on the right, as in the first embodiment. In the present embodiment, four hollow parts (slots) 245 are provided in each of the slide guide parts 241, 242. When the battery pack 10 is mounted to the power tool, the hollow parts 245 dampen the transmission of vibrations generated by the operation of the power tool to the battery cells 33. The four hollow parts 245 thus constitute a vibration damping structure.

Figure 19:
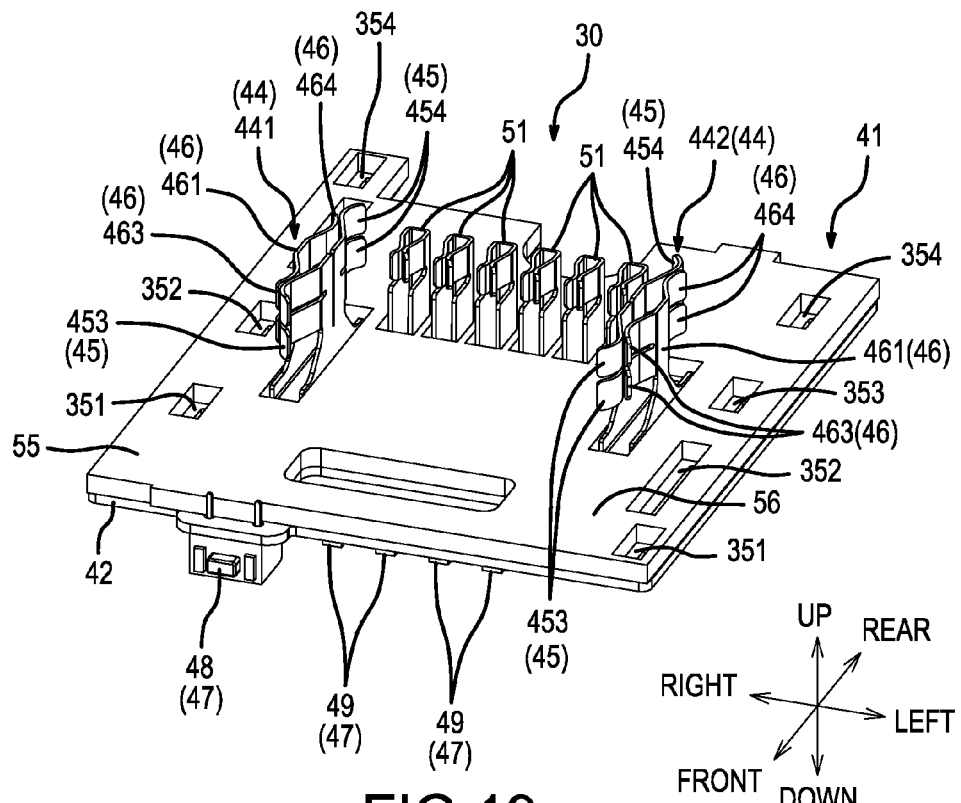
FIG. 19 is an oblique view that shows the configuration of the upper surface of the circuit board except for a partition part.
Figure 20:
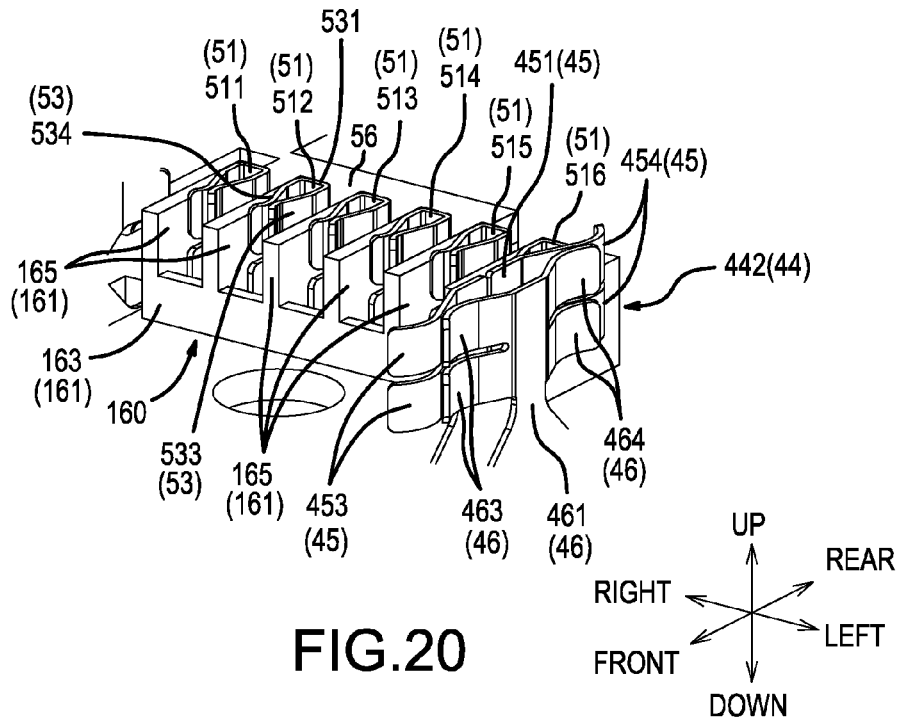
FIG. 20 is an enlarged oblique view that shows the signal terminals in FIG. 14 and the periphery thereof.

In addition, as shown in FIG. 19 and FIG. 20, a resin coating part 55, which protects the upper surface of the circuit board 42, is provided at the upper surface of the circuit board 42. The resin coating part 55 corresponds to a soft (elastic) material according to the present disclosure as well as to an insulating material according to the present disclosure. The resin coating part 55 is an elastic, soft resin material that is capable of contacting other structures in an airtight manner and is molded from an electrically insulating (isolating) resin material. The resin coating part 55 may be an elastic gum resin, such as, for example, an elastomer. Furthermore, any appropriate material can be selected as the resin coating part 55 as long as it is an electrically insulating material that, after being molded, provides electrical insulation and has sealing properties that enable airtight connections to be formed with other structures. For example, the resin coating part 55 may be molded by coating the upper surface of the circuit board 42 with a resin adhesive that has suitable electrically insulating properties and then drying the resin adhesive. If a resin adhesive is selected as the resin with which the resin coating part 55 is molded, then, even if the resin adhesive is soft, the resin adhesive should have a degree of softness (stiffness or linear elasticity) that elastically deforms only slightly when pressed, i.e. it should have a relatively high elastic modulus.

As shown in FIG. 19, the resin coating part 55 is provided substantially across the entire upper surface of the circuit board 42. Specifically, the resin coating part 55 is provided substantially over the entire upper surface of the circuit board 42, except at the locations of the charging and discharging terminals 44, the locations of the signal terminals 51, the connection locations 35 of the lead plates 34, the ventilation opening 421, and a screw opening 422. In addition, the resin coating part 55 is molded such that it corresponds to the shape of the upper side case 23. For example, the resin coating part 55 is molded with open shapes that correspond to the cell cooling ventilation ports 273 provided in the upper side case 23. Furthermore, although not particularly shown, the resin coating part 55 may be provided also on the lower surface of the circuit board 42. If the resin coating part 55 is also provided on the lower surface of the circuit board 42, waterproofing and dustproofing functions of the circuit board 42 can be increased.

Figure 22:
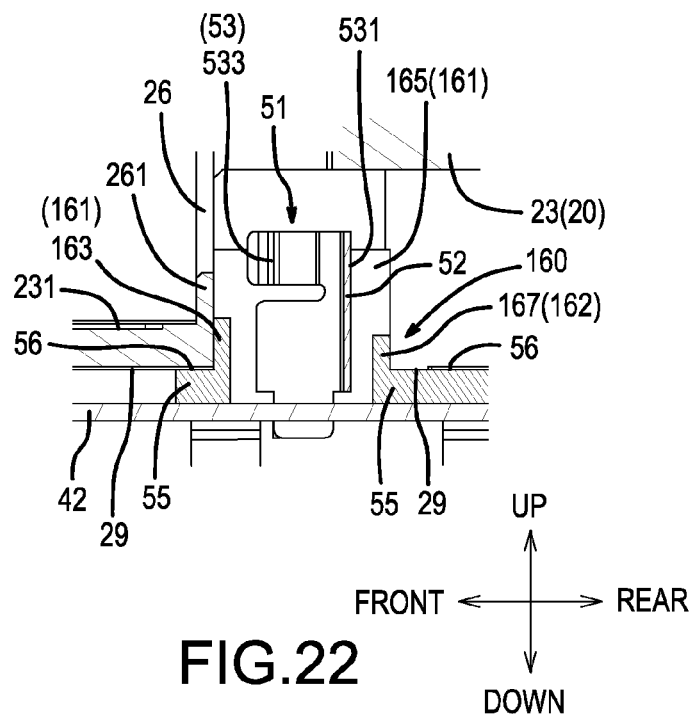
FIG. 22 is an enlarged cross sectional view that shows one of the signal terminals in FIG. 18 and the periphery thereof.
Figure 23:
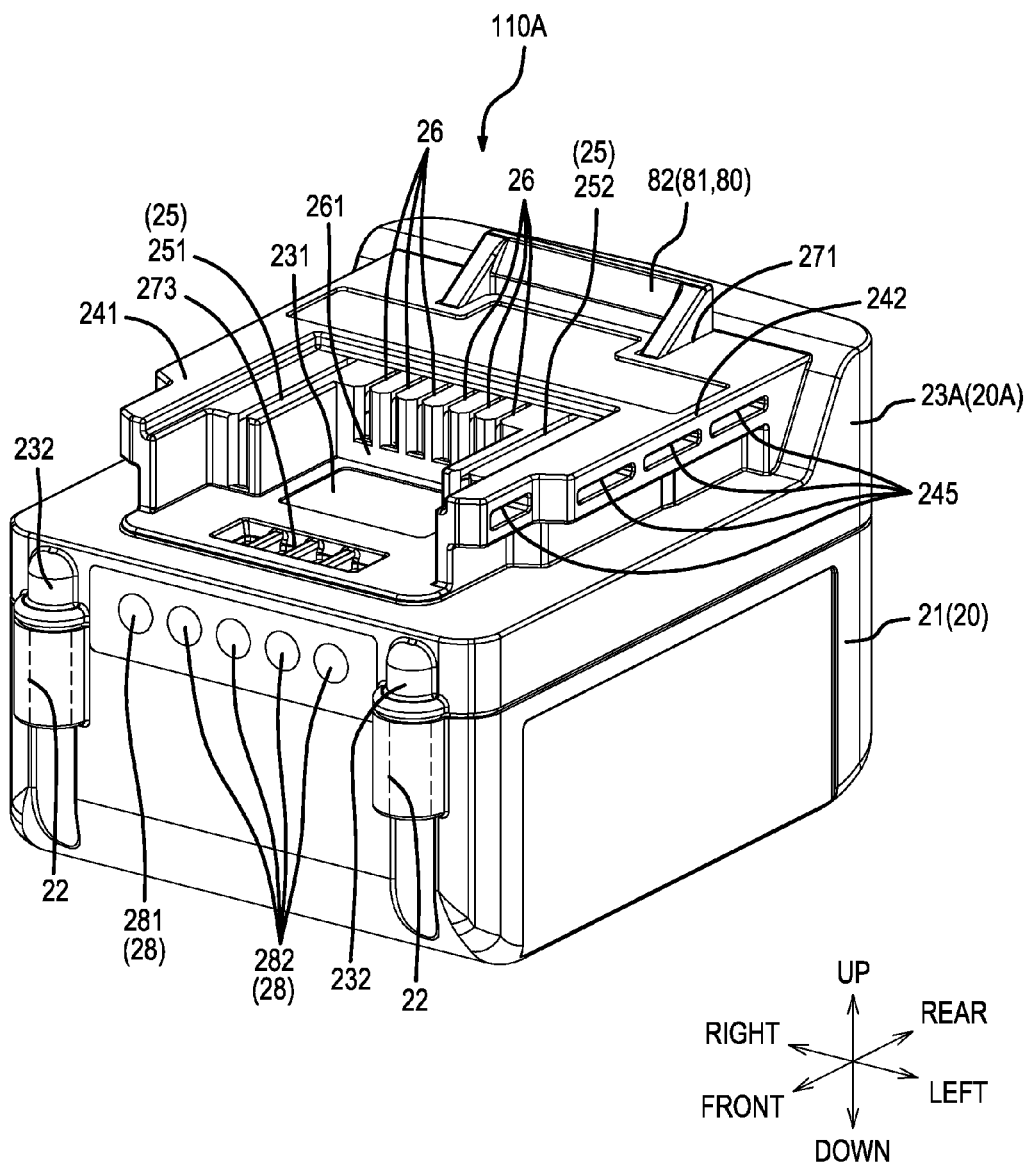
FIG. 23 is a front side external oblique view of the battery pack according to a third embodiment.
Figure 24:
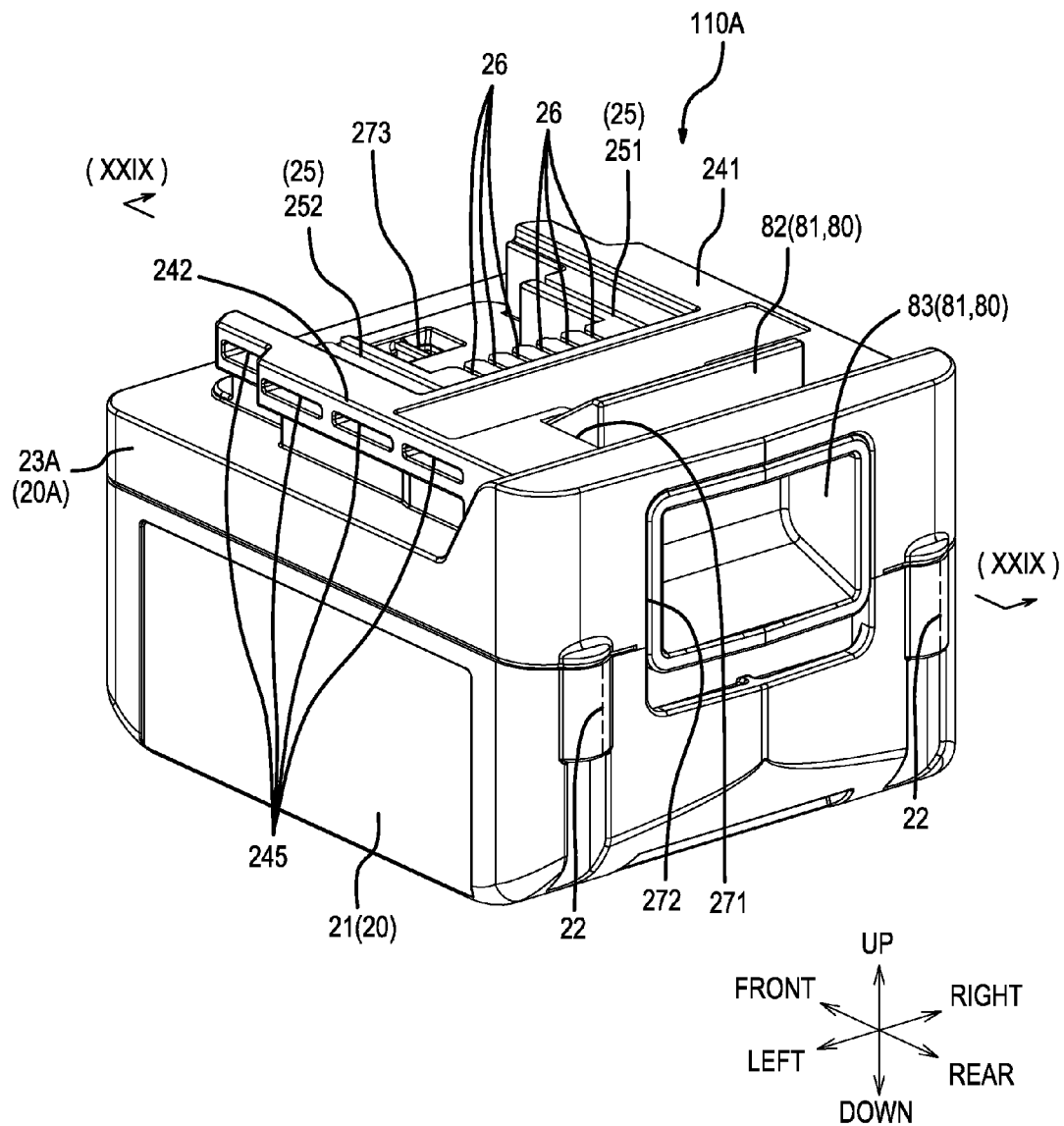
FIG. 24 is a rear side external oblique view of the battery pack in FIG. 23.
Figure 25:
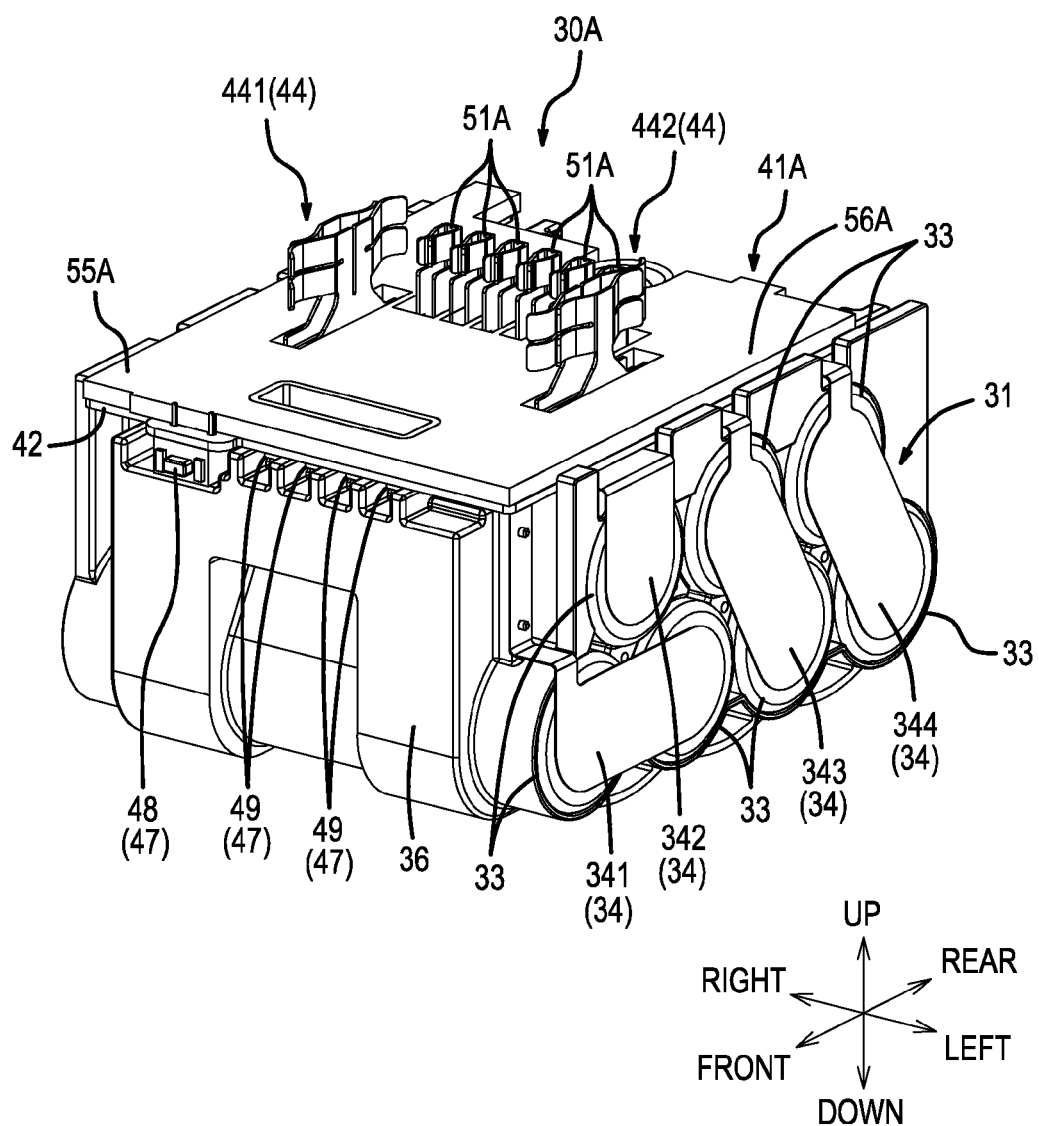
FIG. 25 is a front side oblique view of the battery main body of the battery pack in FIG. 23.
Figure 26:
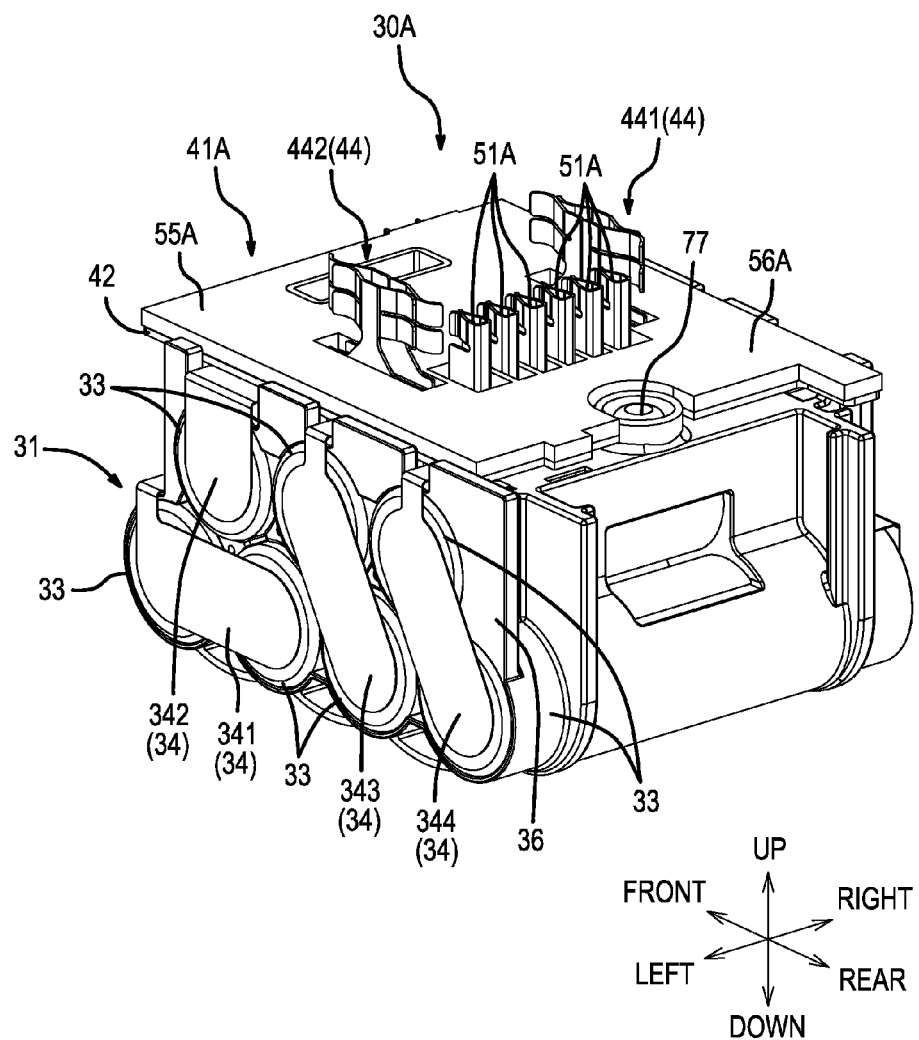
FIG. 26 is a rear side oblique view of the battery main body in FIG. 21.
Figure 27:
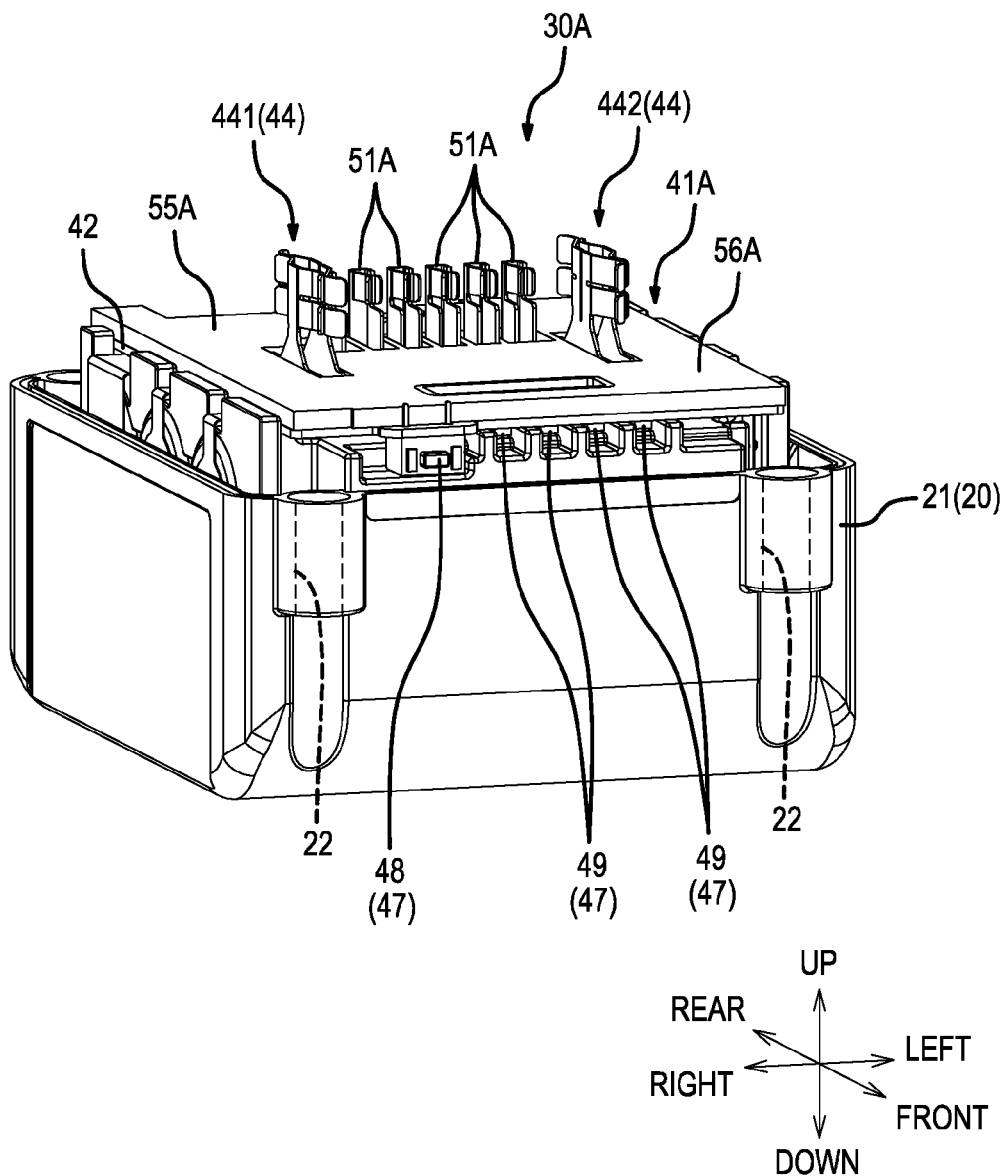
FIG. 27 is an oblique view that shows the battery main body installed inside the lower side case.

The resin coating part 55 is shaped so that it can contact the upper side case 23. Specifically, as shown in FIG. 22, an upper surface 56 of the resin coating part 55 contacts a lower surface 29 of the upper side case 23 such that it presses against the lower surface 29. Thus, the resin coating part 55 whose upper surface 56 contacts the lower surface 29 of the upper side case 23 is elastically deformed by the pressing force directed to the lower side of the upper side case 23. Therefore, the upper surface 56 of the resin coating part 55, which is elastically deformed, makes contact with the lower surface 29 of the upper side case 23 in an airtight manner. In other words, the upper surface 56 of the resin coating part 55 is sealed to the lower surface 29 of the upper side case 23. Furthermore, because the resin coating part 55 is molded by applying and then drying a resin adhesive that has electrically insulating properties as mentioned above, the upper surface 56 of the resin coating part 55, which is pressed against the lower surface 29 of the upper side case 23, deforms only slightly.

In addition, as shown for example in FIG. 20, a partition (extension) part 160 is provided on the resin coating part 55 according to the second embodiment. The partition part 160 corresponds to the terminal isolating (partitioning) structure 60 of the abovementioned first embodiment and is configured as a wall shaped compartment wall structure that protrudes upward from the upper surface 56 of the abovementioned resin coating part 55. The partition part 160 is formed integrally with the abovementioned resin coating part 55. Consequently, a resin material is selected for the partition part 160 that is identical, substantially identical or complementary to (compatible with) the resin material with which the resin coating part 55 is molded, namely, an electrically insulating resin material that is softer than the circuit board 42, the outer packaging case 20, and the like. The partition part 160 spaces apart (shields or separates) the six parallel signal terminals 51 to the front, rear, left, and right and protrudes from the upper surface 56 of the resin coating part 55 in the upward vertical direction, which is a direction orthogonal to the extension plane of the upper surface 56. The partition part 160 is molded into a wall shape and comprises: a high (long) partition part 161 that is provided in three directions, namely, frontward and both leftward and rightward directions and an auxiliary low (short) partition part 162 that is provided in one direction, namely, rearward.

Figure 21:
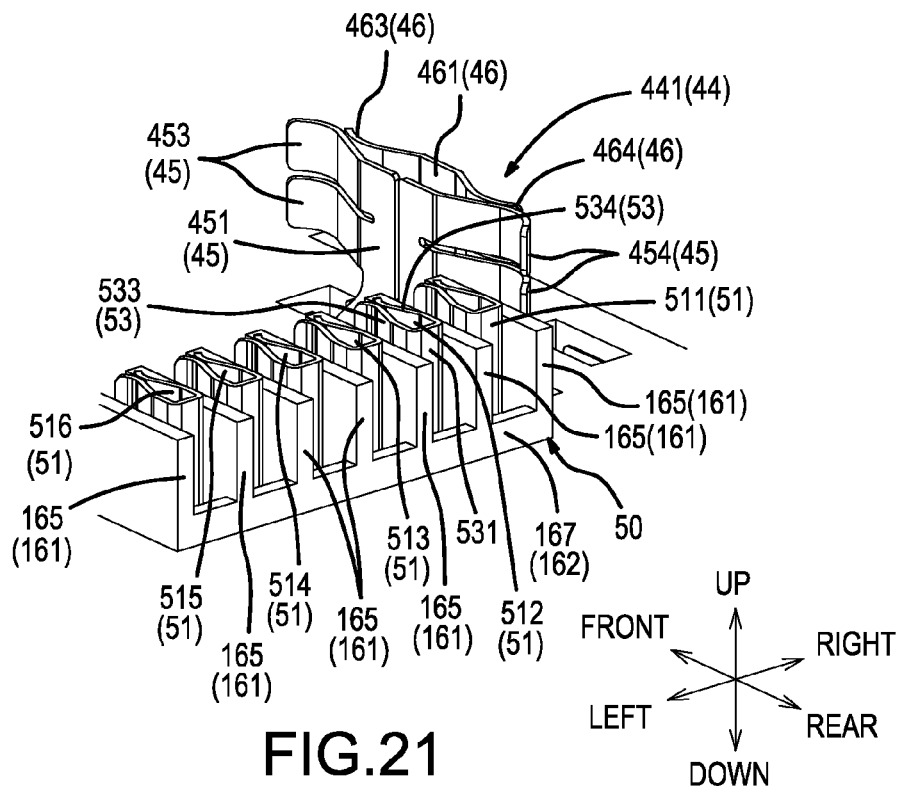
FIG. 21 is an enlarged oblique view that shows the signal terminals in FIG. 15 and the periphery thereof.

The high partition part 161 comprises: a front side partition part 163 that performs a spacing (separating or isolating) function in the front-rear direction and two-sided partition walls 165 that perform a spacing (separating or isolating) function in the left-right directions. As shown in FIG. 20 and FIG. 21, the front side partition part 163 is provided on the front side of the signal terminals 51, that is, on the base end side (i.e., the front side) along the terminal connection direction of the signal terminals 51. The front side partition part 163 is molded such that it extends in a direction that intersects the terminal connection direction of the signal terminals 51.

The front side partition part 163 is completely linked and is present on the front side of all the signal terminals 51, namely, the first signal terminal 511 through the sixth signal terminal 516, which are arrayed (arranged) in parallel in the left-right directions. Furthermore, the height of the front side partition part 163 is selected such that it corresponds to the signal terminal slits 26 through which the plate shaped male external terminals that connect to the signal terminals 51 are received. Namely, the height of the front side partition part 163 is selected such that the front side partition part 163 cannot enter the penetration area of the abovementioned signal terminal slits 26. Specifically, as shown in FIG. 22, the height of the front side partition part 163 is selected such that it overlaps the slit stepped part 261 formed at the lower ends of the signal terminal slits 26. Namely, the upper end position of the front side partition part 163 is lower than the upper end position of the slit stepped part 261. Furthermore, the height of a rear side partition part 167, which is explained later, is selected to be lower than the height of the front side partition part 163. In this regard, the length by which the front side partition part 163 protrudes upward is selected such that it slightly exceeds the plate thickness of the upper side case 23.

In contrast, the two-sided partition walls 165 are provided between each of the terminals (contacts) from the first signal terminal 511 through the sixth signal terminal 516 as well as on the outer sides of the first signal terminal 511 and the sixth signal terminal 516. A total of seven of the two-sided partition walls 165 are provided. The length of the two-sided partition walls 165 in the front-rear direction is greater than the length of the signal terminals 51 in the front-rear direction. Specifically, the front ends of the two-sided partition walls 165 are selected such that they are located frontward of the front ends of the signal terminals 51. The rear ends of the two-sided partition walls 165 are selected such that they are located rearward of the rear ends of the signal terminals 51. Consequently, the length of the two-sided partition walls 165 in the front-rear directions is substantially twice the length of the signal terminals 51 in the front-rear direction. In addition, the length of the two-sided partition walls 165 in the up-down direction is greater than the length of the front side partition part 163 in the up-down direction, and is shorter than the length of the signal terminals 51 in the up-down direction. Consequently, the upper end positions of the two-sided partition walls 165 are lower than the upper end positions of the signal terminals 51. Furthermore, the upper end positions of the two-sided partition walls 165 are higher than the upper end positions of the slit stepped part 261.

The low partition part 162 is defined by the rear side partition part 167, which provides a spacing (separating or isolating) function in the front-rear direction. The rear side partition part 167 is located rearward of the signal terminals 51, as shown in FIG. 9 and FIG. 11, and is completely linked such that it exists on the rear side of all the terminals from the first signal terminal 511 through sixth signal terminal 516. Furthermore, the height of the rear side partition part 167 is lower than the height of the abovementioned front side partition part 163.

Incidentally, when the upper side case 23 is attached (joined) to the lower side case 21 to form the battery pack 110, the abovementioned partition part 160 is shaped so that it contacts the upper side case 23 in the front-rear direction. That is, the front side partition part 163 is configured to contact a rear side surface of the slit stepped part 261 of the upper side case 23. In addition, the rear side partition part 167 is configured to contact a front side surface of the internal shape of the upper side case 23 in the front-rear direction.

The abovementioned battery pack 110 is capable of achieving the following operational effects. First, the resin coating part 55 is provided at or on the circuit board 42. The resin coating part 55 is molded of a soft material that is elastic and capable of contacting the upper side case 23 in an airtight manner, and is molded into a shape that is capable of contacting the upper side case 23. In addition, the front side partition part 163 and the two-sided partition walls 165, which are provided on the resin coating part 55, can serve to space apart (shield or isolate) the parallel signal terminals 51 from one another. Thereby, even if water contacts the signal terminals 51, the front side partition part 163 and the two-sided partition walls 165, which space apart the signal terminals 51 from one another, can isolate that water and prevent it from electrically shorting (connecting) the signal terminals 51 together. Accordingly, it is possible to prevent the signal terminals 51 from becoming adversely electrically connected to one another via that water. Furthermore, because the connection locations 351-354 at which the lead plates 34 are connected in the circuit board 42 are also isolated by the resin coating part 55, it is also possible to prevent the connection locations 351-354 from being electrically connected to one another.

Third Embodiment

Next, a battery pack 110A according to a third embodiment, which is a modified example of the battery pack 110 of the abovementioned second embodiment, will be explained, with reference to FIG. 23 through FIG. 30. Furthermore, except for the arrangement and configuration of the partition part 160, the battery pack 110A of the third embodiment is configured substantially the same as the battery pack 110 of the abovementioned second embodiment. The battery pack 110A of the third embodiment differs in the arrangement and configuration of the partition part 160 from the battery pack 110 of the abovementioned second embodiment. Consequently, in the explanation below, emphasis will be given to the arrangement and configuration of a partition part 160A in the battery pack 110A of the third embodiment. Elements of the battery pack 110A of the third embodiment that are configured identically to those in the battery pack 110 of the abovementioned second embodiment are assigned identical reference numerals in the drawings, and explanations thereof are omitted. In addition, the battery pack 110A of the third embodiment achieves substantially the same effects as the battery pack 110 of the abovementioned second embodiment. With regard to constituent elements that differ between the second and third embodiments, the same reference numeral may be assigned to those different elements in the drawings with the letter "A" appended.

Figure 28:
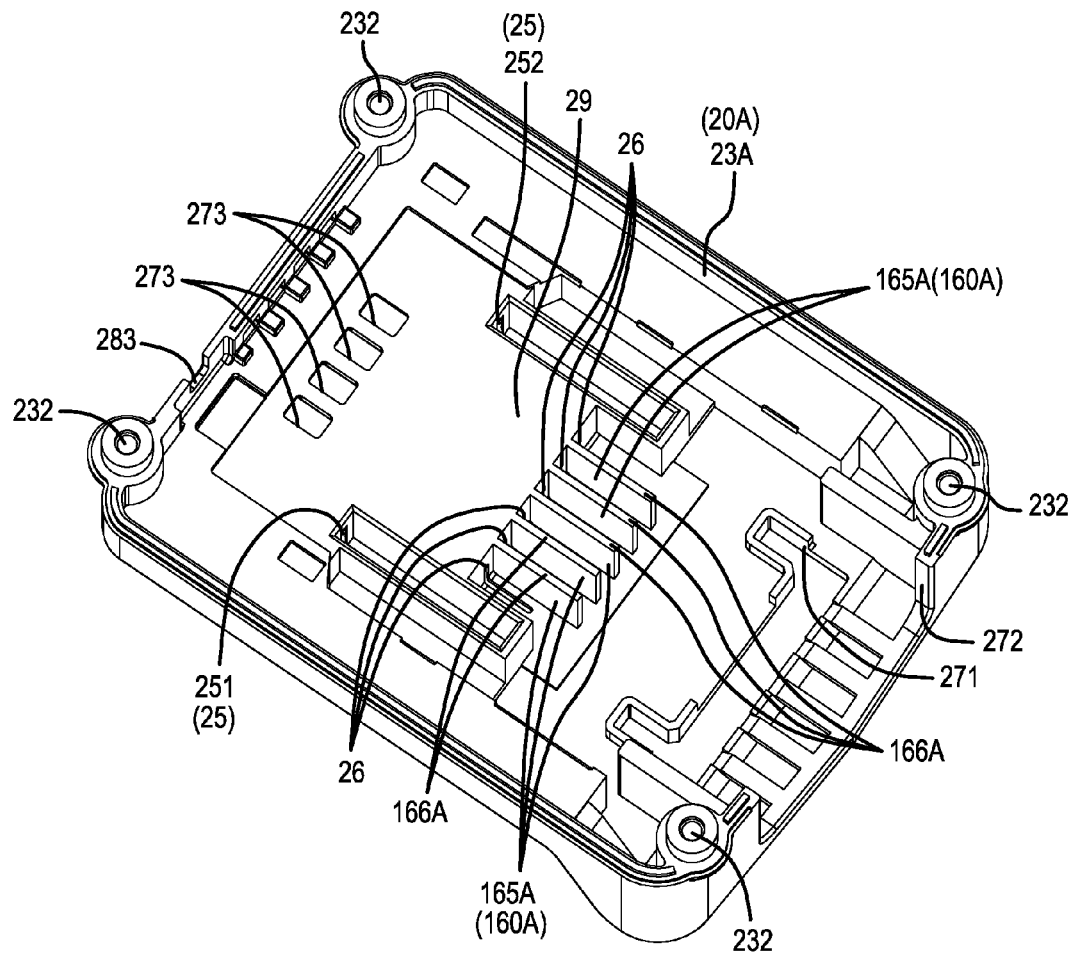
FIG. 28 is an oblique view that shows the interior of the upper side case.
Figure 28:
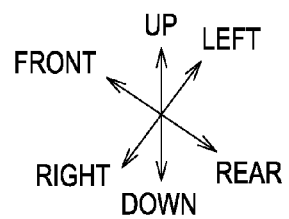
Figure 29:
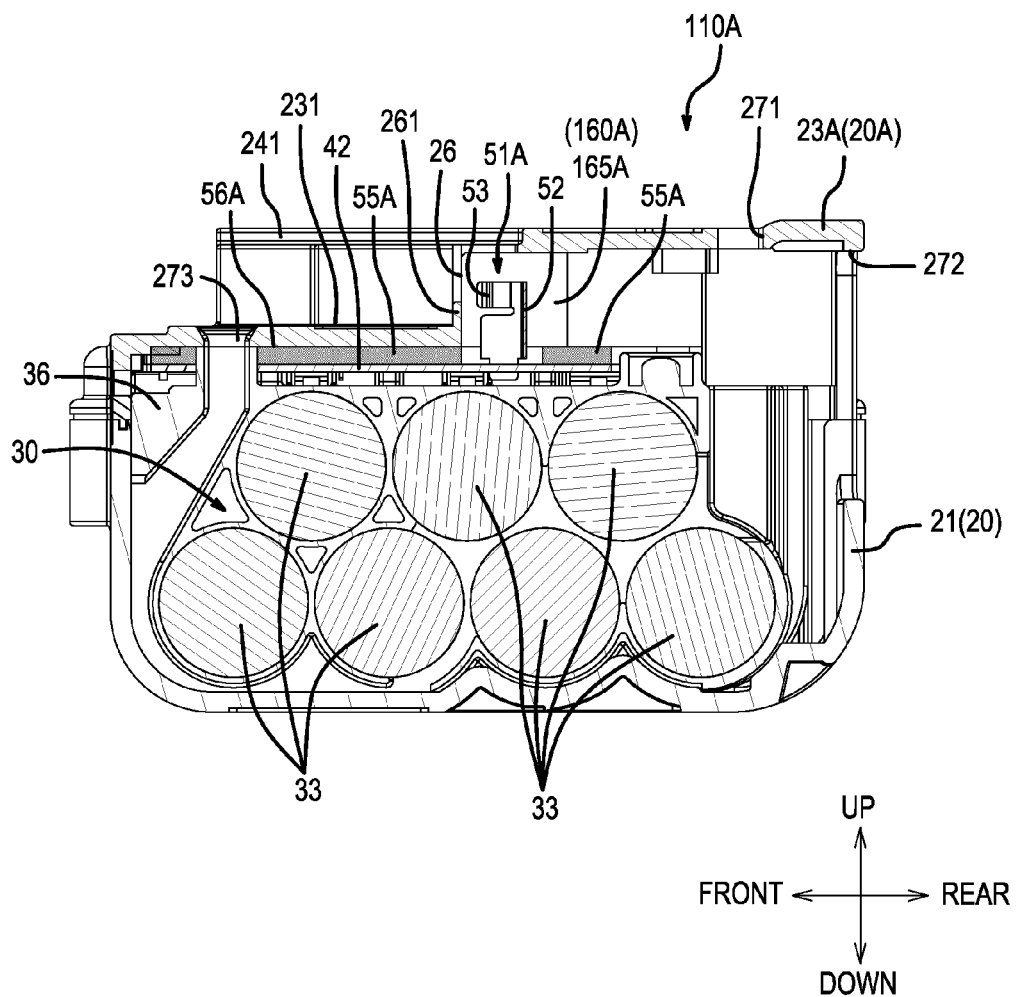
FIG. 29 is a cross sectional auxiliary view taken along the (XXIX)-(XXIX) line in FIG. 24.
Figure 30:
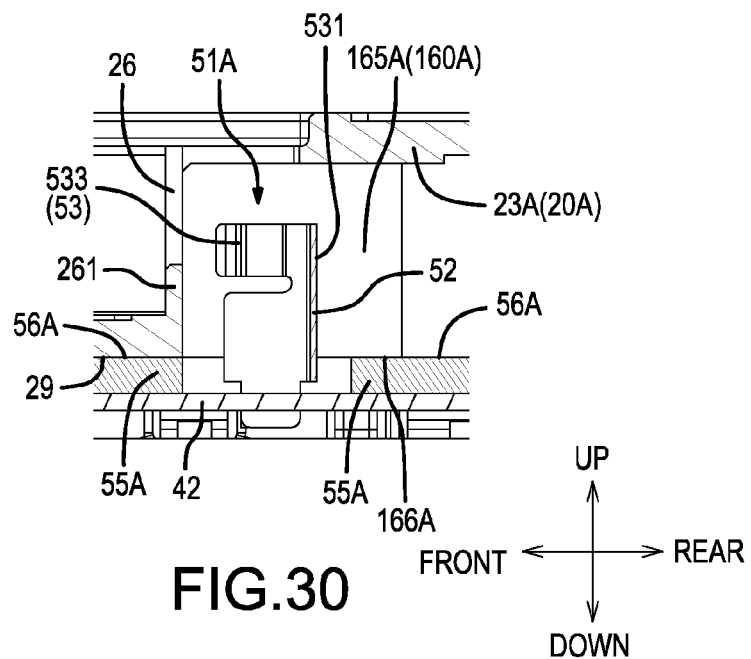
FIG. 30 is an enlarged cross sectional view that shows the signal terminal in FIG. 29 and the periphery thereof.

Compared with the partition part 160 of the abovementioned second embodiment, the partition part 160A of the third embodiment differs in terms of the support to which it is attached and/or on which it is formed. In the second embodiment, the partition part 160 was formed integrally with the resin coating part 55. The partition part 160A of the third embodiment is formed with or attached to an upper side case 23A. Specifically, in the battery pack 110A of the third embodiment, the partition part 160A is provided inside the upper side case 23A of an outer packaging case 20A. Consequently, the partition part 160 like that of the abovementioned second embodiment is not formed integrally with the resin coating part 55 of the third embodiment. Similarly to the partition part 160, the partition part 160A of the third embodiment functions to space apart (shield or isolate) the parallel six signal terminals 51 from one another. However, the partition part 160A of the third embodiment spaces apart the six signal terminals 51 to the left and the right. Consequently, as shown in FIG. 28, the partition part 160A of the third embodiment is provided with five structures referred to as "flat plate shaped two-sided partition walls 165A" which project downward from the top of the upper side case 23A such that the two-sided partition walls 165A form compartments (partitions) in the upper side case 23A. Furthermore, the partition part 160A of the third embodiment does not include a structure that corresponds to the front side partition part 163 or the rear side partition part 167 of the partition part 160 of the first embodiment. In addition, a resin coating part 55A of the third embodiment is formed across the entire upper surface of the circuit board 42. In other words, the connection locations 35 of the lead plates 34, which were explained in the abovementioned first embodiment, are not exposed on the upper side and are covered by the resin coating part 55A.

When the upper side case 23A is assembled (joined) to the lower side case 21, the five two-sided partition walls 165A are disposed between the parallel signal terminals 511-516. Also, in the upper side case 23A, five two-sided partition walls 165A are provided between the signal terminal slits 26 corresponding to the signal terminals 51. In addition, each of the five two-sided partition walls 165A has a lower end surface 166A that faces the interior. The surface extension directions of the lower end surfaces 166A coincide with the surface extension directions of the lower surface 29 of the upper side case 23. That is, the lower end surfaces 166A of the two-sided partition walls 165A are formed flush with the lower surface 29 of the upper side case 23A. Consequently, an upper surface 56A of the resin coating part 55A of the third embodiment contacts the lower surface 29 of the upper side case 23A as well as the lower end surfaces 166A of the two-sided partition walls 165A. Thus, the two-sided partition walls 165A, whose lower end surfaces 166A contact the upper surface 56A of the resin coating part 55A, space apart (shield or isolate) the first signal terminal 511 through the sixth signal terminal 516 from one another.

Furthermore, when the partition part 160A is formed, as in the third embodiment, the slit stepped part 261 explained in the abovementioned first embodiment functions as the front side partition part 163. Thus, the partition part 160A of the third embodiment, having the two-sided partition walls 165A described above, likewise can achieve the same operational effects as the partition part 160 of the abovementioned second embodiment. That is, the battery pack 110A of the third embodiment, including the partition part 160A, likewise can achieve the same operational effects as the battery pack 110 of the abovementioned second embodiment. Furthermore, when the partition part 160A is formed as in the third embodiment, the partition part 160A is provided on the upper side case 23A, and this makes it possible to further simplify a molding process.

Fourth Embodiment

Figure 31:
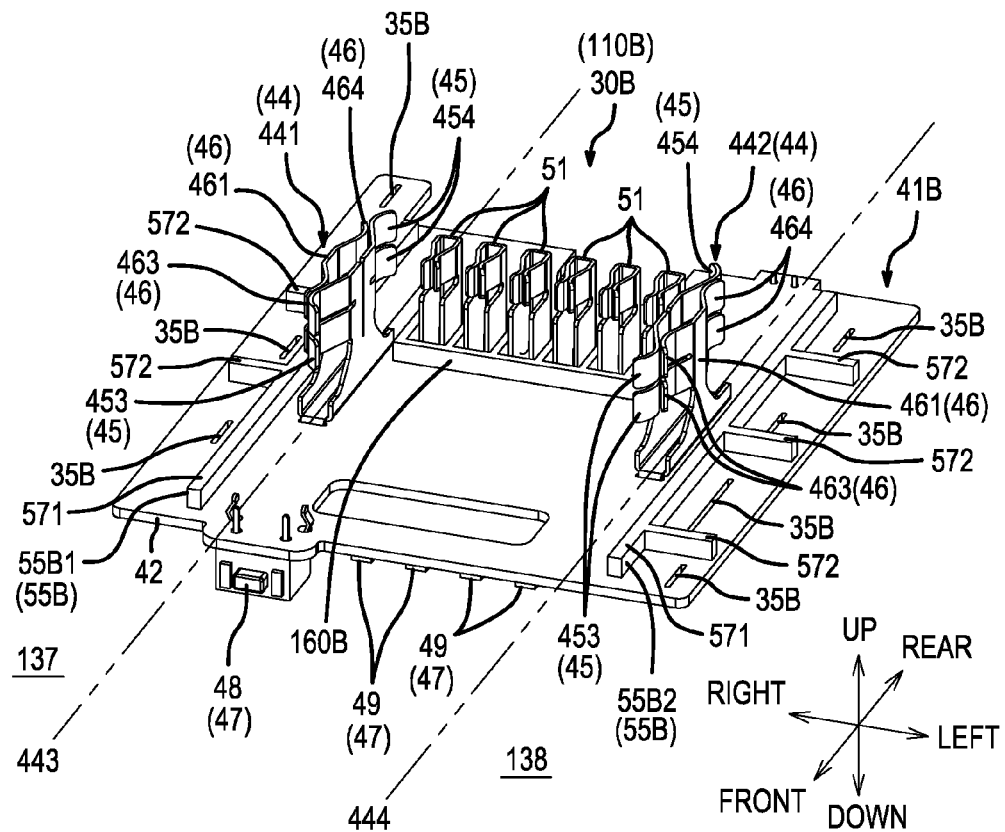
FIG. 31 is an oblique view that shows the configuration of the upper surface of the circuit board according to a fourth embodiment.

Next, a battery pack 110B of a fourth embodiment, which is a modified example of the battery packs 110, 110A according to the abovementioned second and third embodiments, will be explained, with reference to FIG. 31. Other than the arrangement and configuration of resin coating parts 55B and a partition part 160B, the battery pack 110B of the fourth embodiment is configured substantially the same as the battery pack 110 of the abovementioned second embodiment. Therefore, in the fourth embodiment, the resin coating parts 55B shown in FIG. 31 will be explained. The oblique view in FIG. 31 shows the configuration of an upper surface of the circuit board 42 of the fourth embodiment. The explanation below emphasizes the arrangement and configuration of the resin coating parts 55B and the partition part 160B in the battery pack 110B of the fourth embodiment. Consequently, elements of the battery pack 110B of the fourth embodiment that are configured identically to those in the battery pack 110 of the abovementioned second embodiment are assigned identical reference numbers in the drawings, and explanations thereof are omitted. In addition, the battery pack 110B of the fourth embodiment achieves substantially the same effects as the battery pack 110 of the abovementioned second embodiment; constituent elements that differ therefrom are identified by the same reference numerals in the drawings with the letter "B" appended.

The resin coating parts 55B of the fourth embodiment differ from the resin coating part 55 of the second embodiment in the area over which they are arranged. Specifically, the resin coating part 55 of the second embodiment is provided substantially over the entire upper surface of the circuit board 42, as shown in FIG. 19. In contrast, the resin coating parts 55B of the fourth embodiment are provided as two elements on two areas of the upper surface of the circuit board 42, as shown in FIG. 31.

One area of the upper surface of the circuit board 42 that is provided with one of the resin coating parts 55B is defined as a right side contact area 137. The right side contact area 137 is an area of the upper surface of the circuit board 42 that is on the right side of a virtual line 443 that extends in the front-rear directions from the positive connection terminal 441. The right side contact area 137 lies on the side of the positive connection terminal 441 opposite the negative connection terminal 442 and may be referred to as a "one side area." Four connection locations 35B of the lead plates 34 are provided on the circuit board 42 in the right side contact area 137. Here, a resin coating part 55B1 (55B) is provided on the upper surface of the circuit board 42 in the right side contact area 137. The resin coating part 55B1 is formed such that a first wall part 571, which extends in the front-rear direction, and a plurality of second wall parts 572, which extend in the left-right directions, are integrated (joined). The first wall part 571 is provided on the upper surface of the circuit board 42 such that it extends in the front-rear directions and spaces apart (separates or shields) the positive connection terminal 441 (i.e., the charging and discharging terminal 44) from the connection locations 35B of the lead plates 34. In addition, the second wall parts 572 are provided on the upper surface of the circuit board 42 such that they extend in the left-right directions and such that they space apart (separate or shield) the connection locations 35B of the four lead plates 34 from one another.

Another area of the upper surface of the circuit board 42 provided with one of the resin coating parts 55B is defined as a left side contact area 138. The left side contact area 138 is an area of the upper surface of the circuit board 42 that is on the left side of a virtual line 444 that extends in the front-rear directions from the negative connection terminal 442. In addition, the left side contact area 138, which may be referred to as an "other side area," lies on the side of the negative connection terminal 442 opposite from the positive connection terminal 441. Namely, both areas, that is, the one side area and the other side area, are outer side areas with respect to the charging and discharging terminals 44 (441, 442). Four of the connection locations 35B of the lead plates 34 are provided on the circuit board 42 in the left side contact area 138. Here, a resin coating part 55B2 (55B) is provided on the upper surface of the circuit board 42 in the left side contact area 138. The resin coating part 55B2, is also formed such that the first wall part 571, which extends in the front-rear directions, and the second wall parts 572, which extend in the left-right directions, are integrated (joined). The first wall part 571, is also provided on the upper surface of the circuit board 42 such that it extends in the front-rear directions and spaces apart (separates or shields) the negative connection terminal 442 (i.e., the charging and discharging terminal 44) from the connection locations 35B of the lead plates 34, which are disposed adjacent to the negative connection terminal 442. In addition, the second wall parts 572 are also provided on the upper surface of the circuit board 42 such that they extend in the left-right directions and space apart (separate or shield) the connection locations 35B of the four lead plates 34.

In addition, the abovementioned circuit board 42 is provided with the partition part 160B that is separate from the resin coating parts 55B. The partition part 160B is configured with an arrangement and shape that are substantially identical to those of the partition part 160 provided on the circuit board 42 of the abovementioned second embodiment. Consequently, the description of partition part 160 of the second embodiment should be considered as an explanation of the shape of the partition part 160B. However, the partition part 160B of the fourth embodiment differs from the partition part 160 of the second embodiment in that it is provided directly on the circuit board 42. In other words, the partition part 160B of the fourth embodiment is formed from the same material and using the same molding method as those of the resin coating part 55.

The battery pack 110B of the fourth embodiment, having the resin coating parts 55B and the partition part 160B, can achieve the same operational effects as the battery pack 110 of the second embodiment. Furthermore, if the resin coating parts 55B and the partition part 160B are formed as in the fourth embodiment, the amount of material needed to mold the resin coating parts 55B and the partition part 160B can be reduced, and this may advantageously reduce manufacturing costs. Furthermore, as in the second and third embodiments, the fourth embodiment also reliably ensures electrical insulation (separation or isolation) between the charging and discharging terminals 44 and the connection locations 35B (35) of the lead plates 34, and electrical insulation (separation or isolation) between the connection locations 35B (35) of the lead plates 34, etc.

Furthermore, as the soft material used in the resin coating part 55 of the second through fourth embodiments, any suitable material can be adopted as long as it is elastic and is capable of contacting other structures in an airtight manner. In addition, the insulating material is not limited to the example of the abovementioned resin coating part 55, and any suitable configuration can be adopted as long as it is molded from a material that is capable of insulating.

Fifth Embodiment

A fifth embodiment of a representative power tool battery pack according to the present disclosure is explained below, with reference to FIG. 32 through FIG. 42. The fifth embodiment is a modified example of the abovementioned second embodiment, elements in FIGS. 32-42 that are the same as those in the first embodiment and the second embodiment are identified by the same reference numerals, and explanations of these elements omitted. The following description focuses principally on the structures and members that differ from those of the second embodiment. As in the first embodiment, the circuit board 42 of a battery pack 210 according to the present embodiment includes the charging and discharging terminals 44 and the signal terminals 51.

Figure 34:
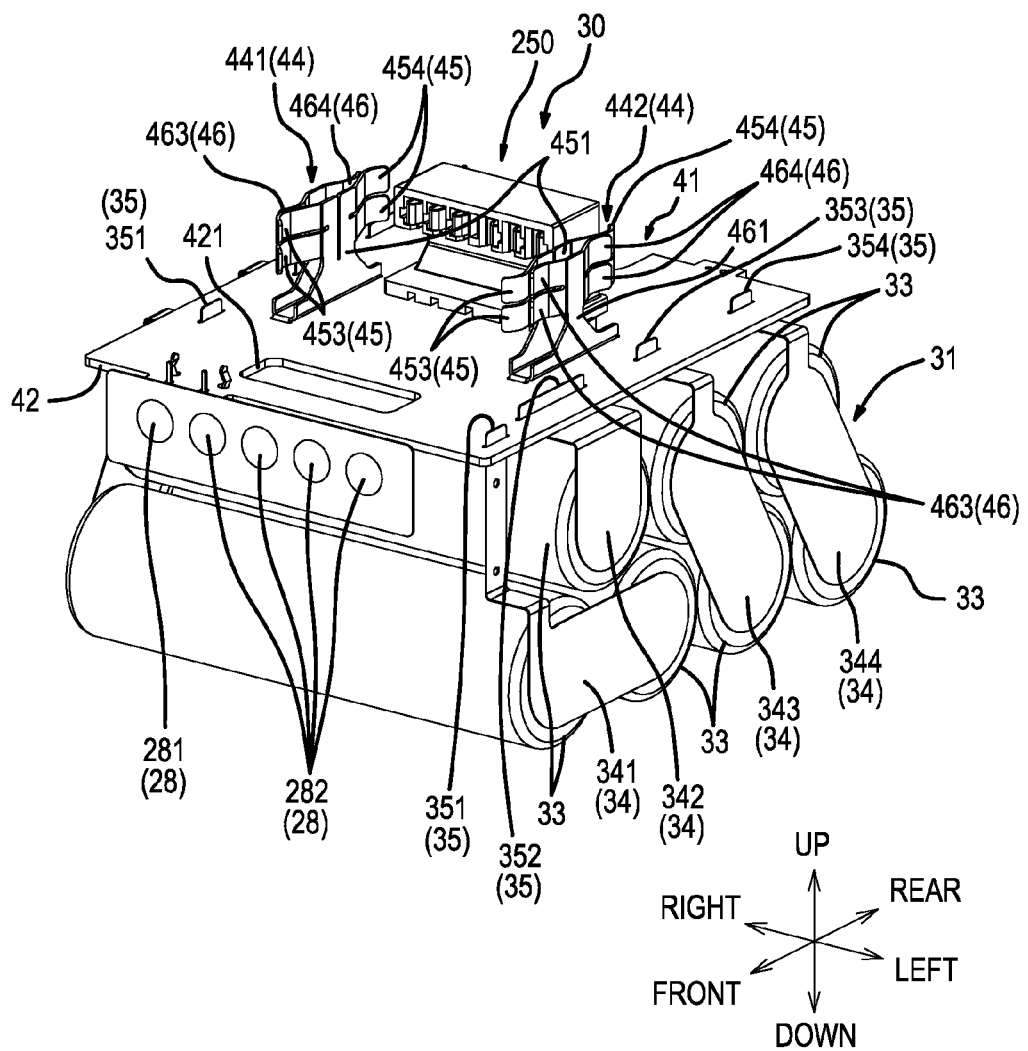
FIG. 34 is a front side oblique view of the battery main body of the battery pack in FIG. 32.
Figure 35:
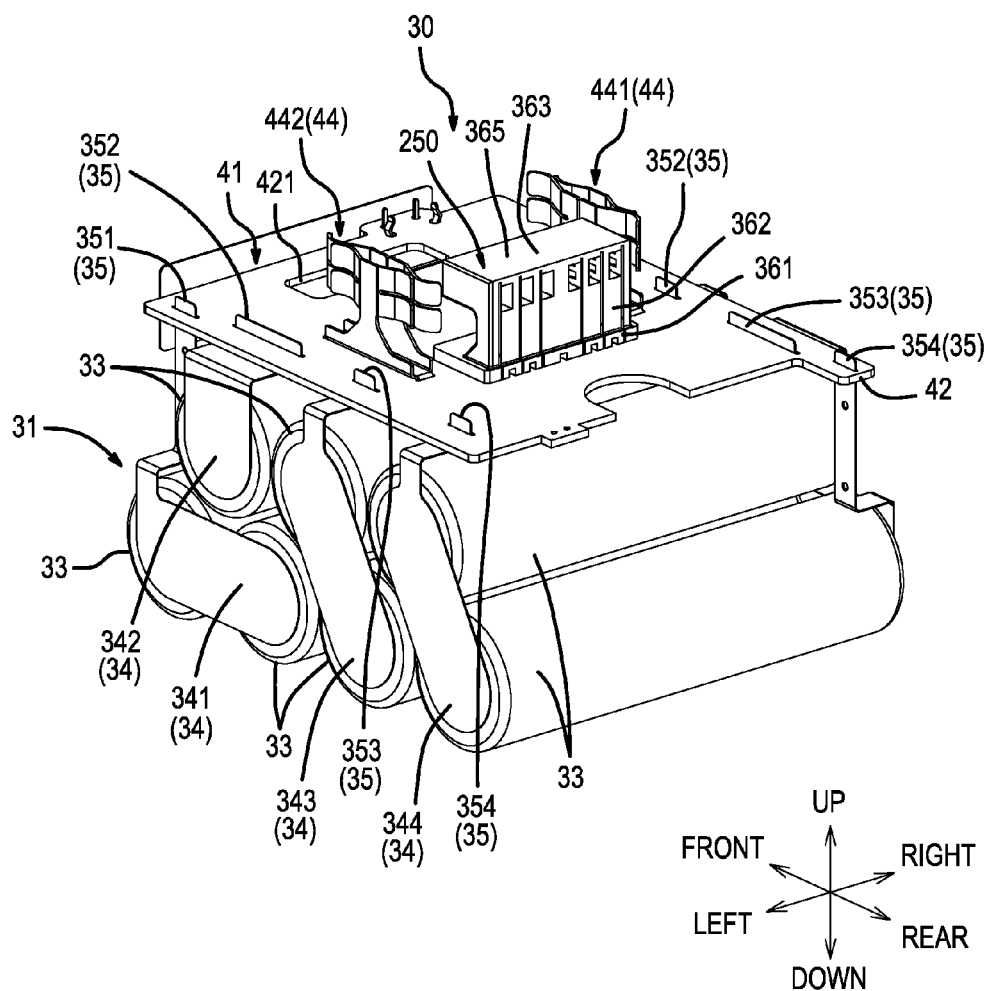
FIG. 35 is a rear side oblique view of the battery main body in FIG. 34.
Figure 36:
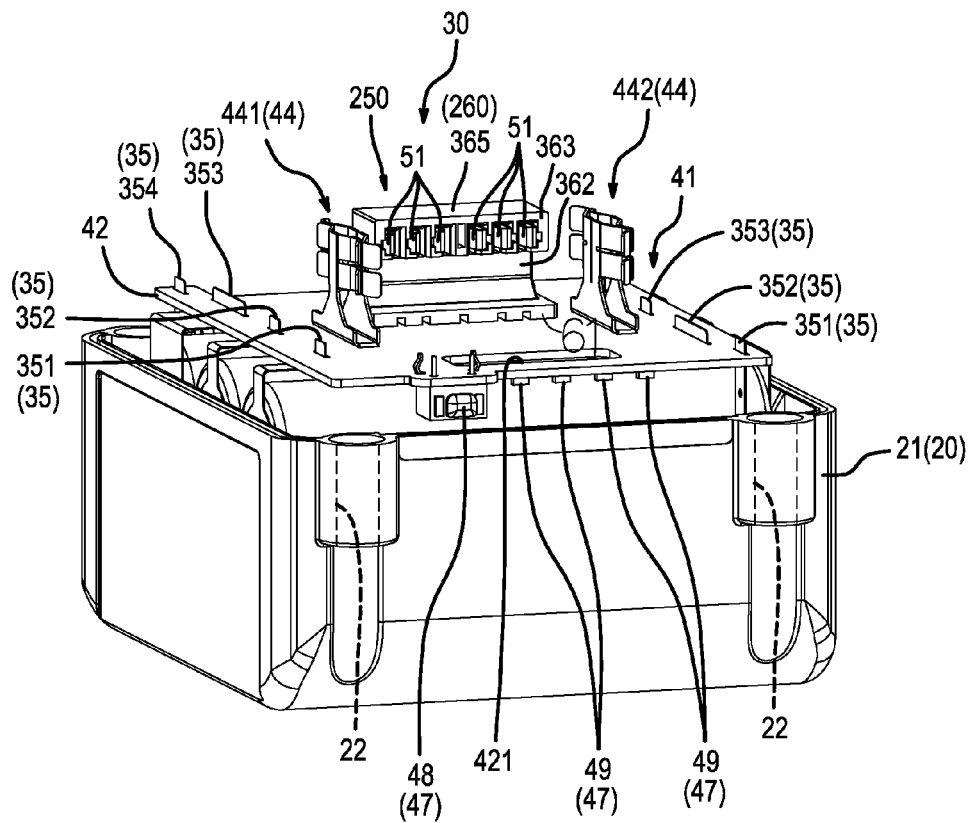
FIG. 36 is an oblique view that shows the battery main body installed inside the lower side case.
Figure 37:
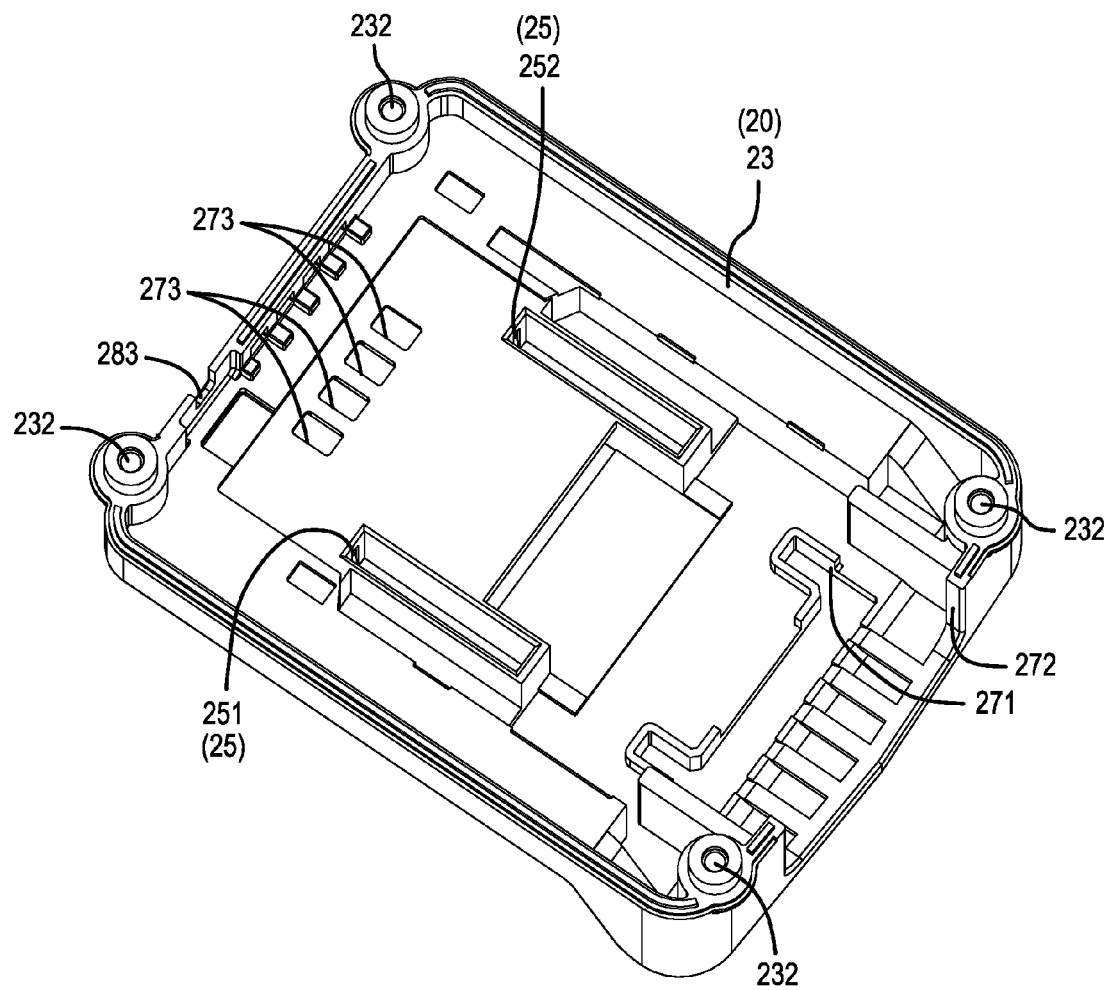
FIG. 37 is an oblique view that shows the interior of the upper side case.
Figure 37:
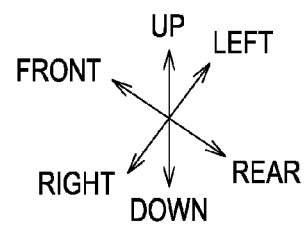

In the present embodiment, the signal terminals (contacts) 51 of the circuit board 42 together with a resin support body 260 constitute a connector 250. Furthermore, the resin support body 260 corresponds to a resin member according to the present disclosure. The resin support body 260 is formed by molding a resin material having electrically insulating properties. The resin support body 260 is molded such that it covers virtually the entire outer perimeter of at least some of the signal terminals 51. As shown in FIG. 34, the connector 250, which includes the signal terminals 51, is disposed between the positive connection terminal 441 and the negative connection terminal 442. Six of the signal terminals 51 are arrayed (arranged) in parallel and comprise part of the connector 250. As in the previous embodiments, the front-rear positions of the six signal terminals 51 are set close to the rear ends of the positive connection terminal 441 and the negative connection terminal 442. When the battery pack 210 is mounted to the mounting target (i.e., a tool main body, a specialized charger, and the like), the six signal terminals 51 are terminals for transmitting and receiving signals between the battery pack 210 and the mounting target.

Figure 38:
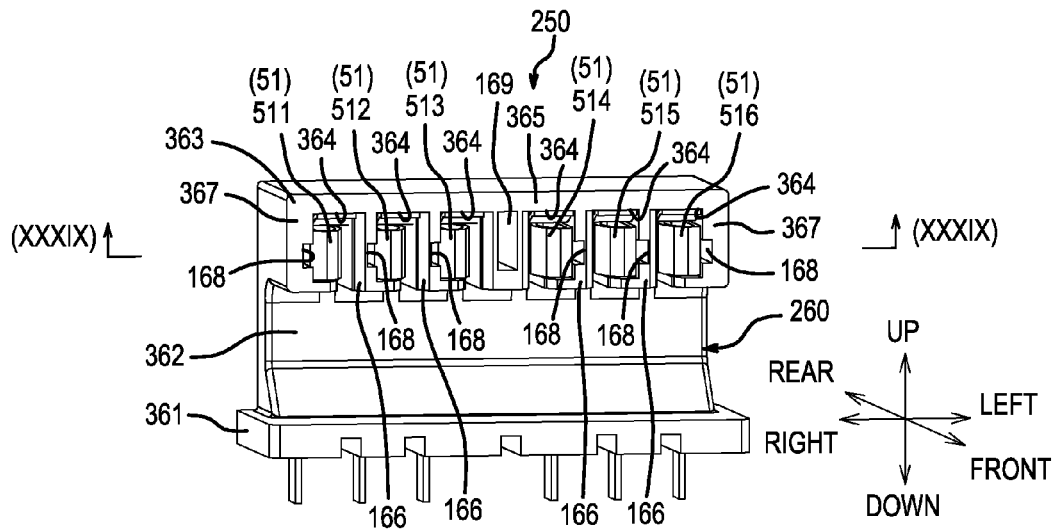
FIG. 38 is a front side oblique view of a connector.
Figure 41:
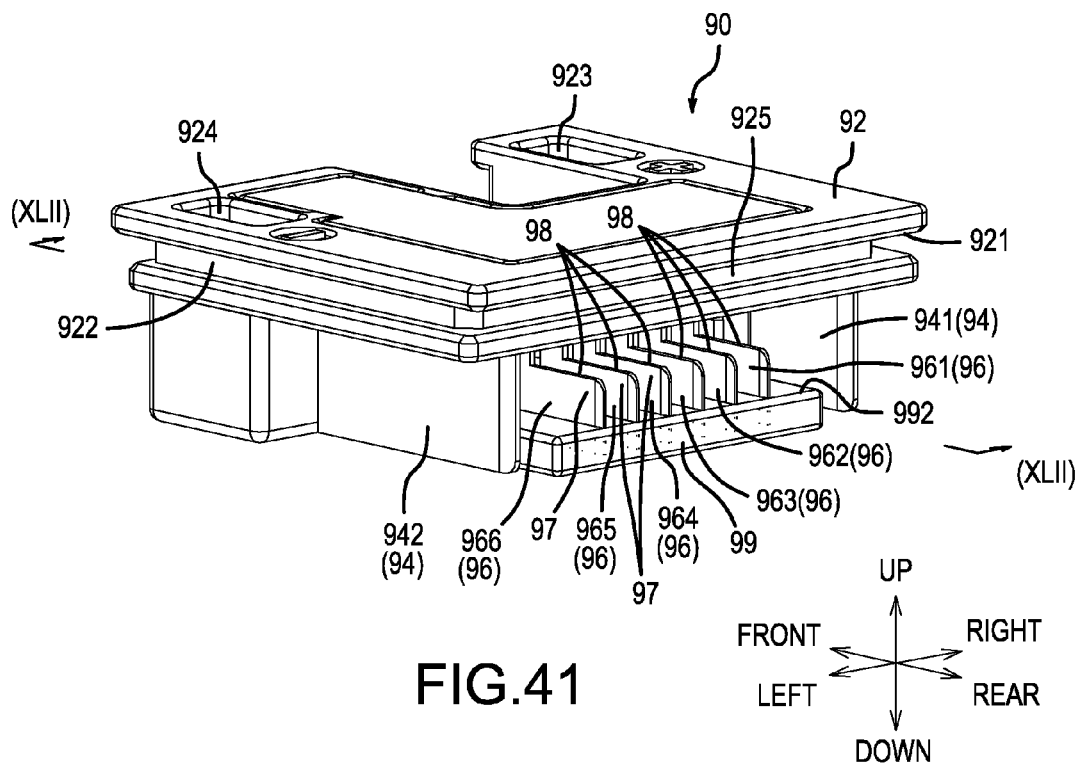
FIG. 41 is an oblique view that shows a counterpart side to which the connector of FIG. 38 is connectable.
Figure 42:
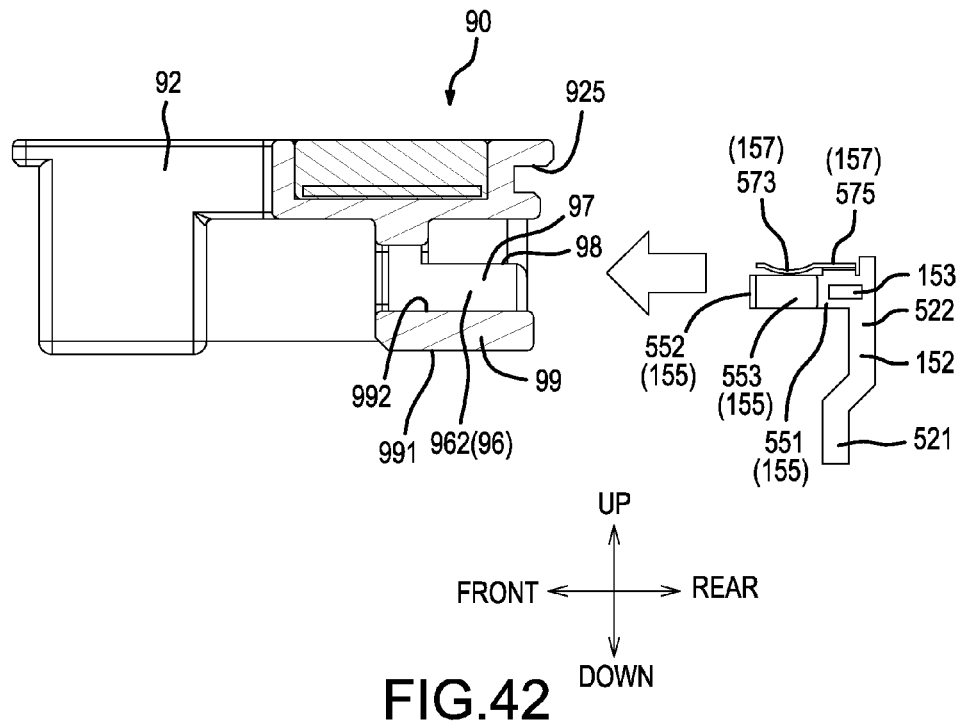
FIG. 42 is a cross sectional auxiliary view taken along the (XLII)-(XLII) line in FIG. 41.

FIG. 41 shows a connection apparatus body 90 of a mounting target to which the connector 250 shown in FIG. 38 may be connected. The cross sectional view in FIG. 42 is a cross sectional auxiliary view taken along the (XLII)-(XLII) line in FIG. 41. As shown in FIG. 41 and FIG. 42, the mounting target onto which the abovementioned battery pack 210 is slid and thereby mounted, comprises the connection apparatus body 90 which is configured to connect with the charging and discharging terminals 44 and the signal terminals 51. When the battery pack 210 is mounted to the mounting target, the connection apparatus body 90 connects to the connection structure (i.e., the charging and discharging terminals 44, the signal terminals 51, etc.) on the battery pack 210 side, which is discussed in detail hereinafter. The mounting target corresponds to the counterpart side according to the present disclosure, and the connection apparatus body 90, which is mounted to the mounting target, corresponds to a counterpart side terminal. Furthermore, the forward, rear, up, down, left, and right directions of the connection apparatus body 90 are consistent with the front-rear, up-down and left-right directions of the battery pack 210 that is mountable to the connection apparatus body 90.

The connection apparatus body 90 comprises a. The support pedestal 92 is formed with an outer circumferential shape to which the battery pack 10 can be mounted. Insertion recessed parts 921, 922, configured to receive corresponding structures of the mounting target (not shown), are provided on both the left and right sides of the support pedestal 92. The insertion recessed parts 921, 922 are formed as an incorporating structure for incorporating the connection apparatus body 90 into the mounting target. Furthermore, the surface on the lower side of the connection apparatus body 90 in FIG. 41 is the surface that faces the outside, and the surface on the upper side of the connection apparatus body 90 in FIG. 41 is the surface that faces the inside of the mounting target. Consequently, the upper side surface of the support pedestal 92 is provided with lead wire outlets 923, 924 for guiding lead wires connected to the mount side charging and discharging terminals 94 and the mount side signal terminals 96 to the inside of the mounting target. In addition, a mating recessed part 925 is provided in the rear end edge of the support pedestal 92 that opposes the battery pack 10. Specifically, when the battery pack 210 is slid onto and thereby mounted to the connection apparatus body 90, the mating recessed part 925 is formed as an opposing end edge into which a slip-on flange part 233 of the battery pack 210 side fits. Furthermore, the rest of the outer circumferential shape of the support pedestal 92 is formed such that it corresponds to an appropriate outer circumferential shape of the battery pack 210.

The mount side charging and discharging terminals 94 (941, 942) comprise the mount side positive electrode terminal 941, which corresponds to the positive connection terminal 441 of the battery pack 210, and the mount side negative electrode terminal 942, which corresponds to the negative connection terminal 442 of the battery pack 210. Each of the mount side charging and discharging terminals 94 (941, 942) is a plate-shaped conductive terminal (contact) that is provided with an extension plane in the direction in which the battery pack 210 is mounted by sliding. In addition, the mount side signal terminals 96 (961-966) are provided in locations that correspond to the locations of the signal terminals 51 (511-516) of the battery pack 210. In other words, each of the mount side signal terminals 96 (961-966) is likewise a conductive terminal that is formed in a plate shape and that is provided with an extension plane in the direction in which the battery pack 210 is mounted by sliding. Furthermore, the first through sixth mount side signal terminals 961-966 are configured such that they are connected to the first through sixth signal terminals 511-516, which are provided on the battery pack 210, as the battery pack 210 is mounted by sliding. The charging and discharging terminals 44 (i.e., the positive connection terminal 441 and the negative connection terminal 442) are configured as terminals that are electrically connected to the mount side charging and discharging terminals 94 (941, 942), which are shown in FIG. 41, by sandwiching the mount side charging and discharging terminals 94 (941, 942) from both (on) the left and right sides. Configuring (shaping) the charging and discharging terminals 44 in this manner makes it possible to have contacts at two points, namely, on both sides of the mount side terminals, and thereby to increase contact conductivity.

As shown in FIG. 42, a guide positioning surface member 99 is provided on the lower side of the six mount side signal terminals 96 (961-966) and extends to the area in which the six mount side signal terminals 96 (961-966) are provided and disposed. The guide positioning surface member 99 is formed integrally with the support pedestal 92. The guide positioning surface member 99 functions a guide (sliding) surface when mounting the battery pack 210 by sliding along the complementary surface of the tool main body.

A lower surface 991 on the lower side of the guide positioning surface member 99 is a portion that slidably opposes the positioning surface 231 of the battery pack 210. In addition, an upper surface 992 on the upper side of the guide positioning surface member 99 is a portion that slidably opposes the six mount side signal terminals 96 (961-966) when the six signal terminals 51 (511-516) are caused to connect to the six mount side signal terminals 96 (961-966) in accordance with the mounting of the battery pack 210 by sliding. Furthermore, the upper surface 992 on the upper side of the guide positioning surface member 99 is a portion that slidably opposes the six mount side signal terminals 96 (961-966) when the six signal terminals 51 (511-516) are caused to connect to the six mount side signal terminals 96 (961-966) in accordance with the mounting of the battery pack 210 by sliding. Furthermore, although also explained later, the signal terminals 51 (511-516) of the battery pack 210 are electrically connected by causing bent parts 553 of planar contact shaped parts 155 of the signal terminals 51 to come into contact with side surfaces 97 of the mount side signal terminals 96 (961-966). In addition, as will be further explained below, the signal terminals 51 (511-516) of the battery pack 210 are electrically connected by causing convex bent parts 573 of end edge contact shaped parts 157 of the signal terminals 51 to come into contact with upper side end edges 98 of the mount side signal terminals 96 (961-966).

The six parallel signal terminals 51 have a relationship corresponding to the second (i.e., signal) terminal according to the present disclosure with respect to the first (i.e., signal) terminal according to the present disclosure, and have a relationship of an "other (i.e., signal) terminal" that differs from a "one (i.e., signal) terminal," which are arrayed (arranged) parallel to one another. In addition, these six signal terminals 51 (511-516) also are configured as a first connection part and a second connection part that are capable of connecting with terminals of the specialized charger that performs charging.

Figure 40:
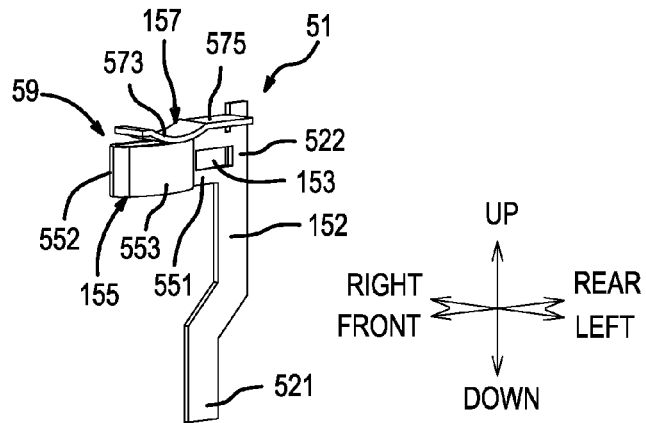
FIG. 40 is an oblique view of one of the signal terminals of FIG. 38 by itself.

Each of the six signal terminals (contacts) 51 has an electrical contact structure as shown in FIG. 40. The signal terminal 51 is formed by punching and then bending an electrically conductive flat metal plate. Specifically, the signal terminal 51 comprises a support part 152 that extends upward in the vertical direction from the circuit board 42 when the circuit board 42 is oriented in the horizontal direction. The support part 152 extends in a direction orthogonal to the extension plane that includes the circuit board 42; furthermore, a lower part 521 of the support part 152 is provided with a contact shape that is electrically connected to the circuit board 42, and an upper part 522 of the support part 152 is provided with a contact shape that is electrically connected to the counterpart side (i.e., the mounting target), such as a tool main body or a specialized charger. Specifically, the lower part 521 of the support part 152 is provided with a contact shape that deviates frontward and then extends downward in the vertical direction. In addition, the upper part 522 of the support part 152 is provided with a contact shape that extends frontward. There are two types of contact shapes provided in this manner: the planar contact shaped parts 155 and the end edge contact shaped parts 157. These two types of contact shapes are explained next.

Figure 39:
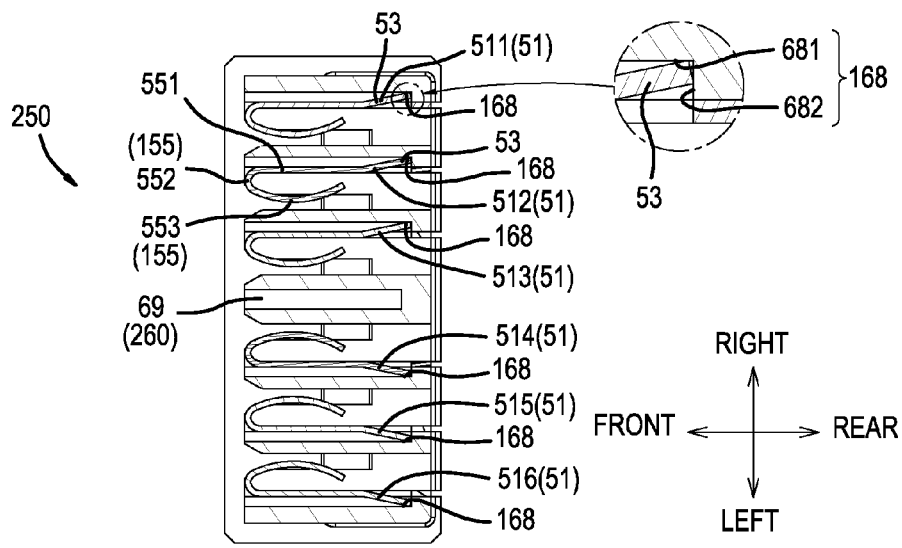
FIG. 39 is a cross sectional auxiliary view taken along the (XXXIX)-(XXXIX) line in FIG. 38.

The configuration of the planar contact shaped parts 155 is as described by the symbols affixed to reference numeral 512 (i.e., the second signal terminal) in FIG. 39. Furthermore, because of the lack of space in the figure for appending reference symbols, identifiers of signal terminals 51 other than the second signal terminal 512 in FIG. 39, namely, the signal terminals 51 (511, 513, 514, 515, 516), are omitted. The signal terminals 51 (511, 513, 514, 515, 516) are configured substantially the same as the second signal terminal 512, to which the reference symbols are affixed.

The planar contact shaped part 155 comprises an extension part 551, a folded part 552, and a bent part 553. The extension part 551 extends frontward from the upper part 522 of the support part 52. A hollow part 153, which is linked only on the front side and includes a notch, is provided at the location at which the extension part 551 starts to extend. The hollow part 153 is bent toward the side of the extension part opposite the folded part 552. The hollow part 153 makes contact with an internal contact part 168 (refer to FIG. 38 and FIG. 39) of the resin support body 260, which is disposed in an opposing manner. Owing to the contacting of the hollow part 153, the extension part 551 of the signal terminal 51 is elastically supported in the width directions (i.e., the left-right directions). That is, because the hollow part 153 contacts the internal contact part 168, contact is made also in the rear direction in addition to the width directions (i.e., the left-right directions).

Each of the internal contact parts 168 is provided inside the resin support body 160 such that the interior of the resin support body 260 is hollowed out in the width directions (i.e., the left-right directions). Namely, as can be understood from the enlarged detailed diagram in FIG. 39, the internal contact part 168 is provided inside the resin support body 260 such that it comprises a side surface 681 that can come into contact with the hollow part 153 in the width directions (i.e., the left-right directions), and a step front surface 682 that can come into contact with the hollow part 153 in the rear direction. In so doing, the hollow part 153 elastically supports the extension part 551 in the width directions (i.e., the left-right directions) in a satisfactory manner and can restrict the extension part 551 from moving in the rear direction. By causing the bent part 553 to contact the side surface 97 of the mount side signal terminal 96 (i.e., the side surface that faces toward the outer side), the hollow part 153 can elastically support the extension part 551 in a satisfactory manner. In addition, the hollow part 153 can prevent the signal terminal 51, which includes the extension part 551, from slipping off the resin support body 260. This is because, by causing the bent part 553 of the signal terminal 51 to come in contact with the side surface 97 of the mount side signal terminal 96, the hollow part 153 prevents the displacement of the signal terminal 51 in the rear direction. Furthermore, each of the internal contact parts 168 of the resin support body 260 is formed by hollowing out the interior of the resin support body 260 in the width directions (i.e., the left-right directions), and each of the step front surfaces 682 is also formed such that it can contact the rear end of the corresponding hollow part 153.

The folded part 552 is provided at the front end of the extension part 551 and is formed by folding back a front part of the extension part 551. Furthermore, the folded part 552 is on a side that faces an intermediate partition 169 of the resin support body 260. Specifically, the right three signal terminals 51 that constitute the right half of the connector 250 are folded back toward the left side with the folded parts 552 as the boundaries, and the left three signal terminals 51 that constitute the left half of the connector 250 are folded back toward the right side with the folded parts 552 as the boundaries. When the folded back side of the folded part 552 is disposed on the left side of the center in the width directions (i.e., the center in the left-right directions) of the connector 250, it is folded back on the right side, and when the folded back side of the folded part 552 is disposed on the right side of the center in the width directions (i.e., the center in the left-right directions) of the connector 250, it is folded back on the left side. Furthermore, the folded back side of the folded part 552 is on the side opposite to the projecting side of the abovementioned hollow part 153.

The portion that is folded back from the extension part 551 with the folded part 552 as the boundary is formed as the bent part 553. The bent part 553 is formed with a suitable R-shape such that, in folding back from the extension part 551 with the folded part 552 as the boundary, the outer side becomes convex, and the bent part 553 is supported by the extension part 551 via the folded part 552. Consequently, the bent part 553 is elastically supported by the folded part 552. In addition, the bent part 553, which is formed with a suitable R-shape, also forms a convexity whose outer side surface is rounded to provide a reliable electrical contact, and the bent part 553 of each of the planar contact shaped parts 155 is configured as part of a male signal terminal 59. Furthermore, the outer side surfaces of the bent parts 553 of the signal terminals 51 oppose the resin support body 260, and the abovementioned mount side signal terminals 96 (961-966) are plugged in between the bent parts 553 and the resin support body 260 to make an electrical connection. That is, the bent parts 553 of the planar contact shaped parts 155 of the signal terminals 51 come into contact, from one side, with the side surfaces 97 of the mount side signal terminals 96 (961-966), thereby making electrical connections. Each of the six signal terminals 51 is formed as a terminal that provides electrical contact, from one side, with its counterpart side terminal by coming into contact with that counterpart side terminal from one side.

In contrast, each of the end edge contact shaped parts 157 comprises an extension part 575 and the convex bent part 573. The extension part 575 is formed such that it extends frontward from the upper part 522 of the support part 152. The extension part 575, which extends from the upper part 522 of the support part 152 is formed as a flat plate shape that has an extension plane orthogonal to the extension plane of the support part 152. Namely, the extension part 575 is formed by folding the upper side of the support part 152. The convex bent part 573, which extends in the extending directions of the extension part 575, is provided on the front side of the extension part 575. The convex bent part 573 is formed with a bent shape whose lower side constitutes a smooth convexity. When the abovementioned mount side signal terminals 96 (961-966) are plugged in between the bent parts 553 and the resin support body 260, the convex bent parts 573 of the end edge contact shaped parts 157 can reliably provide contacts that are electrically connected with the upper side end edges 98 of the plugged-in mount side signal terminals 96. In other words, the convex bent part 573 of each of the end edge contact shaped parts 157 is configured as part of the corresponding male signal terminal 59. Consequently, the electrical connections of the signal terminals 51 (511-516) of the battery pack 210 are configured by bringing the convex bent parts 573 of the end edge contact shaped parts 157 of the signal terminals 51 into contact with the upper side end edges 98 of the mount side signal terminals 96 (961-966).

The signal terminals 51 formed as described above are, when the six signal terminals 51 are arrayed (arranged) in parallel, integrated into the resin support body 260. With reference to FIG. 38, the resin support body 260 comprises, in order from bottom to top, a support seat part 361, an intermediate support part 362, and a terminal support part 363. The support seat part 361 is a lower part of the resin support body 260 and is formed by a widening of forward, rear, left, and right parts of the resin support body 260. The support seat part 361 can satisfactorily support the connector 250 on the circuit board 42. In addition, the intermediate support part 362, which is disposed on the upper side of the support seat part 361, is formed in correspondence with the shape of the support parts 152 of the abovementioned signal terminals 51. Consequently, it is formed such that it is less bulky in the front-rear directions than the support seat part 361 and the terminal support part 363. In addition, the terminal support part 363, which is disposed on the upper side of the intermediate support part 362, is also formed in correspondence with the shape of the male signal terminals 59 of the abovementioned signal terminals 51. Consequently, the terminal support part 363 is formed with a shape that overhangs toward the front side more than the intermediate support part 362 does.

The resin support body 260 is integrally formed with the six signal terminals 51 as follows. The six signal terminals 51 are configured such that they have left-right symmetry, as shown in FIG. 38. Furthermore, the center axis of the left-right symmetry of the connector 250 is located at the intermediate partition 169. The three signal terminals 51 that are disposed on the left side of the intermediate partition 169 are arrayed (arranged) in parallel and formed such that the bent parts 553 are provided on the right side. On the other hand, the three signal terminals 51 that are disposed on the right side of the intermediate partition 169 are arrayed (arranged) in parallel and formed such that the bent parts 553 are provided on the left side. The six signal terminals 51 are disposed such that they have left-right symmetry, with the intermediate partition 169 as the center axis, and the bent parts 553 face the intermediate partition 169. In other words, the first through third signal terminals 511-513 are formed as left side contact terminals that provide electrical contact with the counterpart side terminals from the left side by contacting them from the left side. On the other hand, the fourth through sixth signal terminals 514-516 are formed as right side contact terminals that provide electrical contact with the counterpart side terminals by contacting them from the right side.

In addition, because the support seat part 361, the intermediate support part 362, and the terminal support part 363 are integrally formed, the resin support body 260 easily incorporates the abovementioned signal terminals 51. Openings 364 are provided in the front surface of the terminal support part 363 of the resin support body 260, and the mount side signal terminals 96 can be pressed onto the male signal terminals 59 through the openings 364. The openings 364 are openings through which the mount side signal terminals 96 can be pressed onto the male signal terminals 59. In addition, a top plate part 365 that covers the six male signal terminals 59 is provided at the upper part of the terminal support part 363. The top plate part 365 covers the upper sides of the six male signal terminals 59; therefore, if water, such as raindrops, falls from above, it is possible to prevent that water from contacting the signal terminals 51. In addition, adjacent partition parts 366 are provided between the six male signal terminals 59. The adjacent partition parts 366 space apart (separate or shield) the adjacently disposed male signal terminals 59. In addition, outer side partition parts 367 are provided on both outer sides of the male signal terminals 59. The outer side partition parts 367 separate (shield or isolate) the male signal terminals 59 from the outside. Namely, the adjacent partition parts 166 and the intermediate partition 169, which constitute the resin support body 260, are incorporated between the six signal terminals 51 (511-516) such that the signal terminals 51 (511-516) are spaced apart (separated or isolated). In addition, both the left and right sides of the six signal terminals 51 (511-516), which constitute connecting parts according to the present disclosure that are capable of contacting the terminals of the charger, are covered by the outer side partition parts 367 so as to demarcate the outside.

Furthermore, the internal contact parts 168 are provided in the circumferential surfaces that constitute the openings 364 of the resin support body 260. Each of the internal contact parts 168 is provided on the inner circumferential surface of the resin support body 260 on the side opposite the side on which the bent part 553 is disposed. The hollow part 153, which is provided in the abovementioned extension part 551, is disposed in each of the internal contact parts 168. The hollow part 153 in the signal terminal 51 can be brought into contact with the internal contact part 168 of the resin support body 260 such that the displacement of the signal terminal 51 in the width directions (i.e., the left-right directions) and the displacement of the signal terminal 51 in the front-rear directions is substantially prevented.

Figure 32:
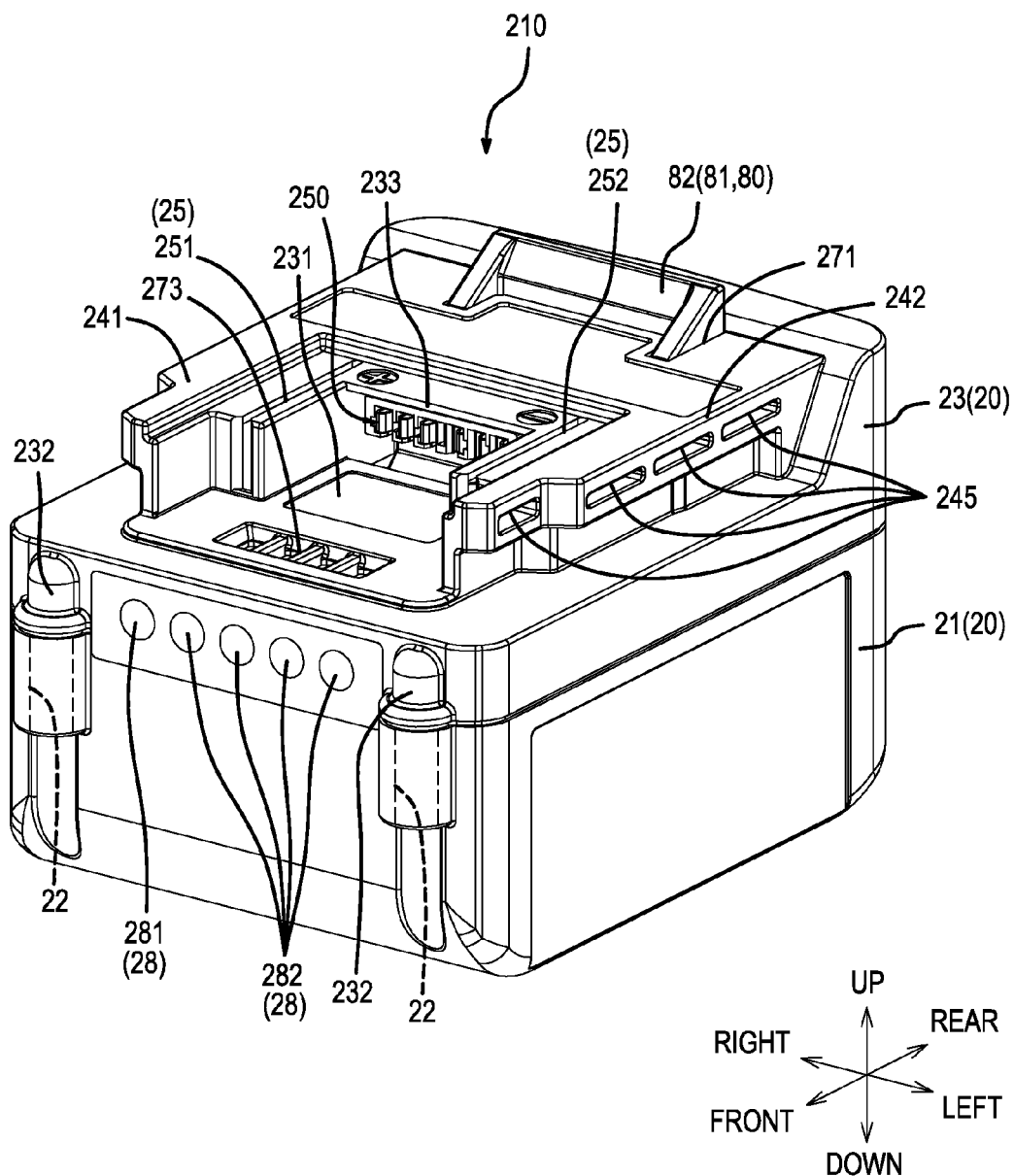
FIG. 32 is a front side external oblique view of the battery pack according to a fifth embodiment.
Figure 33:
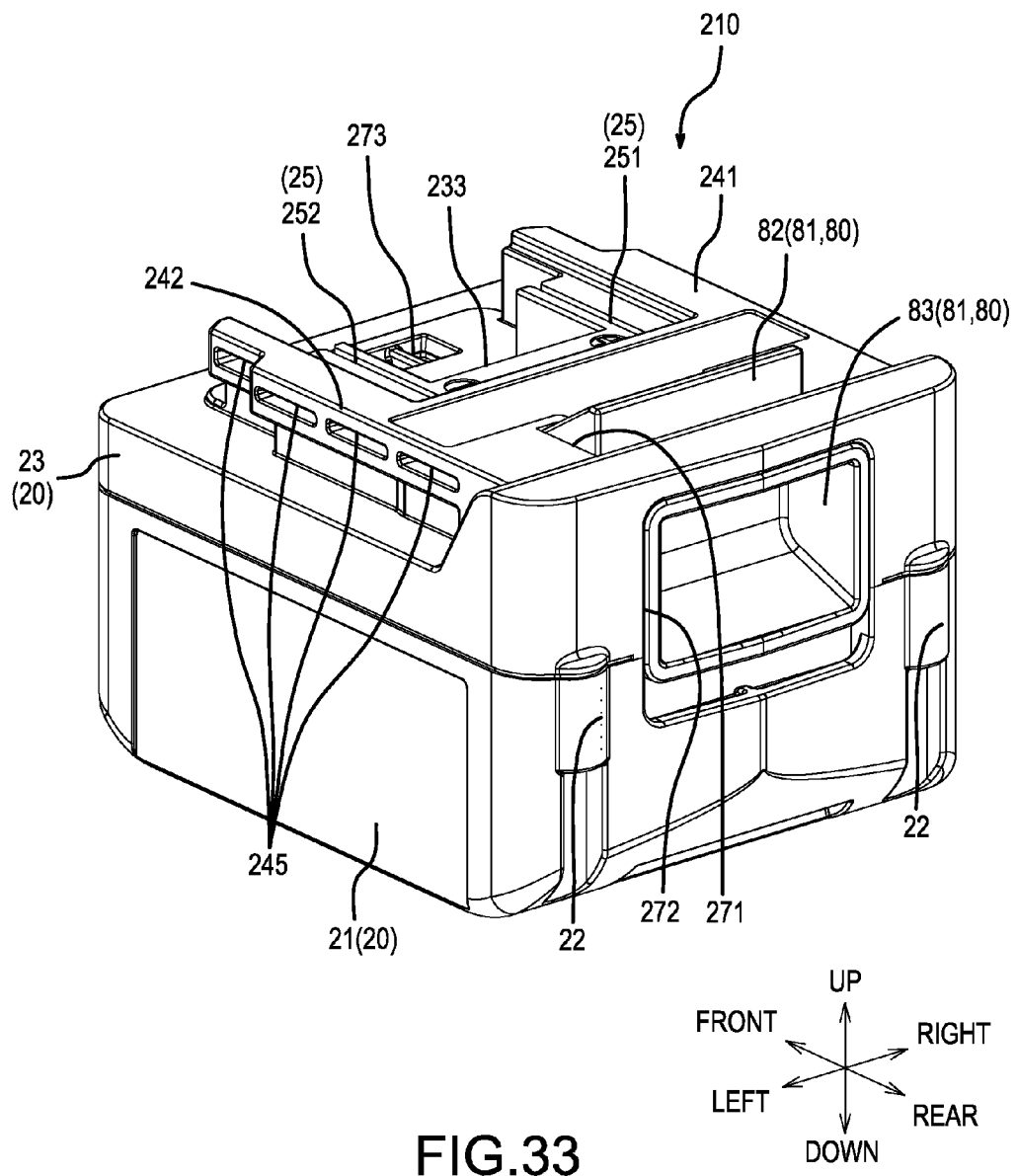
FIG. 33 is a rear side external view of the battery pack in FIG. 32.

Furthermore, as shown in FIG. 32, the upper side case 23 of the outer packaging case 20 is formed with a shape that covers the connector 250, which includes the resin support body 260 that covers the six signal terminals 51 (511-516).

The battery pack 210 described above can achieve the following operational effects. According to the abovementioned battery pack 210, even if water contacts the six signal terminals 51 disposed between the positive connection terminal 441 and the negative connection terminal 442, the resin support body 260 that covers the six signal terminals 51 can keep that water away from the signal terminals 51. Accordingly, even if water contacts the battery pack 210, it is possible to ensure that the signal terminals 51 of the battery pack 210 do not adversely become electrically connected to one another.

Sixth Embodiment

Next, a sixth embodiment, which is a modified example related to the connector 250 of the battery pack 210 of the abovementioned fifth embodiment, will be explained, with reference to FIG. 43 through FIG. 47. The sixth embodiment differs from the battery pack 210 of the fifth embodiment only in that the configuration of the connector 250 has been modified. Consequently, the configuration of a modified connector 250A is explained below, and explanations of other constituent elements are omitted.

The connector 250A of the sixth embodiment differs from the connector 250 of the fifth embodiment in the following two points. First, the connector 250A of the sixth embodiment comprises a resin support body 260A and the top plate part 365 of the resin support body 260 has been eliminated. Second, in the connector 250A of the sixth embodiment the end edge contact shaped parts 157 of the signal terminals 51 have been eliminated. Aspects of the configuration other than these two points are identical to those of the abovementioned fifth embodiment. Consequently, structures that are configured in the same manner as in the connector 250 of the abovementioned fifth embodiment are identified by the same reference numerals and explanations thereof are omitted.

Figure 43:
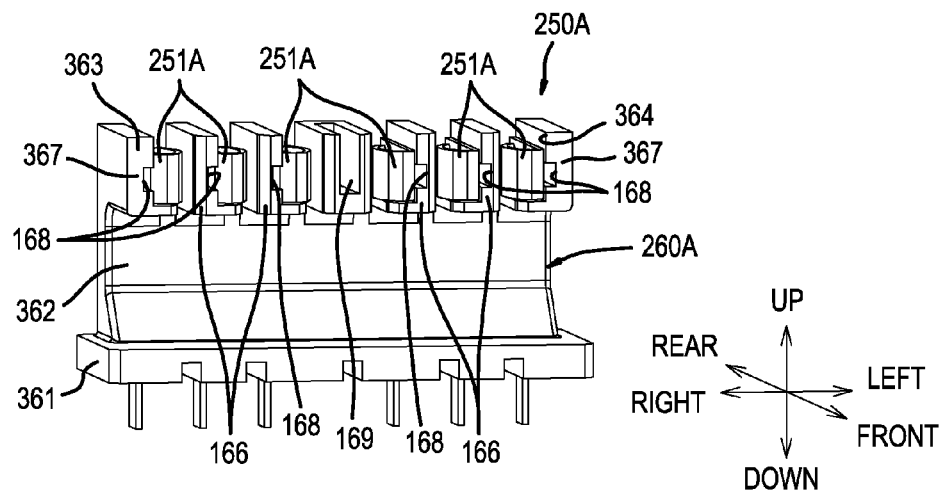
FIG. 43 is a front side oblique view of the connector according to a sixth embodiment.
Figure 44:
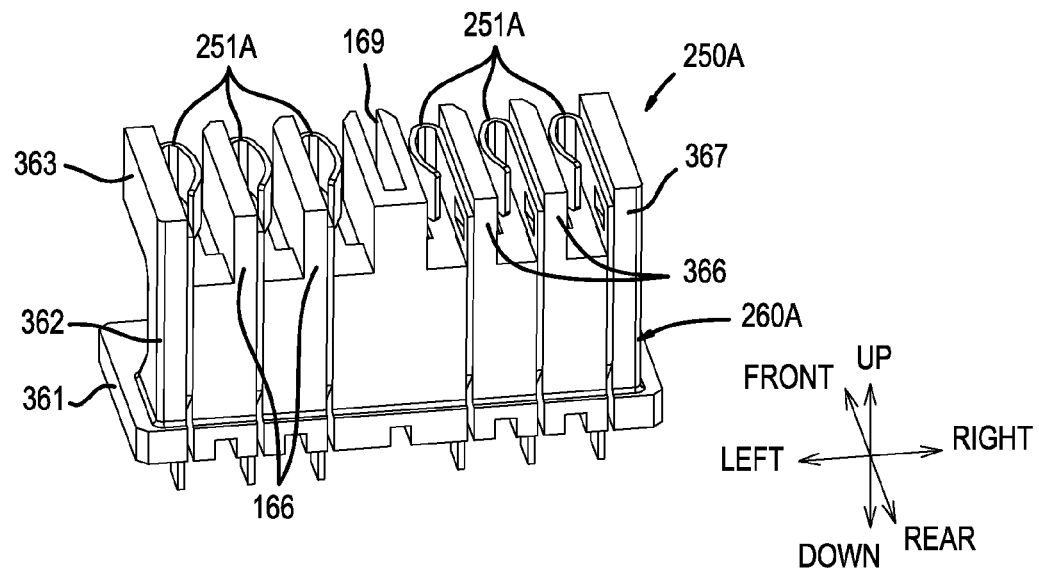
FIG. 44 is a rear side oblique view of the connector in FIG. 43.

In the resin support body 260A of the connector 250A of the sixth embodiment, the top plate part 365 of the terminal support part 363 is eliminated, as shown in FIG. 43 and FIG. 44. Consequently, the signal terminals 251A are plainly visible from the upper part of the resin support body 260A. Furthermore, the adjacent partition parts 366, the outer side partition parts 367, and the intermediate partition 169, which are provided between and on both sides of the signal terminals 251A (511-516), are provided as external plate shaped parts that are formed from the resin member into plate shapes.

Figure 45:
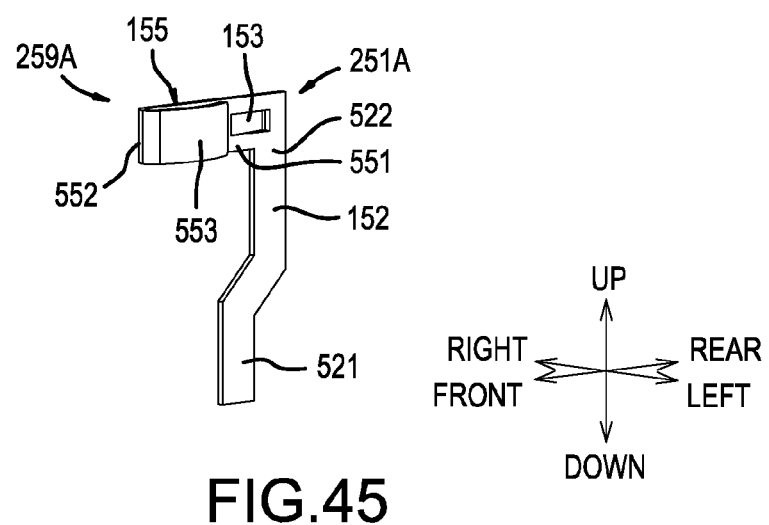
FIG. 45 is an oblique view that shows one of the signal terminals of FIG. 43 by itself.

In addition, as shown in FIG. 45, the signal terminal 251A is configured such that the end edge contact shaped part 157, which is formed such that it extends frontward from the upper part 522 of the support part 152, has been entirely eliminated. Consequently, a male signal terminal 259A, which comprises the signal terminal 251A, comprises only the abovementioned planar contact shaped part 155.

The connector 250A of the sixth embodiment configured in this manner is structurally simpler than the connector 250 of the abovementioned fifth embodiment which may advantageously simplify manufacturing and lower manufacturing costs. Furthermore, even if the battery pack is configured such that the connector 250 of the abovementioned fifth embodiment is substituted with the connector 250A of the sixth embodiment, substantially the same operational effects as those of the battery pack 210 of the abovementioned fifth embodiment are achieved.

Figure 46:
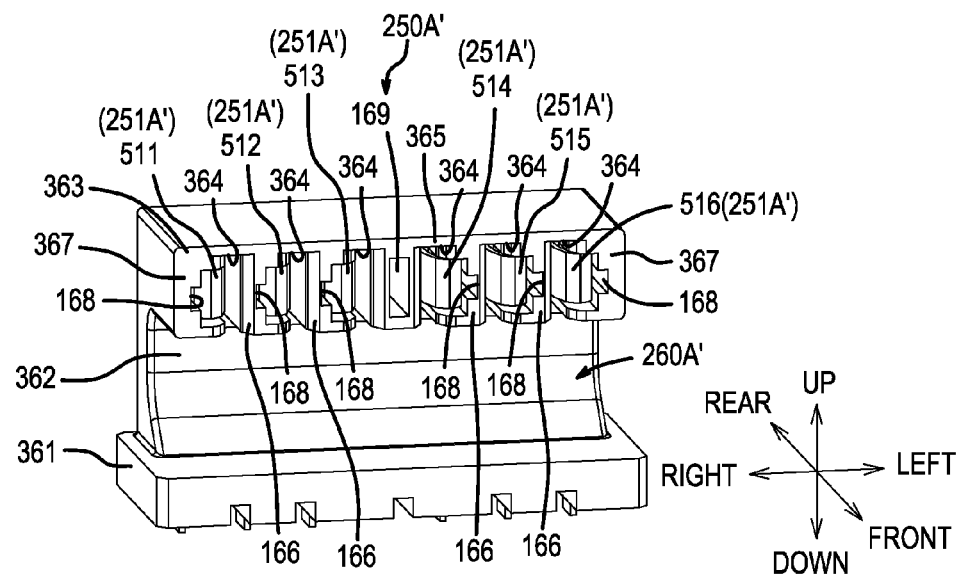
FIG. 46 is a front side oblique view of a top plate part of a resin support body of the connector in FIG. 43.
Figure 47:
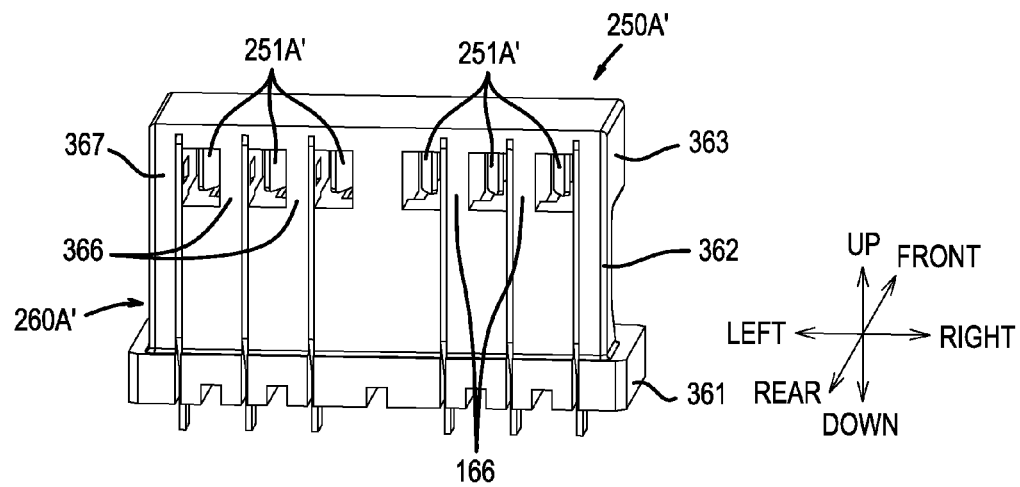
FIG. 47 is a rear side oblique view of the connector in FIG. 46.

Incidentally, the resin support body 260A of the connector 250A of the sixth embodiment may be configured in substantially the same manner as the resin support body 260 of the connector 250 of the abovementioned fifth embodiment. As shown in FIG. 46 and FIG. 47, a resin support body 260A' of a connector 250A' is configured in substantially the same manner as the resin support body 260 of the abovementioned fifth embodiment. Specifically, in the resin support body 260N, the top plate part 365 is provided at the abovementioned terminal support part 363. Furthermore, signal terminals 251A', which are mounted to the connector 250N, are formed as signal terminals that are identical to the signal terminals 251A mounted to the connector 250A of the abovementioned sixth embodiment.

In comparison with the connector 250A, the connector 250N configured in this manner is provided with the top plate part 365 which makes it possible to reliably protect the upper sides of the signal terminals 251A' and, furthermore, to prevent water from adversely contacting the signal terminals 251A'.

Seventh Embodiment

Next, a seventh embodiment, which is a modified example related to the connector 250 and the circuit board 42 of the battery pack 210 of the abovementioned fifth embodiment, will be explained, with reference to FIG. 48 through FIG. 53. Furthermore, the seventh embodiment is substantially the same as the fifth embodiment except that in the seventh embodiment the configurations of the connector 250 and the circuit board 42 have been modified. Consequently, the configuration of a connector 250B and the circuit board 42 (in detail, a resin coating part 43), which have been modified, is explained below, and explanation of other constituent elements is omitted.

Figure 48:
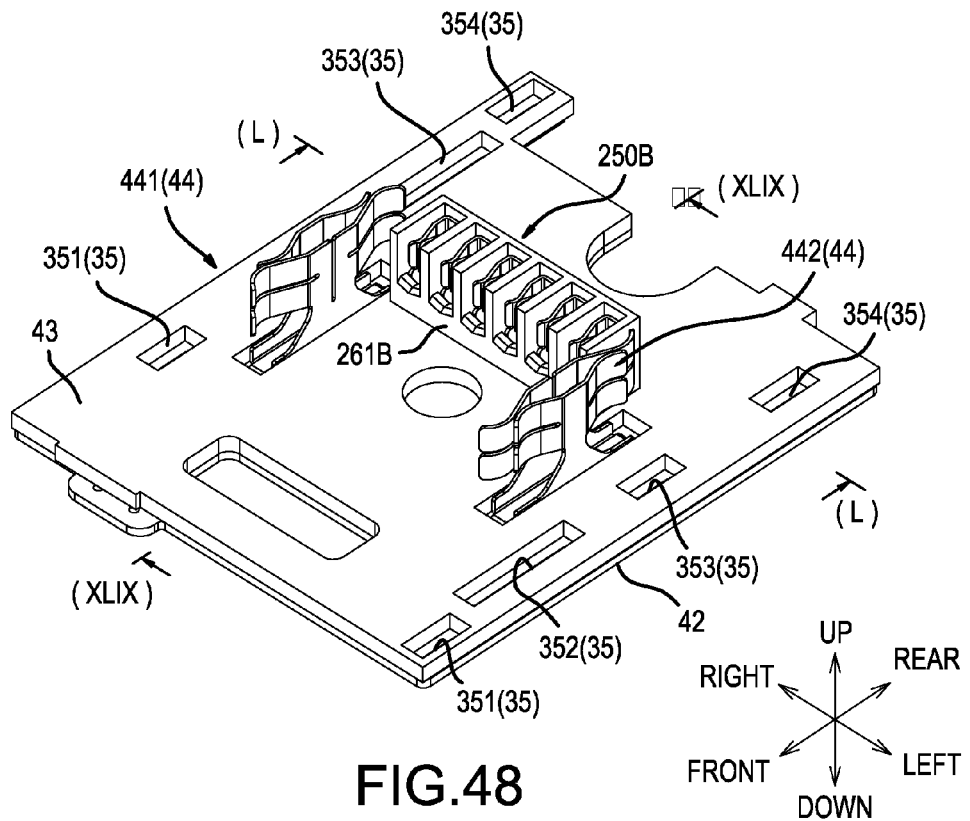
FIG. 48 is an upper surface side oblique view of the circuit board according to a seventh embodiment.

First, the connector 250B of the seventh embodiment will be explained. Compared with the connector 250 of the abovementioned fifth embodiment, the connector 250B of the seventh embodiment differs in the configuration of signal terminals 251B and a resin support body 260B. Specifically, the connector 250B of the seventh embodiment has the same functions as the connector 250 of the abovementioned fifth embodiment. The connector 250B comprises the signal terminals 251B and the resin support body 260B. Furthermore, the resin support body 260B corresponds to the resin member according to the present disclosure. As shown in FIG. 48, six of the signal terminals 251B are disposed between the positive connection terminal 441 and the negative connection terminal 442 mentioned above. The six signal terminals 251B perform the same functions as the signal terminals 51 of the connector 250 of the abovementioned fifth embodiment. Namely, as in the connector 250 of the abovementioned fifth embodiment, the front-rear positions of the six signal terminals 251B are selected such that they are close to the rear ends of the positive connection terminal 441 and the negative connection terminal 442. The six signal terminals 251B are arrayed (arranged) in parallel and electrically connected to the circuit board 42.

Figure 49:
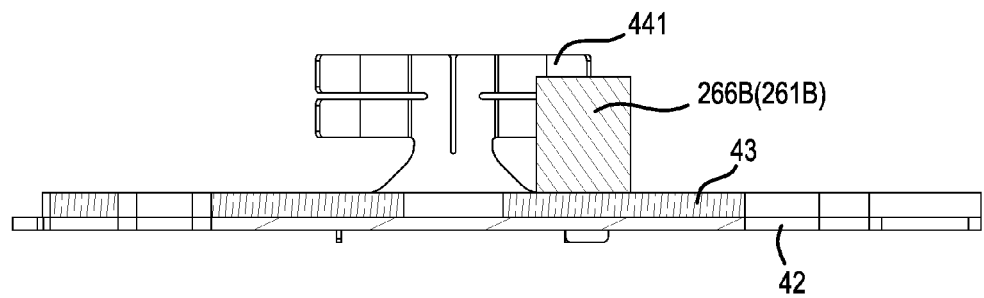
FIG. 49 is a cross sectional auxiliary view taken along the (XLIX)-(XLIX) line in FIG. 48.
Figure 50:
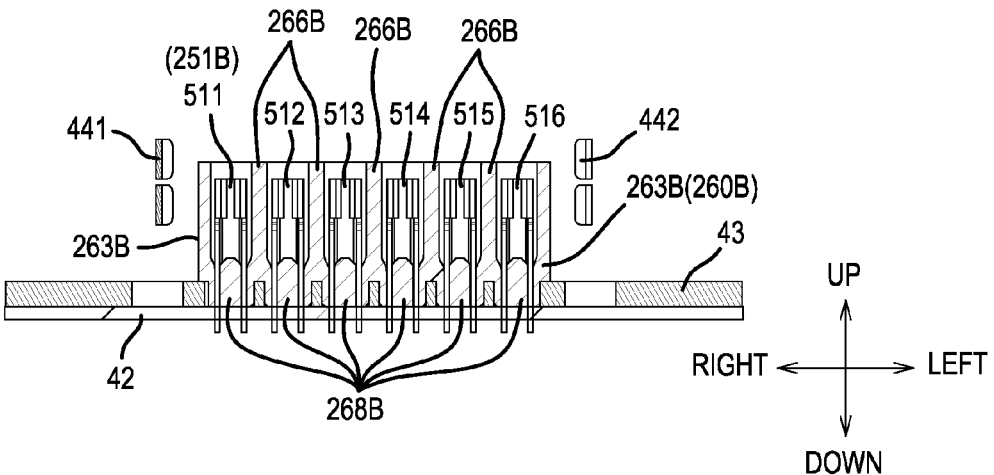
FIG. 50 is a cross sectional auxiliary view taken along the (L)-(L) line in FIG. 48.

As shown in FIG. 48 and FIG. 49, each of the six signal terminals 251B is formed with a contact shape that is substantially U shaped in an upper surface view and that sandwiches a contact from both (on) the left and right sides. Each of the signal terminals 251B comprises a support part 591 that extends upward from the circuit board 42, and contact parts 593, 594 that are bent from the support part 591. The contact parts 593, 594 are formed by bending the support part 591 frontward into substantially a U shape in an upper surface view. The left side contact part 593 and the right side contact part 594 are R-shaped and the convexities of the R-shapes face one another. The left side contact part 593 and the right side contact part 594 approach one another increasingly closely in a frontward direction. In addition, the front end portions of the left side contact part 593 and the right side contact part 594 face and contact one another. Furthermore, the lower ends of the signal terminals 251B are formed as connecting parts 595. Although the reference numerals are omitted in FIG. 48 et seq., the first through sixth signal terminals 511-516 are all configured in this manner. As in the connection counterparts of the signal terminals 51 of the fifth embodiment, the six signal terminals 251B are configured as terminals to which the mount side signal terminals 96 of the plate shaped connection apparatus body 90 are connected. The six signal terminals 251B are electrically connected to the mount side signal terminals 96 of the connection apparatus body 90 by sandwiching the mount side signal terminals 96 of the connection apparatus body 90 from both (on) the left and right sides.

Figure 51:
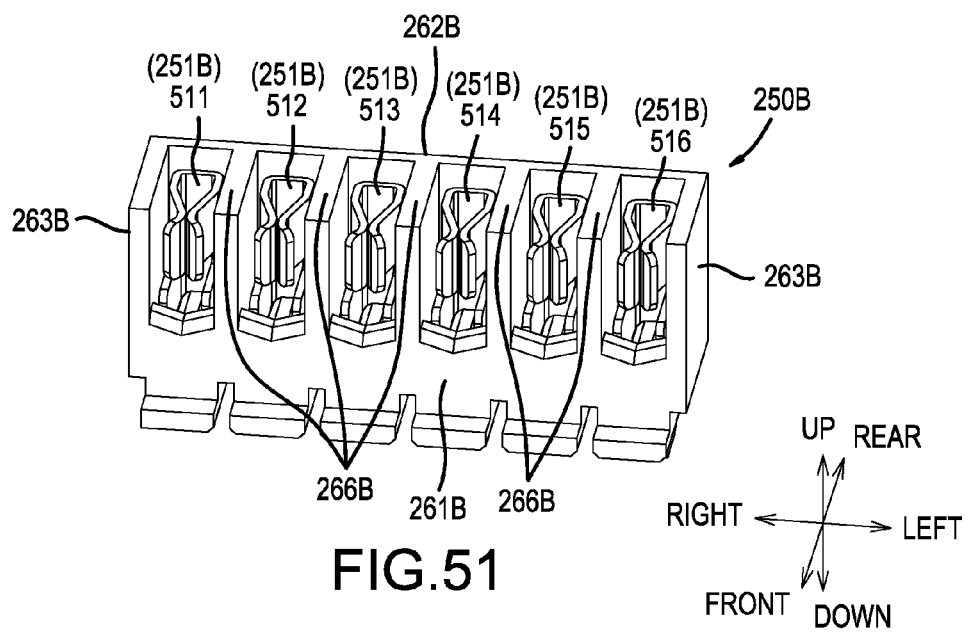
FIG. 51 is a front side oblique view of the connector according to the seventh embodiment.

As shown in FIG. 51, the resin support body 260B is formed such that it is integrated with the signal terminals 251B. The resin support body 260B comprises, in order from bottom to top, a front side wall part 261B, a rear side wall part 262B, and sidewall parts 263B. The front side wall part 261B constitutes a front side wall of the signal terminals 251B. Thus, the front side wall part 261B extends over the entire area in which the first through sixth signal terminals 511-516 are provided and disposed. The front side wall part 261B formed in this manner can prevent the penetration of water, dust and the like into the signal terminals 251B from the front side. In addition, the rear side wall part 262B is formed such that it constitutes a rear side wall of the signal terminals 251B. Thus, the rear side wall part 262B extends over the entire area in which the first through sixth signal terminals 511-516 are provided and disposed. The rear side wall part 262B formed in this manner can prevent the penetration of water, dust, and the like into the signal terminals 251B from the rear side. In addition, the sidewall parts 263B are wall structures on both sides of the signal terminals 511-516.

Figure 52:
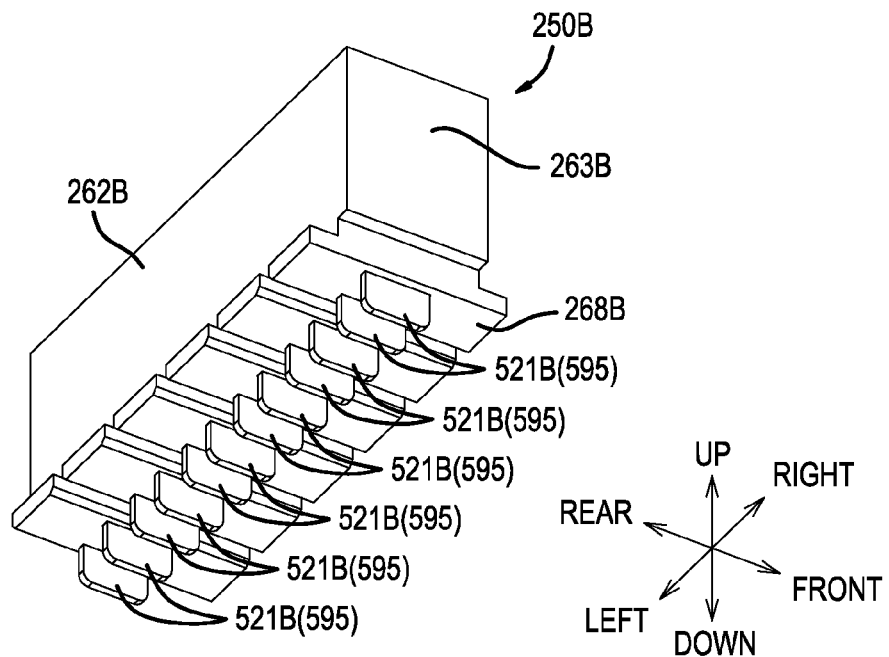
FIG. 52 is a rear side oblique view of the connector in FIG. 51.
Figure 53:
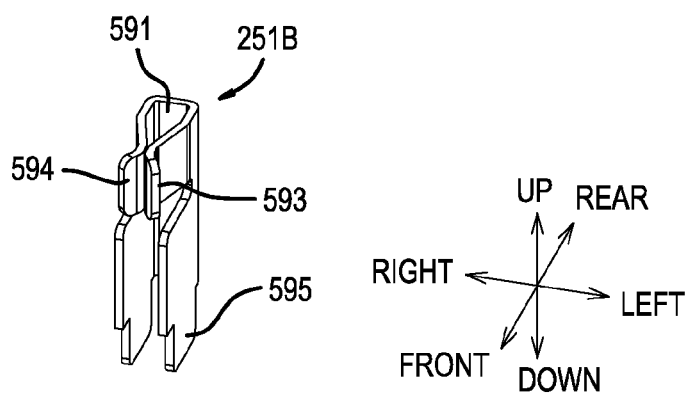
FIG. 53 is an oblique view that shows one of the signal terminals of FIG. 51 by itself.

Furthermore, as shown in FIG. 52, pedestal parts 268B are provided at portions of the resin support body 260B located on the lower side between the signal terminals 251B. The pedestal parts 268B are formed such that they are in tight contact with the upper surface of the circuit board 42 when the connector 250B is mounted on the circuit board 42. Consequently, the signal terminals 251B are configured such that they are disposed one step upward from the pedestal parts 268B. Furthermore, connecting parts 595, which constitute the lower ends of the signal terminals 251B, protrude downward from the pedestal parts 268B. In addition, as shown in FIG. 51, adjacent partition parts 266B, parts of the resin support body 260B, are provided between the six signal terminals 251B. The adjacent partition parts 266B serve to space apart (separate or isolate) the signal terminals 251B from one another.

Incidentally, the resin coating part 43 is provided on the upper surface of the circuit board 42 when the signal terminals 251B are provided in this manner. The resin coating part 43 is formed by applying and molding an appropriate resin material onto the upper surface of the circuit board 42. The resin coating part 43 is an elastic, soft resin material that is capable of contacting other structures in an airtight manner and is molded of a resin material that electrically insulates (isolates) from contacting members. The resin coating part 43 may be an elastic gum resin such as, for example, an elastomer. Furthermore, any appropriate resin material can be selected as the resin coating part 43 as long as it is an electrically insulating (isolating) material and has sealing properties that enable airtight contact with other structures. In addition, the resin coating part 43 may be molded by coating the upper surface of the circuit board 42 with a resin adhesive that has suitable electrically insulating properties and then drying the coating. If a resin adhesive is selected as the resin with which the resin coating part 43 is molded, then, even if the resin adhesive is soft, the resin adhesive should have a degree of softness (stiffness) that elastically deforms only slightly when pressed, i.e. it should have a relatively high elastic modulus.

In addition, even if the battery pack is configured using the configuration of the connector 250B and the circuit board 42 of the seventh embodiment (in detail, the resin coating part 43), substantially the same operational effects as the battery pack 210 of the abovementioned fifth embodiment are achieved. In addition, because the signal terminals 251B of the seventh embodiment have contacts at two points, namely, on both the left and right sides, contact conductivity can be increased. In the seventh embodiment, the positive connection terminal 441, the negative connection terminal 442, and the six signal terminals 251B are configured such that they sandwich the counterpart side terminals from (on) both sides and are formed as terminals that provide electrical contact with the counterpart side terminals from both sides. Furthermore, the signal terminals 251B may be formed as contact terminals in which only one side, namely, either the left or the right side, functions as a leaf spring. In addition, if the resin coating part 43 like that in the seventh embodiment is provided on the upper surface of the circuit board 42, then the insulation (isolation) characteristics of the circuit board can be improved.

Furthermore, the soft material according to the present disclosure is not limited to the example of the abovementioned resin coating part 43; any suitable configuration can be adopted as long as it is a configuration that is elastic and capable of contacting other elements or structures in an airtight manner. In addition, the insulating material according to the present disclosure is also not limited to the example of the abovementioned resin coating part 43, and any suitable configuration can be adopted as long as it is formed of an electrically insulating material.

In addition, the power tool battery pack of the abovementioned first through seventh embodiments may be further modified as described below.

In the abovementioned embodiments, the number of the battery cells is seven, but the number of the battery cells according to the present disclosure is not limited to seven, and any appropriate number may be provided. In addition, the number and arrangement of the lead plates may be determined in accordance with the number of the battery cells arranged in this manner.

In addition, the outer packaging case of the abovementioned embodiments is configured as a case (housing) structure that is split in half. That is, the upper side and the lower side are illustrative examples and the power tool battery pack is divided into the upper side and the lower side strictly to facilitate understanding; however, the present disclosure is not limited thereto. Namely, in addition to a split into upper and lower sides the case structure could also be split into left and right sides or front and rear sides, etc.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved power tool battery packs, and methods of making and using the same.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

10, 110, 110A, 110B, 210 Battery pack
20, 20A Outer packaging case
21 Lower side case
22 Female screw hole(s)
23, 23A Upper side case
25 Charging and discharging terminal slits
26 Signal terminal slits
28 Operation status visualization part(s)
29 Lower surface of the upper side case 23
30 Battery main body
31 Battery part
33 Battery cell(s)
34 Lead plates
35, 35B Connection locations
36 Cell holder
41 Control unit
42 Circuit board
43 Resin coating part
44 Charging and discharging terminal(s)
45 Inner side contact terminal
46 Outer side contact terminal
47 Remaining charge display apparatus
48 Display switch
49 Light emitting diode
51 Signal terminal(s)
52 Support part
53 Contact parts
55, 55A, 55B Resin coating part
56, 56A Upper surface of the resin coating part 55, 55A
59, 259A Male signal terminal(s)
60 Terminal isolating (partitioning) structure
61 Isolating slit (gap)
62 Separating slit(s)
63 Front end(s) of the separating slit(s) 62
64 Rear end(s) of the separating slit(s) 62
67 Linking slit
68 Right end of the linking slit 67
69 Left end of the linking slit 67
71 Partition (extension) part
72 Front side partition part
74 Two-sided partition walls
77 Screw
80 Male hook mechanism
81 Hook shaped structure
82 Hook part
83 Operating part
85 Urging spring
90 Connection apparatus body
92 Support pedestal
94 Mount side charging and discharging terminals
96 Mount side signal terminals
97 Side surfaces of the mount side signal terminals 96
98 Upper side end edges of the mount side signal terminals 96
99 Guide positioning surface member
137 Right side contact area
138 Left side contact area
153 Hollow part
155 Planar contact shaped parts
157 End edge contact shaped parts of the signal terminals 51
160, 160A, 160B Partition (extension) part
161 High partition part
162 Low partition part
163 Front side partition part
165 Two-sided partition wall(s)
165A Flat plate shaped two-sided partition walls
166 Lower end surface of two-sided partition walls 165A
167 Rear side partition part
168 Internal contact part
169 Intermediate partition
231 Positioning surface
232 Screw boss(es)
233 Slip-on flange part
241 Slide guide part
242 Slide guide part
245 Hollow parts (slots)
250, 250A Connector 251 Positive terminal slit
251A Signal terminal(s)
251B Signal terminal(s)
252 Negative terminal slit
260, 260A, 260' Resin support body
261 Slit stepped part
261B Front side wall part
262B Rear side wall part
263B Sidewall part(s)
266B Partition part(s)
268B Pedestal parts
271 Hook opening
272 Operation opening
273 Ventilation port(s)
281 Elastic button
282 Transmissive material
283 Operation notch part
341 First lead plate
342 Second lead plate
343 Third lead plate
344 Fourth lead plate
351 First connection location
352 Second connection location
353 Third connection location
354 Fourth connection location
361 Support seat part
362 Intermediate support part
363 Terminal support part
364 Openings
365 Top plate part
366 Partition parts
367 Outer side partition parts
420 Microcontroller
421 Ventilation opening
422 Screw opening
441 Positive connection terminal
442 Negative connection terminal
443 Virtual line
451 Support part
453 Front contact part
454 Rear contact part
461 Support part
463 Front contact part
454 Rear contact part
511 First signal terminal
512 Second signal terminal
513 Third signal terminal
514 Fourth signal terminal
515 Fifth signal terminal
516 Sixth signal terminal
521 Lower part of the support part 152
522 Upper part of the support part 152
531 Contact linking part
533 Contact part
534 Contact part
551 Extension part of planar contact shaped parts 155
552 Folded part of planar contact shaped parts 155
553 Bent parts of planar contact shaped parts 155
573 Convex bent part(s)
575 Extension part
591 Support part
593, 594 Contact parts
595 Connecting parts
621 First separating slit
622 Second separating slit
623 Third separating slit
624 Fourth separating slit
625 Fifth separating slit
626 Sixth separating slit
627 Seventh separating slit
631-637 Front end(s) of the separating slit(s) 62
641-647 Rear end(s) of the separating slit(s) 62
681 Side surface of the internal contact part 168
731, 751 Upper ends (tips) of the partition part 71
741-747 Two-sided partition walls
752 Lower (base) end of the partition part 71
923, 924 Lead wire outlets
925 Mating recessed part
941, 942 Mount side charging and discharging terminals
961-966 Mount side signal terminals
991 Lower surface of guide positioning surface member
992 Upper surface of guide positioning surface member

I claim:

1. A power tool battery pack, comprising:
a lower side case;
an upper side case fixed to the lower side case;
at least one battery cell housed in the lower side case;
a circuit board electrically connected to the battery cell;
first and second terminals disposed on and connected to the circuit board; and
a slit extending through the circuit board between the first terminal and the second terminal.

2. The power tool battery pack according to claim 1, wherein:
the slit comprises first and second separating slits connected to, and each extending perpendicular from, a linking slit, such that a cantilevered portion is defined on the circuit board, and
the first terminal is located on the cantilevered portion.

3. The power tool battery pack according to claim 2, wherein the first and second separating slits are parallel.

4. The power tool battery pack according to claim 3, further comprising:
a cell holder holding the at least one battery cell and including a partition part that projects through the slit.

5. The power tool battery pack according to claim 4, wherein partition part includes:
a first partition wall extending through the first separating slit,
a second partition wall extending through the second separating slit and
a front side partition part extending through the linking slit.

6. The power tool battery pack according to claim 5, wherein the first and second partition walls extend perpendicularly and integrally from, without a seam therebetween, the front-side partition part.

7. The power tool battery pack according to claim 6, wherein the first terminal is isolated on three sides by the first and second partition walls and the front-side partition part.

8. The power tool battery pack according to claim 7, wherein the first and second terminals are signal terminals electronically connected to a microcontroller disposed on the circuit board, the signal terminals being configured to contact complementary signal terminals disposed on a power tool main body, a specialized charger, or another mounting target.

9. The power tool battery pack according to claim 8, wherein the upper side case includes signal terminal slits configured to respectively allow access to and contact with the first and second terminals through the upper side case.

10. The power tool battery pack according to claim 9, wherein the upper side case includes:
a positioning surface configured to contact a power tool main body, a specialized charger, or another mounting target while attaching the battery pack thereto, and a slit stepped part formed as a step wall structure between the positioning surface and the respective lower ends of the signal terminal slits, the slit stepped part being a wall that protrudes perpendicularly from the positioning surface.

11. The power tool battery pack according to claim 10, wherein the partition part is formed of an electrically-insulating resin.

12. A power tool battery pack, comprising:
a lower side case; an upper side case connectable to the lower side case;
a battery cell housed in the lower side case;
a circuit board connected to the battery cell and having at least a first terminal, a second terminal and a third terminal arranged in a line in a first direction; and
a slit extending through the circuit board, the slit including a slit first portion extending in the first direction adjacent to the first, second and third terminals, a slit second portion extending from the slit first portion and between the first terminal and the second terminal, and a slit third portion extending from the slit first portion and between the second terminal and the third terminal.

13. The power tool battery pack according to claim 12, wherein the slit includes a slit fourth portion extending from the slit first portion on a side of the first terminal opposite the slit second portion and a slit fifth portion extending from the slit first portion on a side of the third terminal opposite the slit third portion.

14. The power tool battery pack according to claim 13, wherein:
the slit first, second and fourth portions define a first cantilevered portion of the circuit board, the first terminal being located on the first cantilevered portion, and
the slit first, second and third portions define a second cantilevered portion of the circuit board, the second terminal being located on the second cantilevered portion.

15. The power tool battery pack according to claim 14, wherein the slit second, third, fourth and fifth portions are at least substantially parallel, and are perpendicular to the slit first portion.

16. The power tool battery pack according to claim 12, including a cell holder holding the battery cell, the cell holder including a partition wall extending through the slit.

17. The power tool battery pack according to claim 16, wherein:
the partition wall has a first wall portion extending through the slit first portion, a second wall portion extending through the slit second portion and a third wall portion extending through the slit third portion, and
the second wall portion extends from the first wall portion and the third wall portion extends from the first wall portion.

18. The power tool battery pack according claim 12, wherein the power tool battery pack is configured to be attached to a power tool by moving the power tool battery pack in a forward direction, the power tool battery pack including a forward end comprising a front end of the power tool battery pack when the power tool battery pack moves in the forward direction and wherein the slit second portion and the slit third portion project from the slit first portion and away from the forward end.

19. A power tool battery pack, comprising:
a lower side case;
an upper side case fixed to the lower side case;
at least one battery cell housed in the lower side case;
a cell holder holding the at least one battery cell;
a circuit board electrically connected to the at least one battery cell; and
first and second terminals disposed in parallel on and connected to the circuit board; wherein:
the first terminal and the second terminal are respectively supported by and located entirely on first and second cantilevered portions of the circuit board.

20. A power tool battery pack, comprising:
a lower side case;
an upper side case fixed to the lower side case;
at least one battery cell housed in the lower side case;
a cell holder holding the battery cell;
a circuit board electrically connected to the battery cell and having at least two terminals on an upper surface of the circuit board, the at least two terminals being parallel and extending in a front-rear direction of the battery pack; and
a partition wall extending perpendicularly from an upper surface of the cell holder in a direction away from at least one battery cell;
wherein the partition wall is disposed at least between the at least two terminals and a front end of the battery pack in the front-rear direction of the battery pack.

21. The power tool battery pack according to claim 20, wherein the partition wall includes a first portion perpendicular to the front-rear direction and a second portion parallel to the front-rear direction, the second portion being located between a pair of the at least two terminals.

* * * * *